US009401157B2

(12) United States Patent
Fink, IV

(10) Patent No.: US 9,401,157 B2
(45) Date of Patent: Jul. 26, 2016

(54) CUSTOMIZABLE SYSTEM AND DEVICE FOR DEFINING VOICE DIMENSIONS AND METHODS OF USE

(71) Applicant: Richard Fink, IV, Bergen, NY (US)

(72) Inventor: Richard Fink, IV, Bergen, NY (US)

(73) Assignee: Richard Fink IV, Bergen, NY (US)

( * ) Notice: Subject to any disclaimer, the term of this patent is extended or adjusted under 35 U.S.C. 154(b) by 39 days.

(21) Appl. No.: 14/279,489

(22) Filed: May 16, 2014

(65) Prior Publication Data

US 2015/0106103 A1 Apr. 16, 2015

Related U.S. Application Data

(60) Provisional application No. 61/889,960, filed on Oct. 11, 2013.

(51) Int. Cl.
| | |
|---|---|
| *G10L 25/00* | (2013.01) |
| *G10L 19/06* | (2013.01) |
| *G10L 25/90* | (2013.01) |
| *G10L 21/003* | (2013.01) |
| *G10L 13/033* | (2013.01) |
| *G09B 15/00* | (2006.01) |
| *G09B 19/00* | (2006.01) |
| *G10L 21/013* | (2013.01) |

(52) U.S. Cl.
CPC .............. *G10L 21/003* (2013.01); *G09B 15/00* (2013.01); *G09B 19/00* (2013.01); *G10L 13/033* (2013.01); *G10L 2021/0135* (2013.01)

(58) Field of Classification Search
None
See application file for complete search history.

(56) References Cited

U.S. PATENT DOCUMENTS

| | | | | |
|---|---|---|---|---|
| 6,151,577 A * | 11/2000 | Braun | ..................... | G09B 19/04 704/270 |
| 2007/0055523 A1* | 3/2007 | Yang | ....................... | G10L 21/06 704/257 |

* cited by examiner

*Primary Examiner* — Benny Q Tieu
*Assistant Examiner* — Sunil Chacko
(74) *Attorney, Agent, or Firm* — William N. Hulsey III; Jeffrey D. Hunt; Hulsey Hunt & Parks, P.C.

(57) ABSTRACT

The disclosure provides a customizable system for modifying voice dimensions. The system comprises a program interface located on an electronic device. The program interface is used to manipulate user input from one or more individuals relating to voice parameters. Instructions are then created by the program interface that allow for one or more individuals to modify the voice dimensions of the one or more individuals by following the instructions.

The disclosure further provides a method for modifying an individual's voice dimensions. The method comprises identifying one or more dimensions in an individual's vocal dimensions that are to be modified. On an electronic device, a voice exercise is created by selecting at least one parameter that modifies the one or more dimensions in an individual's voice. Instructions created by the electronic device that are based on the selection of at least one parameter are then followed by the individual.

10 Claims, 52 Drawing Sheets

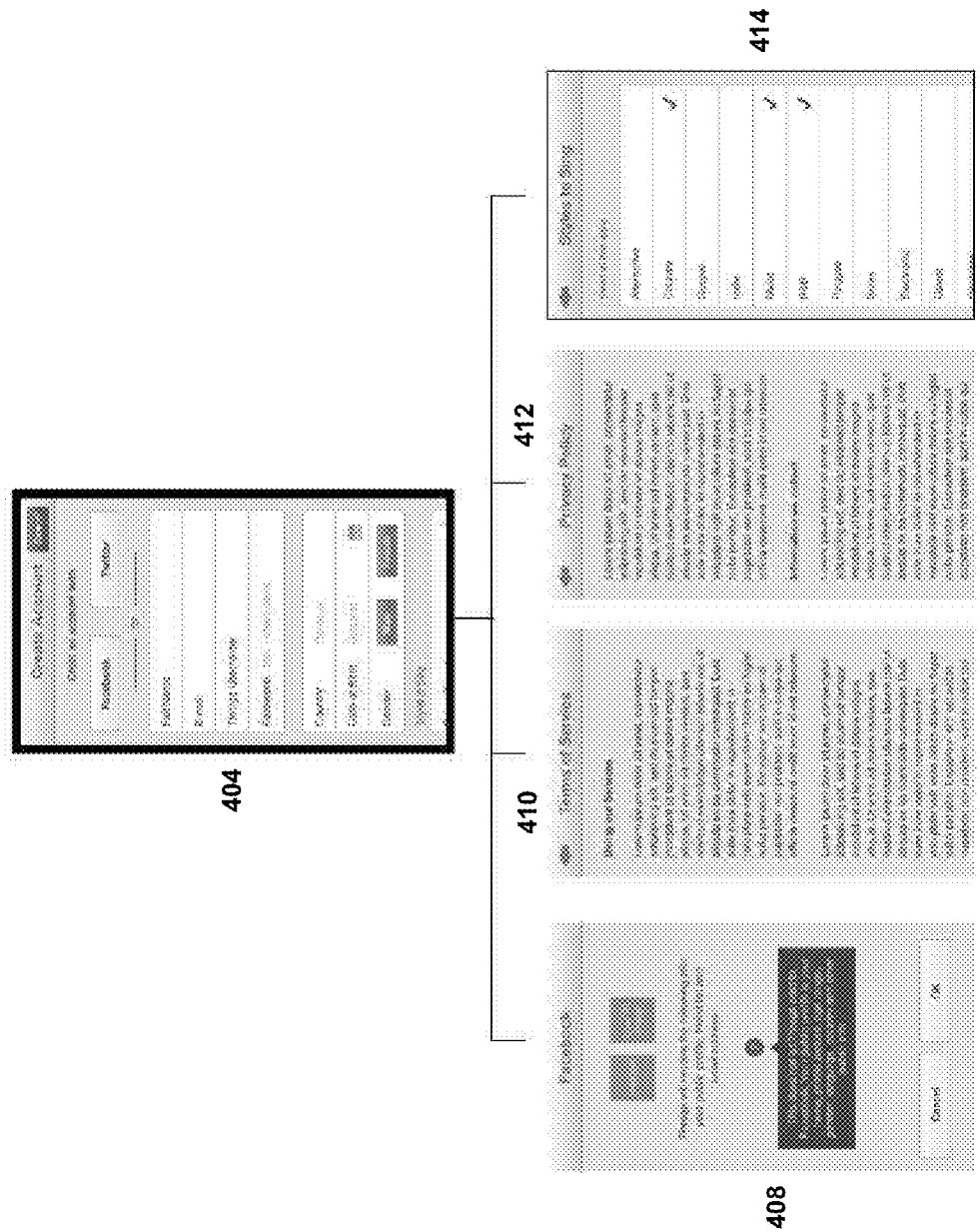
FIG. 9.1

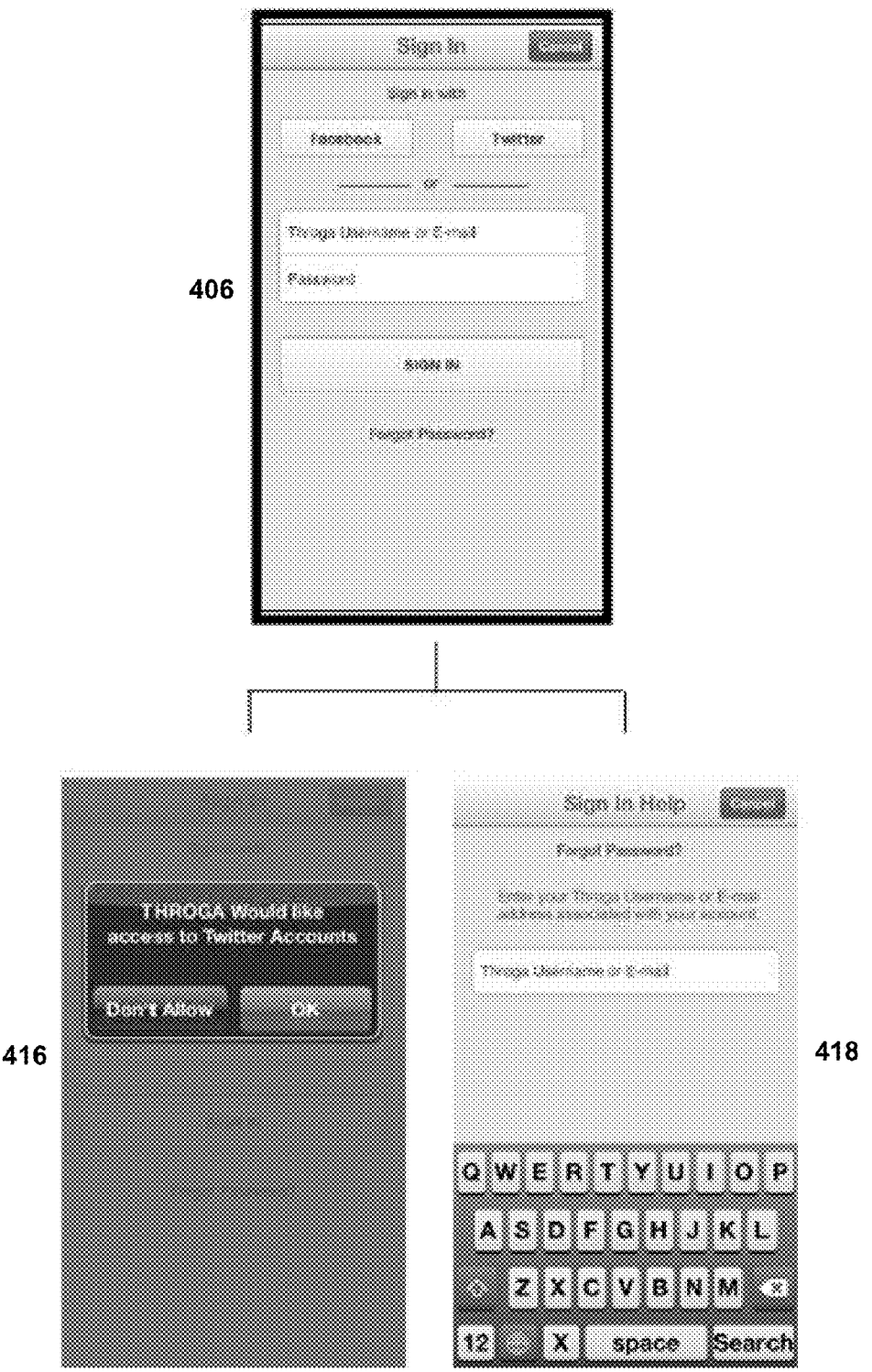
FIG. 9.2

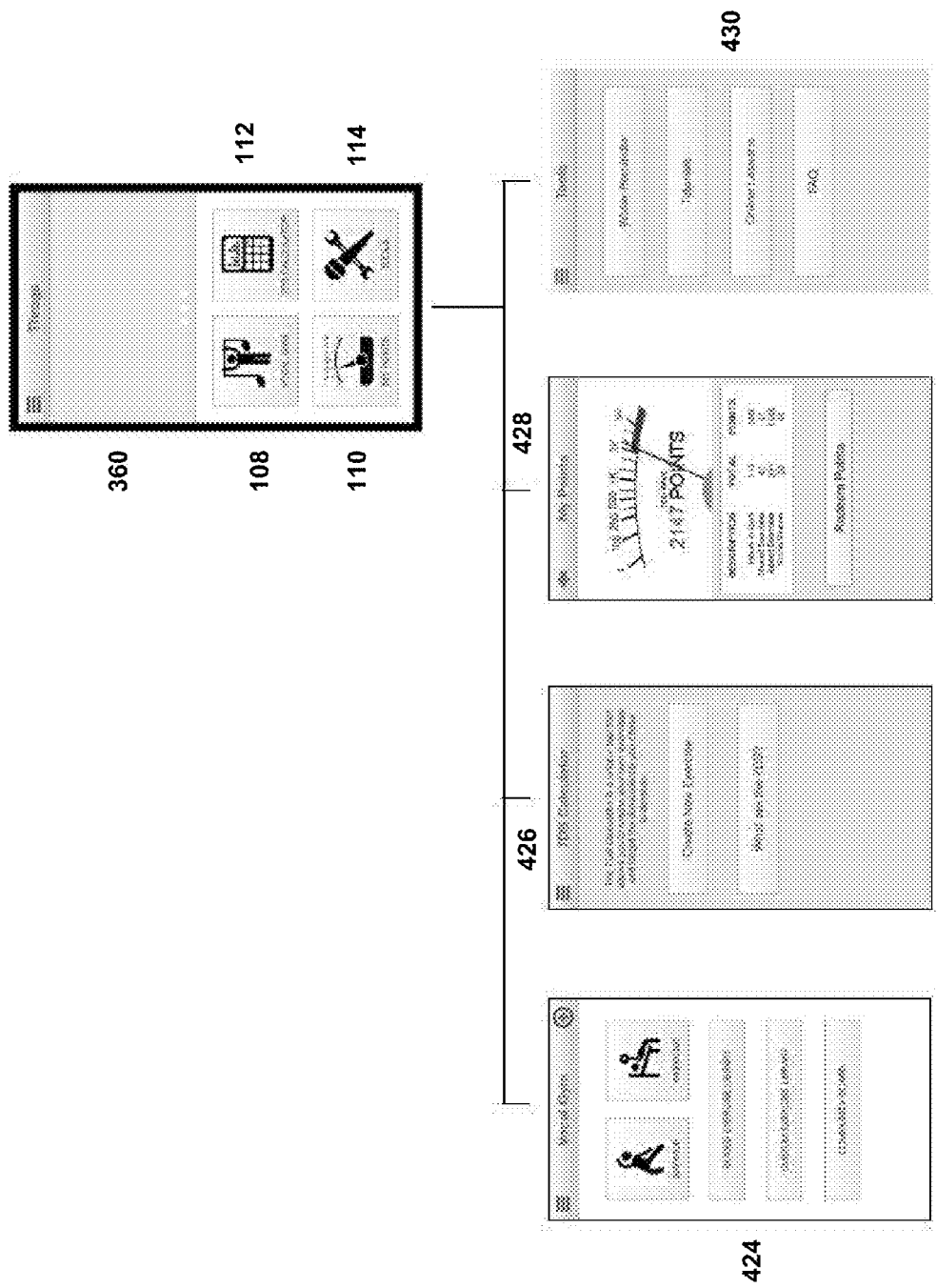
FIG. 9.3

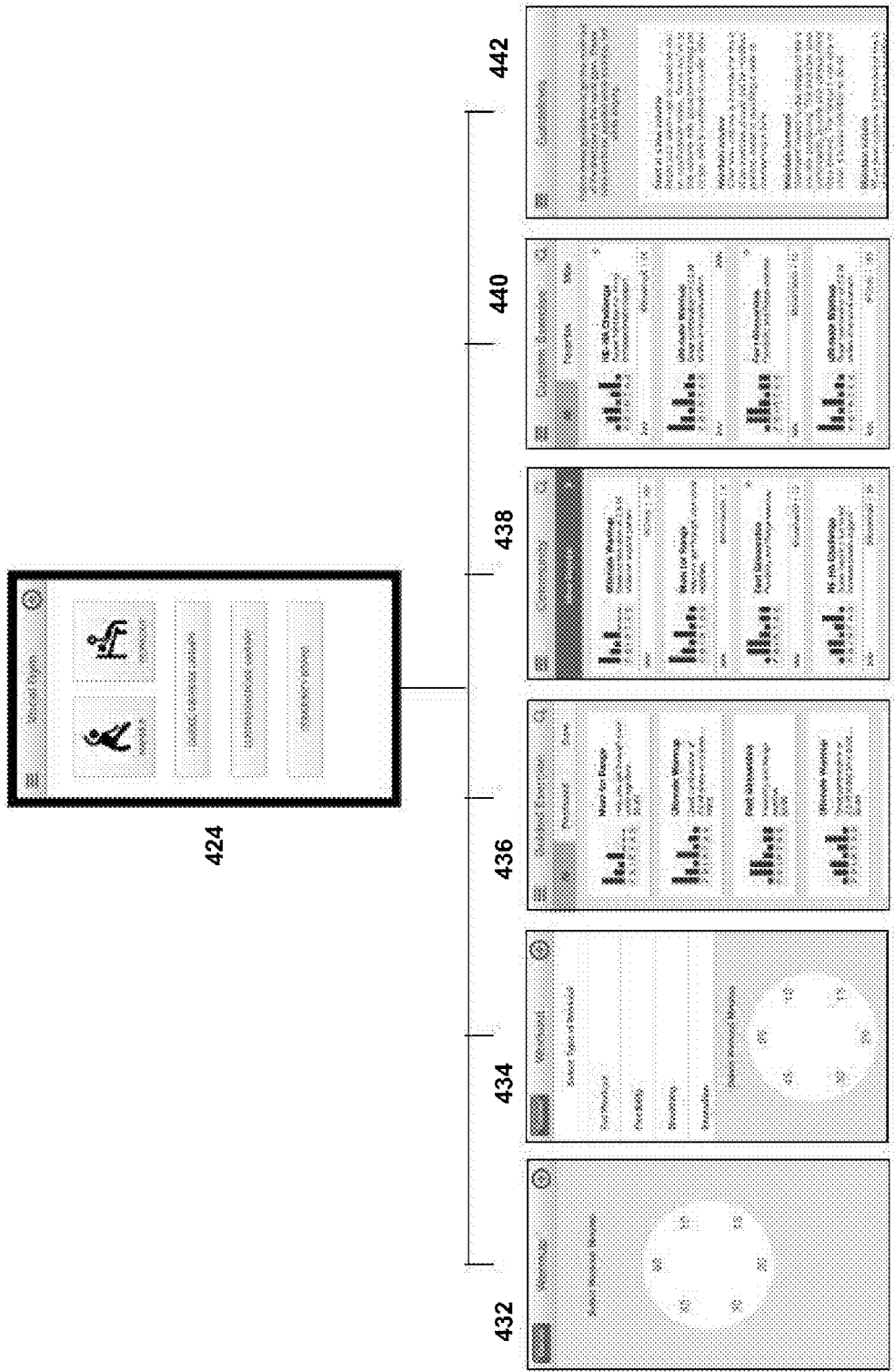
FIG. 9.3.1

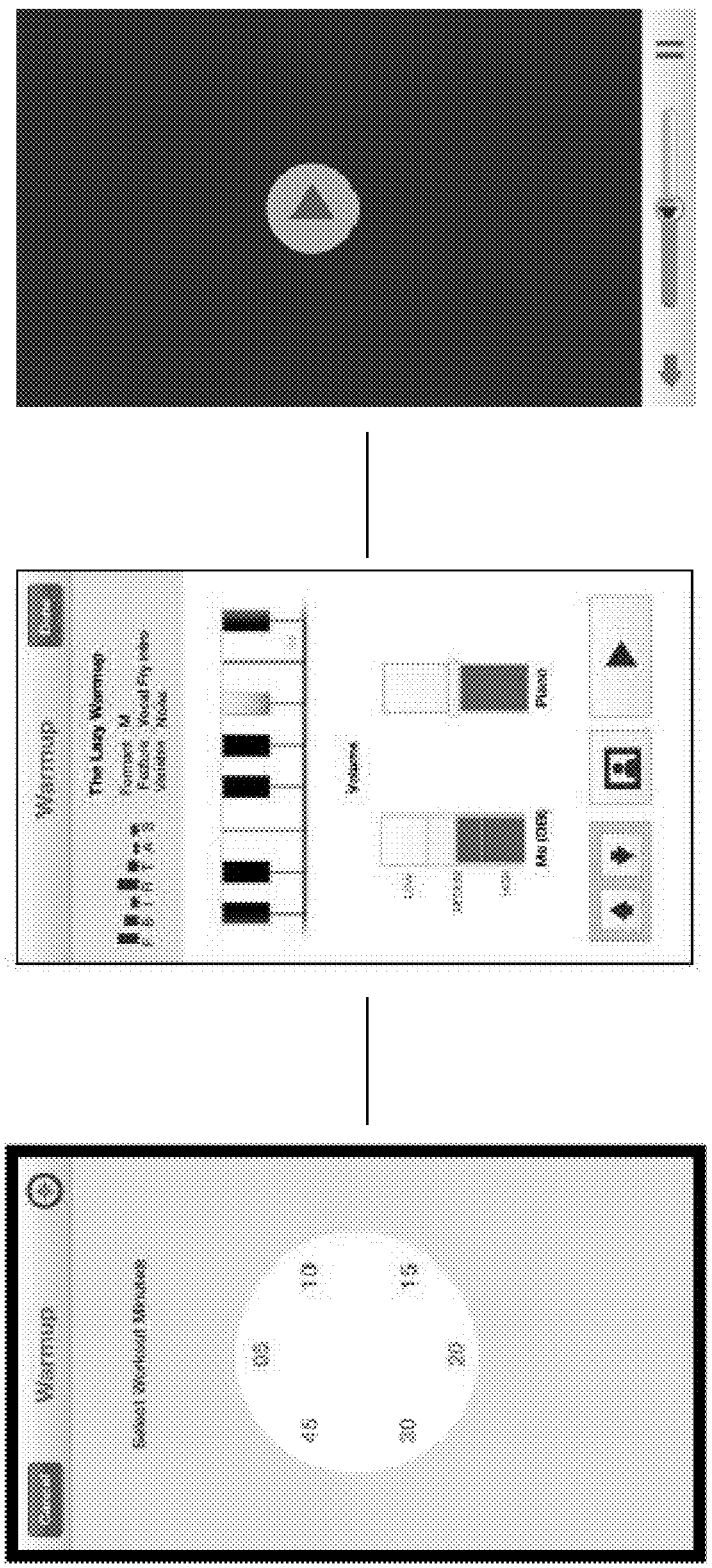
FIG. 9.3.1.1

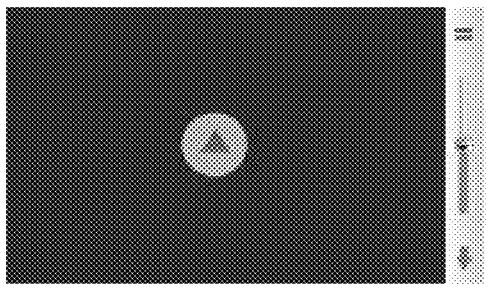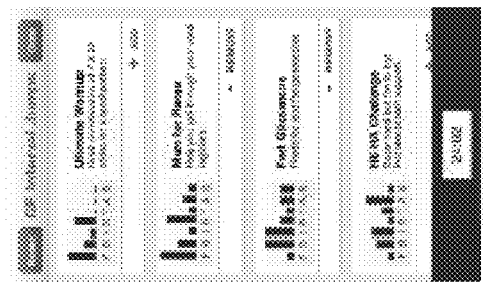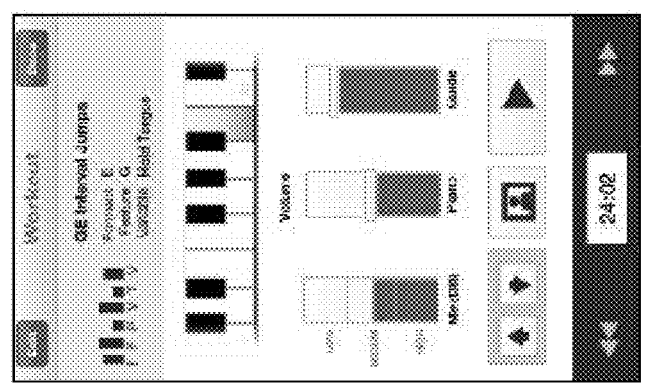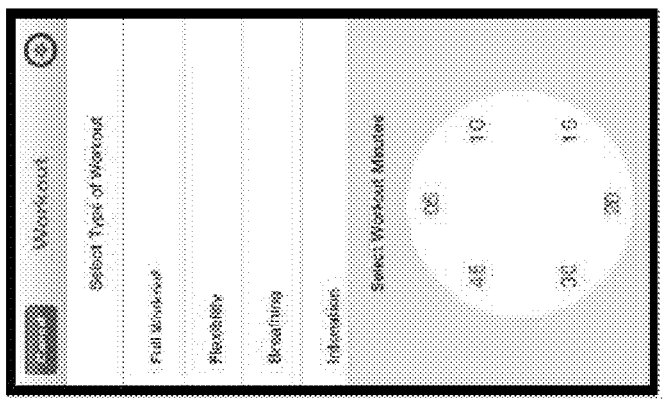
FIG. 9.3.1.2

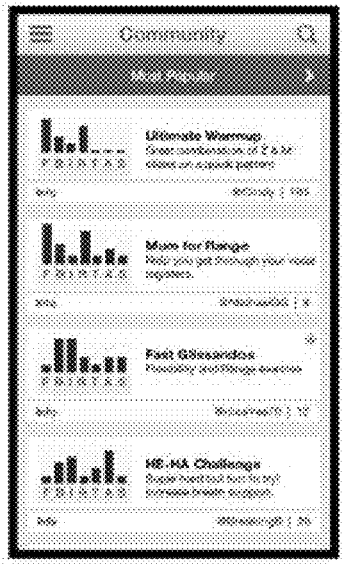
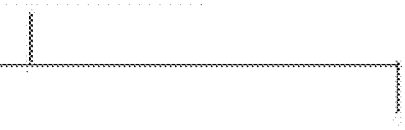
FIG. 9.3.1.3

FIG. 9.3.1.4

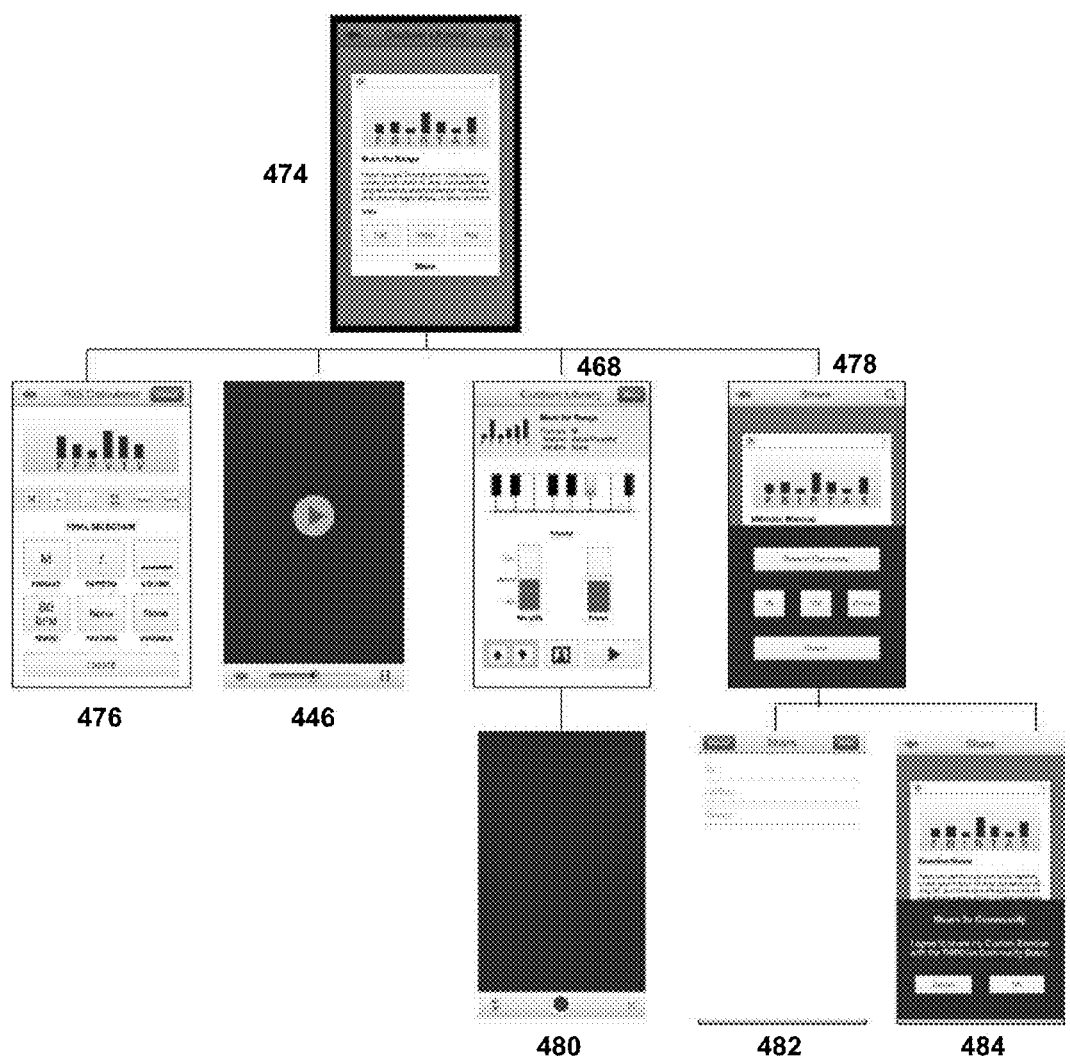
FIG. 9.3.1.4.1

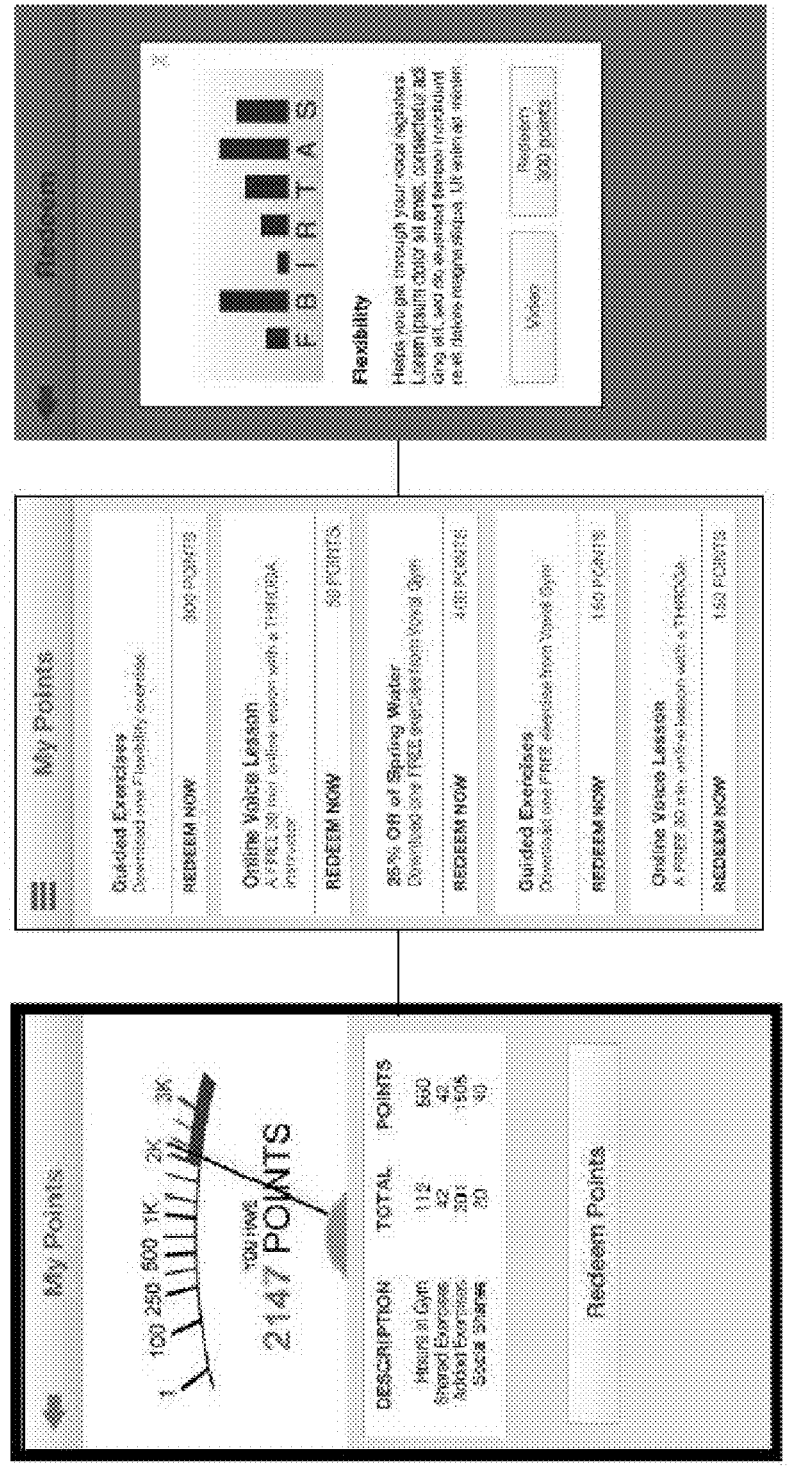
FIG. 9.3.2

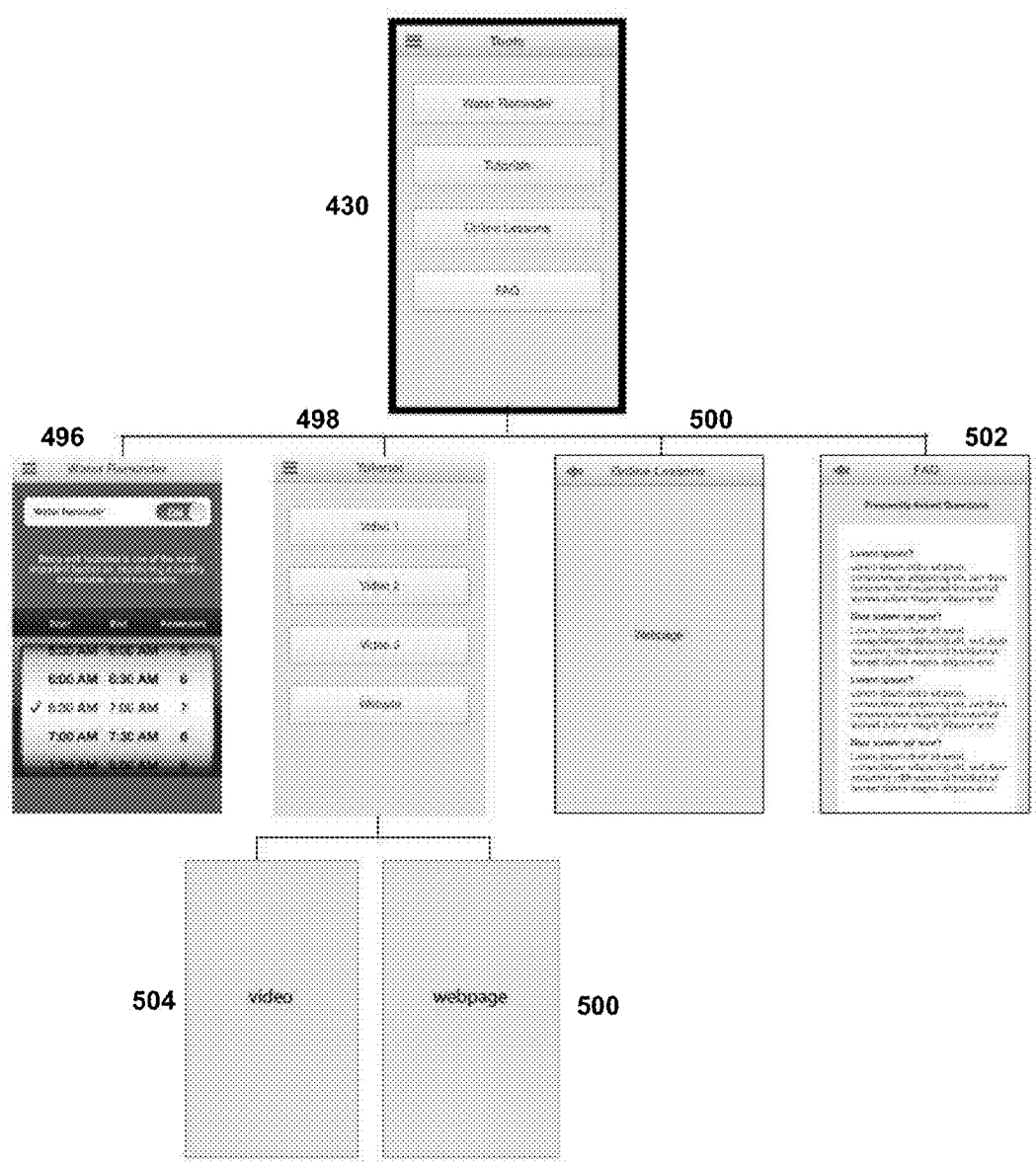
FIG. 9.3.3

| 550 | 552 | 554 | 556 | 558 | 560 | 562 |
|---|---|---|---|---|---|---|
| Formant | Feature | Pattern | Volume | Tempo | Variable | |
| M | None | S | Q | 1s-25s (9) | All (5) | |
| | | SP | Q | 30-210bpm (9) | All (5) | |
| | | G151 | Q | 30-210bpm (9) | All (5) | |
| | | G181 | Q | 30-210bpm (9) | All (5) | |
| | | G15181 | Q | 30-210bpm (9) | All (5) | |
| | | GS185 | Q | 30-210bpm (9) | All (5) | |
| | | IG123451 | Q | 30-210bpm (9) | All (5) | |
| | | IG13581 | Q | 30-210bpm (9) | All (5) | |
| | | I2345m | Q | 30-210bpm (9) | All (5) | |
| | | I232123454321 | Q | 30-210bpm (9) | All (5) | |
| | | I1358m | Q | 30-210bpm (9) | All (5) | |
| | | I135358531 | Q | 30-210bpm (9) | All (5) | |
| | | I135o1o3o5o4o275421 | Q | 30-210bpm (9) | All (5) | |
| | | I2131415m | Q | 30-210bpm (9) | All (5) | |
| | | I5453525m | Q | 30-210bpm (9) | All (5) | |
| | | I4653451m | Q | 30-210bpm (9) | All (5) | |
| | | I814653451m | Q | 30-210bpm (9) | All (5) | |
| | VFI | S | Q | 1s-25s (9) | All (5) | |
| | | G151 | Q | 30-210bpm (9) | All (5) | |
| | | G181 | Q | 30-210bpm (9) | All (5) | |
| | | G15181 | Q | 30-210bpm (9) | All (5) | |
| | | IG123451 | Q | 30-210bpm (9) | All (5) | |
| | | IG13581 | Q | 30-210bpm (9) | All (5) | |
| | | I2345m | Q | 30-210bpm (9) | All (5) | |
| | | I232123454321 | Q | 30-210bpm (9) | All (5) | |
| | | I1358531 | Q | 30-210bpm (9) | All (5) | |
| | | I135358531 | Q | 30-210bpm (9) | All (5) | |
| | | I135o1o3o5o4o275421 | Q | 30-210bpm (9) | All (5) | |
| | VFP | S | Q | 1s-25s (9) | All (5) | |
| | | G151 | Q | 30-210bpm (9) | All (5) | |
| | | IG123451 | Q | 30-210bpm (9) | All (5) | |
| | | I2345m | Q | 30-210bpm (9) | All (5) | |
| H | | SP | Q | 30-210bpm (9) | All (5) | |
| | | SPT | Q | 30-210bpm (9) | All (5) | |
| | | GPT151 | Q | 30-210bpm (9) | All (5) | |
| | | GPT181 | Q | 30-210bpm (9) | All (5) | |
| | | Is132435m | Q | 30-210bpm (9) | All (5) | |
| | | Is135358m | Q | 30-210bpm (9) | All (5) | Audio Samples |
| | | I135o1o3o5o4o275421 | Q | 30-210bpm (9) | All (5) | 45 |
| | | Is12131415m | Q | 30-210bpm (9) | All (5) | Total Generated |
| | | Is14653451m | Q | 30-210bpm (9) | All (5) | 1845 |

| 550 | 552 | 554 | 556 | 558 | 560 | 562 |
|---|---|---|---|---|---|---|
| Formant | Feature | Pattern | Volume | Tempo | Variable | |
| Lip Trill / Tongue Roll | None | S | Q M | 1s-25s (9) | All (5) | |
| | | SP | Q M | 30-210bpm (9) | All (5) | |
| | | G151 | Q M | 30-210bpm (9) | All (5) | |
| | | G181 | Q M | 30-210bpm (9) | All (5) | |
| | | G15181 | Q M | 30-210bpm (9) | All (5) | |
| | | G5185 | Q M | 30-210bpm (9) | All (5) | |
| | | lG123451 | Q M | 30-210bpm (9) | All (5) | |
| | | lG13581 | Q M | 30-210bpm (9) | All (5) | |
| | | I12345m | Q M | 30-210bpm (9) | All (5) | |
| | | I1232123454321 | Q M | 30-210bpm (9) | All (5) | |
| | | I1358m | Q M | 30-210bpm (9) | All (5) | |
| | | I135358531 | Q M | 30-210bpm (9) | All (5) | |
| | | I135o1c3o5o4o275421 | Q M | 30-210bpm (9) | All (5) | |
| | | I12131415m | Q M | 30-210bpm (9) | All (5) | |
| | | I5453525m | Q M | 30-210bpm (9) | All (5) | |
| | | I14653451m | Q M | 30-210bpm (9) | All (5) | |
| | | I814653451m | Q M | 30-210bpm (9) | All (5) | |
| | | ls132435m | Q M | 30-210bpm (9) | All (5) | Audio Samples |
| | | ls135358m | Q M | 30-210bpm (9) | All (5) | 22 |
| | | ls12131415m | Q M | 30-210bpm (9) | All (5) | Total Generated |
| | | ls14653451m | Q M | 30-210bpm (9) | All (5) | 1890 |

| 550 | 552 | 554 | 556 | 558 | 560 | 562 |
|---|---|---|---|---|---|---|
| Formant | Feature | Pattern | Volume | Tempo | Variable | |
| E | None | S | Q M L S | 1s-25s (9) | All (5) | |
| | | SP | Q M L S | 30-210bpm (9) | All (5) | |
| | | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G5185 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | I12345m | Q M L | 30-210bpm (9) | All (5) | |
| | | I1232123454321 | Q M L | 30-210bpm (9) | All (5) | |
| | | I1358m | Q M L | 30-210bpm (9) | All (5) | |
| | | I135358531 | Q M L | 30-210bpm (9) | All (5) | |
| | | I135o1o3o5o4o275421 | Q M L | 30-210bpm (9) | All (5) | |
| | | I12131415m | Q M L | 30-210bpm (9) | All (5) | |
| | | I54535251m | Q M L | 30-210bpm (9) | All (5) | |
| | | I14653461m | Q M L | 30-210bpm (9) | All (5) | |
| | | I814653451m | Q M L | 30-210bpm (9) | All (5) | |
| | | Is132435m | Q M L | 30-210bpm (9) | All (5) | |
| | | Is135358m | Q M L | 30-210bpm (9) | All (5) | |
| | | Is12131415m | Q M L | 30-210bpm (9) | All (5) | |
| | | Is14653451m | Q M L | 30-210bpm (9) | All (5) | |
| | VFI | S | Q S | 1s-25s (9) | All (5) | |
| | | G151 | Q | 30-210bpm (9) | All (5) | |
| | | G181 | Q | 30-210bpm (9) | All (5) | |
| | | G15181 | Q | 30-210bpm (9) | All (5) | |
| | | IG123451 | Q | 30-210bpm (9) | All (5) | |
| | | IG13581 | Q | 30-210bpm (9) | All (5) | |
| | | I12345m | Q | 30-210bpm (9) | All (5) | |
| | | I1232123454321 | Q | 30-210bpm (9) | All (5) | |
| | | I1358m | Q | 30-210bpm (9) | All (5) | |
| | | I135358531 | Q | 30-210bpm (9) | All (5) | |
| | | I135o1o3o5o4o275421 | Q | 30-210bpm (9) | All (5) | |
| | VFP | S | Q | 1s-25s (9) | All (5) | |
| | | G151 | Q | 30-210bpm (9) | All (5) | |
| | | IG123451 | Q | 30-210bpm (9) | All (5) | |
| | | I12345m | Q | 30-210bpm (9) | All (5) | |

*FIG. 10C*

| 550 | 552 | 554 | 556 | 558 | 560 | 562 |
|---|---|---|---|---|---|---|
|  | M | SP | Q M L S | 30-210bpm (9) | All (5) |  |
|  |  | G151 | Q M | 30-210bpm (9) | All (5) |  |
|  |  | G181 | Q M | 30-210bpm (9) | All (5) |  |
|  |  | G15181 | Q M | 30-210bpm (9) | All (5) |  |
|  |  | G5186 | Q M | 30-210bpm (9) | All (5) |  |
|  |  | lG123451 | Q M | 30-210bpm (9) | All (5) |  |
|  |  | lG13581 | Q M | 30-210bpm (9) | All (5) |  |
|  |  | l12345m | Q M L | 30-210bpm (9) | All (5) |  |
|  |  | l1232123454321 | Q M L | 30-210bpm (9) | All (5) |  |
|  |  | l1358m | Q M L | 30-210bpm (9) | All (5) |  |
|  |  | l135368531 | Q M L | 30-210bpm (9) | All (5) |  |
|  |  | l135o1o3o5o4o275421 | Q M L | 30-210bpm (9) | All (5) |  |
|  |  | l12131415m | Q M L | 30-210bpm (9) | All (5) |  |
|  |  | l54535251m | Q M L | 30-210bpm (9) | All (5) |  |
|  |  | l14653451m | Q M L | 30-210bpm (9) | All (5) |  |
|  |  | l814653451m | Q M L | 30-210bpm (9) | All (5) |  |
|  |  | ls132435m | Q M L | 30-210bpm (9) | All (5) |  |
|  |  | ls135358m | Q M L | 30-210bpm (9) | All (5) |  |
|  |  | ls12131415m | Q M L | 30-210bpm (9) | All (5) |  |
|  |  | ls14653451m | Q M L | 30-210bpm (9) | All (5) |  |
|  | G | SP | Q M L S | 1s-25s (9) | All (5) |  |
|  |  | G151 | Q M L | 30-210bpm (9) | All (5) |  |
|  |  | G181 | Q M L | 30-210bpm (9) | All (5) |  |
|  |  | G15181 | Q M L | 30-210bpm (9) | All (5) |  |
|  |  | G5186 | Q M L | 30-210bpm (9) | All (5) |  |
|  |  | lG123451 | Q M L | 30-210bpm (9) | All (5) |  |
|  |  | lG13581 | Q M L | 30-210bpm (9) | All (5) |  |
|  |  | l12345m | Q M L | 30-210bpm (9) | All (5) |  |
|  |  | l1232123454321 | Q M L | 30-210bpm (9) | All (5) |  |
|  |  | l1358m | Q M L | 30-210bpm (9) | All (5) |  |
|  |  | l135368531 | Q M L | 30-210bpm (9) | All (5) |  |
|  |  | l135o1o3o5o4o275421 | Q M L | 30-210bpm (9) | All (5) |  |
|  |  | l12131415m | Q M L | 30-210bpm (9) | All (5) |  |
|  |  | l54535251m | Q M L | 30-210bpm (9) | All (5) |  |
|  |  | l14653451m | Q M L | 30-210bpm (9) | All (5) |  |
|  |  | l814653451m | Q M L | 30-210bpm (9) | All (5) |  |
|  |  | ls132435m | Q M L | 30-210bpm (9) | All (5) |  |
|  |  | ls135358m | Q M L | 30-210bpm (9) | All (5) |  |
|  |  | ls12131415m | Q M L | 30-210bpm (9) | All (5) |  |
|  |  | ls14653451m | Q M L | 30-210bpm (9) | All (5) |  |

*FIG. 10D*

| 550 | 552 | 554 | 556 | 558 | 560 | 562 |
|---|---|---|---|---|---|---|
| | Z | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G5185 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | I12345m | Q M L | 30-210bpm (9) | All (5) | |
| | | I1232123454321 | Q M L | 30-210bpm (9) | All (5) | |
| | | I1358m | Q M L | 30-210bpm (9) | All (5) | |
| | | I135358531 | Q M L | 30-210bpm (9) | All (5) | |
| | | I135o1o3o5o4o275421 | Q M L | 30-210bpm (9) | All (5) | |
| | | I12131415m | Q M L | 30-210bpm (9) | All (5) | |
| | | I54635251m | Q M L | 30-210bpm (9) | All (5) | |
| | | I14653451m | Q M L | 30-210bpm (9) | All (5) | |
| | | I814653451m | Q M L | 30-210bpm (9) | All (5) | |
| | N | SP | Q M L S | 30-210bpm (9) | All (5) | |
| | | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G5185 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | I12345m | Q M L | 30-210bpm (9) | All (5) | |
| | | I1232123454321 | Q M L | 30-210bpm (9) | All (5) | |
| | | I1358m | Q M L | 30-210bpm (9) | All (5) | |
| | | I135358531 | Q M L | 30-210bpm (9) | All (5) | |
| | | I135o1o3o5o4o275421 | Q M L | 30-210bpm (9) | All (5) | |
| | | I12131415m | Q M L | 30-210bpm (9) | All (5) | |
| | | I54535251m | Q M L | 30-210bpm (9) | All (5) | |
| | | I14653451m | Q M L | 30-210bpm (9) | All (5) | |
| | | I814653451m | Q M L | 30-210bpm (9) | All (5) | |
| | | Is132435m | Q M L | 30-210bpm (9) | All (5) | |
| | | Is135358m | Q M L | 30-210bpm (9) | All (5) | |
| | | Is12131415m | Q M L | 30-210bpm (9) | All (5) | |
| | | Is14653451m | Q M L | 30-210bpm (9) | All (5) | |

*FIG. 10E*

| 550 | 552 | 554 | 556 | 558 | 560 | 562 |
|---|---|---|---|---|---|---|
| S | | SP | Q M L S | 30-210bpm (9) | All (5) | |
| | | SPT | Q M L | 30-210bpm (9) | All (5) | |
| | | GPT151 | Q M L | 30-210bpm (9) | All (5) | |
| | | GPT181 | Q M L | 30-210bpm (9) | All (5) | |
| | | ls132435m | Q M L | 30-210bpm (9) | All (5) | |
| | | ls135358m | Q M L | 30-210bpm (9) | All (5) | |
| | | ls12131415m | Q M L | 30-210bpm (9) | All (5) | |
| | | ls14653451m | Q M L | 30-210bpm (9) | All (5) | |
| H | | SP | Q M L S | 30-210bpm (9) | All (5) | |
| | | SPT | Q M L | 30-210bpm (9) | All (5) | |
| | | GPT151 | Q M L | 30-210bpm (9) | All (5) | |
| | | GPT181 | Q M L | 30-210bpm (9) | All (5) | |
| | | h2345m | Q M L | 30-210bpm (9) | All (5) | |
| | | h232123454321 | Q M L | 30-210bpm (9) | All (5) | |
| | | h358m | Q M L | 30-210bpm (9) | All (5) | |
| | | h35358531 | Q M L | 30-210bpm (9) | All (5) | |
| | | h135c1o3o5o4o275421 | Q M L | 30-210bpm (9) | All (5) | |
| | | h12131415m | Q M L | 30-210bpm (9) | All (5) | |
| | | h4535251m | Q M L | 30-210bpm (9) | All (5) | |
| | | h14653451m | Q M L | 30-210bpm (9) | All (5) | |
| | | 814653451m | Q M L | 30-210bpm (9) | All (5) | |
| | | ls132435m | Q M L | 30-210bpm (9) | All (5) | Audio Samples |
| | | ls135358m | Q M L | 30-210bpm (9) | All (5) | 145 |
| | | ls12131415m | Q M L | 30-210bpm (9) | All (5) | Total Generated |
| | | ls14653451m | Q M L | 30-210bpm (9) | All (5) | 17145 |

| 550 | 552 | 554 | 556 | 558 | 560 | 562 |
|---|---|---|---|---|---|---|
| Formant | Feature | Pattern | Volume | Tempo | Variable | |
| O | None | S | Q M L S | 1s-25s (9) | All (5) | |
| | | SP | Q M L S | 30-210bpm (9) | All (5) | |
| | | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G5185 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | I12345m | Q M L | 30-210bpm (9) | All (5) | |
| | | I1232123454321 | Q M L | 30-210bpm (9) | All (5) | |
| | | I1358m | Q M L | 30-210bpm (9) | All (5) | |
| | | I135358531 | Q M L | 30-210bpm (9) | All (5) | |
| | | I135o1o3o5o4o275421 | Q M L | 30-210bpm (9) | All (5) | |
| | | I12131415m | Q M L | 30-210bpm (9) | All (5) | |
| | | I54535251m | Q M L | 30-210bpm (9) | All (5) | |
| | | I14653451m | Q M L | 30-210bpm (9) | All (5) | |
| | | I814653451m | Q M L | 30-210bpm (9) | All (5) | |
| | | Is132435m | Q M L | 30-210bpm (9) | All (5) | |
| | | Is135358m | Q M L | 30-210bpm (9) | All (5) | |
| | | Is12131415m | Q M L | 30-210bpm (9) | All (5) | |
| | | Is14653451m | Q M L | 30-210bpm (9) | All (5) | |
| | VR | S | Q | 1s-25s (9) | All (5) | |
| | | G151 | Q | 30-210bpm (9) | All (5) | |
| | | G181 | Q | 30-210bpm (9) | All (5) | |
| | | G15181 | Q | 30-210bpm (9) | All (5) | |
| | | IG123451 | Q | 30-210bpm (9) | All (5) | |
| | | IG13581 | Q | 30-210bpm (9) | All (5) | |
| | | I12345m | Q | 30-210bpm (9) | All (5) | |
| | | I1232123454321 | Q | 30-210bpm (9) | All (5) | Audio Samples |
| | | I1358m | Q | 30-210bpm (9) | All (5) | 35 |
| | | I135358531 | Q | 30-210bpm (9) | All (5) | Total Generated |
| | | I135o1o3o5o4o275421 | Q | 30-210bpm (9) | All (5) | 3420 |

| 550 | 552 | 554 | 556 | 558 | 560 | 562 |
|---|---|---|---|---|---|---|
| Formant | Feature | Pattern | Volume | Tempo | Variable | |
| Z | None | S | Q | 1s-26s (8) | All (5) | |
| | | SP | Q | 30-210bpm (9) | All (5) | |
| | | GPT151 | Q | 30-210bpm (9) | All (5) | |
| | | GPT181 | Q | 30-210bpm (9) | All (5) | |
| | | G151 | Q | 30-210bpm (9) | All (5) | |
| | | G181 | Q | 30-210bpm (9) | All (5) | |
| | | G15181 | Q | 30-210bpm (9) | All (5) | |
| | | G5185 | Q | 30-210bpm (9) | All (5) | |
| | | iG123451 | Q | 30-210bpm (9) | All (5) | |
| | | iG13581 | Q | 30-210bpm (9) | All (5) | |
| | | i12345m | Q | 30-210bpm (9) | All (5) | |
| | | i1232123454321 | Q | 30-210bpm (9) | All (5) | |
| | | i1358m | Q | 30-210bpm (9) | All (5) | |
| | | i136358531 | Q | 30-210bpm (9) | All (5) | |
| | | i135o1o3o6o4o275421 | Q | 30-210bpm (9) | All (5) | |
| | | i12131415m | Q | 30-210bpm (9) | All (5) | |
| | | i5463525 1m | Q | 30-210bpm (9) | All (5) | |
| | | i1465345 1m | Q | 30-210bpm (9) | All (5) | |
| | | i814653451m | Q | 30-210bpm (9) | All (5) | |
| | | is132435m | Q | 30-210bpm (9) | All (5) | Audio Samples |
| | | is135358m | Q | 30-210bpm (9) | All (5) | 24 |
| | | is12131415m | Q | 30-210bpm (9) | All (5) | Audio Samples |
| | | is14653451m | Q | 30-210bpm (9) | All (5) | 1035 |

| 550 Format | 552 Feature | 554 Pattern | 556 Volume | 558 Tempo | 560 Variable | 562 |
|---|---|---|---|---|---|---|
| A | None | S | Q M L S | 1s-25s (9) | All (5) | |
| | | SP | Q M L S | 30-210bpm (9) | All (5) | |
| | | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G5185 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | ll2345m | Q M L | 30-210bpm (9) | All (5) | |
| | | ll232123454321 | Q M L | 30-210bpm (9) | All (5) | |
| | | ll358m | Q M L | 30-210bpm (9) | All (5) | |
| | | ll35358631 | Q M L | 30-210bpm (9) | All (5) | |
| | | ll36o1c3o5o4o275421 | Q M L | 30-210bpm (9) | All (5) | |
| | | ll2131415m | Q M L | 30-210bpm (9) | All (5) | |
| | | l54535251m | Q M L | 30-210bpm (9) | All (5) | |
| | | ll4653451m | Q M L | 30-210bpm (9) | All (5) | |
| | | l81465345 1m | Q M L | 30-210bpm (9) | All (5) | |
| | | ls132435m | Q M L | 30-210bpm (9) | All (5) | |
| | | ls136358m | Q M L | 30-210bpm (9) | All (5) | |
| | | ls12131415m | Q M L | 30-210bpm (9) | All (5) | |
| | | ls14653451m | Q M L | 30-210bpm (9) | All (5) | |
| | VFI | S | Q S | 1s-25s (9) | All (5) | |
| | | G151 | Q | 30-210bpm (9) | All (5) | |
| | | G181 | Q | 30-210bpm (9) | All (5) | |
| | | G15181 | Q | 30-210bpm (9) | All (5) | |
| | | IG123451 | Q | 30-210bpm (9) | All (5) | |
| | | IG13581 | Q | 30-210bpm (9) | All (5) | |
| | | ll2345m | Q | 30-210bpm (9) | All (5) | |
| | | ll232123454321 | Q | 30-210bpm (9) | All (5) | |
| | | ll358m | Q | 30-210bpm (9) | All (5) | |
| | | ll35358631 | Q | 30-210bpm (9) | All (5) | |
| | | ll36o1c3o5o4o275421 | Q | 30-210bpm (9) | All (5) | |
| | VFP | S | Q | 1s-25s (9) | All (5) | |
| | | G151 | Q | 30-210bpm (9) | All (5) | |
| | | IG123451 | Q | 30-210bpm (9) | All (5) | |
| | | ll2345m | Q | 30-210bpm (9) | All (5) | |

*FIG. 10I*

| 550 | 552 | 554 | 556 | 558 | 560 | 562 |
|---|---|---|---|---|---|---|
| | M | SP | Q M L | 30-210bpm (9) | All (5) | |
| | | G151 | Q M | 30-210bpm (9) | All (5) | |
| | | G181 | Q M | 30-210bpm (9) | All (5) | |
| | | G15181 | Q M | 30-210bpm (9) | All (5) | |
| | | G5185 | Q M | 30-210bpm (9) | All (5) | |
| | | G123451 | Q M | 30-210bpm (9) | All (5) | |
| | | G13581 | Q M | 30-210bpm (9) | All (5) | |
| | | l2345m | Q M L | 30-210bpm (9) | All (5) | |
| | | l232123454321 | Q M L | 30-210bpm (9) | All (5) | |
| | | l358m | Q M L | 30-210bpm (9) | All (5) | |
| | | l135358531 | Q M L | 30-210bpm (9) | All (5) | |
| | | l135o1o3o5o4o275421 | Q M L | 30-210bpm (9) | All (5) | |
| | | l12131415m | Q M L | 30-210bpm (9) | All (5) | |
| | | l5453625lm | Q M L | 30-210bpm (9) | All (5) | |
| | | l14653451m | Q M L | 30-210bpm (9) | All (5) | |
| | | l814653451m | Q M L | 30-210bpm (9) | All (5) | |
| | | ls132435m | Q M L | 30-210bpm (9) | All (5) | |
| | | ls135358m | Q M L | 30-210bpm (9) | All (5) | |
| | | ls12131415m | Q M L | 30-210bpm (9) | All (5) | |
| | | ls14653451m | Q M L | 30-210bpm (9) | All (5) | |
| | G | SP | Q M L S | 30-210bpm (9) | All (5) | |
| | | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G5185 | Q M L | 30-210bpm (9) | All (5) | |
| | | G123451 | Q M L | 30-210bpm (9) | All (5) | |
| | | G13581 | Q M L | 30-210bpm (9) | All (5) | |
| | | l2345m | Q M L | 30-210bpm (9) | All (5) | |
| | | l232123454321 | Q M L | 30-210bpm (9) | All (5) | |
| | | l358m | Q M L | 30-210bpm (9) | All (5) | |
| | | l135358531 | Q M L | 30-210bpm (9) | All (5) | |
| | | l135o1o3o5o4o275421 | Q M L | 30-210bpm (9) | All (5) | |
| | | l12131415m | Q M L | 30-210bpm (9) | All (5) | |
| | | l5453625lm | Q M L | 30-210bpm (9) | All (5) | |
| | | l14653451m | Q M L | 30-210bpm (9) | All (5) | |
| | | l814653451m | Q M L | 30-210bpm (9) | All (5) | |
| | | ls132435m | Q M L | 30-210bpm (9) | All (5) | |
| | | ls135358m | Q M L | 30-210bpm (9) | All (5) | |
| | | ls12131415m | Q M L | 30-210bpm (9) | All (5) | |
| | | ls14653451m | Q M L | 30-210bpm (9) | All (5) | |

*FIG. 10J*

| 550 | 552 | 554 | 556 | 558 | 560 | 562 |
|---|---|---|---|---|---|---|
| L | | SP | Q M L S | 30-210bpm (9) | All (5) | |
| | | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G5185 | Q M L | 30-210bpm (9) | All (5) | |
| | | IG123451 | Q M L | 30-210bpm (9) | All (5) | |
| | | I313581 | Q M L | 30-210bpm (9) | All (5) | |
| | | I12346m | Q M L | 30-210bpm (9) | All (5) | |
| | | I1232123454321 | Q M L | 30-210bpm (9) | All (5) | |
| | | I1358m | Q M L | 30-210bpm (9) | All (5) | |
| | | I135358531 | Q M L | 30-210bpm (9) | All (5) | |
| | | I135o1o3o5o4o275421 | Q M L | 30-210bpm (9) | All (5) | |
| | | I12131415m | Q M L | 30-210bpm (9) | All (5) | |
| | | I54535251m | Q M L | 30-210bpm (9) | All (5) | |
| | | I1465345 1m | Q M L | 30-210bpm (9) | All (5) | |
| | | I814653451m | Q M L | 30-210bpm (9) | All (5) | |
| | | Is132435m | Q M L | 30-210bpm (9) | All (5) | |
| | | Is135358m | Q M L | 30-210bpm (9) | All (5) | |
| | | Is12131415m | Q M L | 30-210bpm (9) | All (5) | |
| | | Is1465345 1m | Q M L | 30-210bpm (9) | All (5) | |
| | L/G | IG123451 | Q M L | 30-210bpm (9) | All (5) | |
| | | IG13581 | Q M L | 30-210bpm (9) | All (5) | |
| | | I12346m | Q M L | 30-210bpm (9) | All (5) | |
| | | I1232123454321 | Q M L | 30-210bpm (9) | All (5) | |
| | | I1358m | Q M L | 30-210bpm (9) | All (5) | |
| | | I135358531 | Q M L | 30-210bpm (9) | All (5) | |
| | | I135o1o3o5o4o275421 | Q M L | 30-210bpm (9) | All (5) | |
| | | I12131415m | Q M L | 30-210bpm (9) | All (5) | |
| | | I54535251m | Q M L | 30-210bpm (9) | All (5) | |
| | | I1465345 1m | Q M L | 30-210bpm (9) | All (5) | |
| | | I814653451m | Q M L | 30-210bpm (9) | All (5) | |
| | | Is132435m | Q M L | 30-210bpm (9) | All (5) | |
| | | Is135358m | Q M L | 30-210bpm (9) | All (5) | |
| | | Is12131415m | Q M L | 30-210bpm (9) | All (5) | |
| | | Is1465345 1m | Q M L | 30-210bpm (9) | All (5) | |

*FIG. 10K*

| 550 | 552 | 554 | 556 | 558 | 560 | 562 |
|---|---|---|---|---|---|---|
| | H | SP | Q M L S | 30-210bpm (9) | All (5) | |
| | | SPT | Q M L | 30-210bpm (9) | All (5) | |
| | | GPT151 | Q M L | 30-210bpm (9) | All (5) | |
| | | GPT181 | Q M L | 30-210bpm (9) | All (5) | |
| | | i12345m | Q M L | 30-210bpm (9) | All (5) | |
| | | i1232123454321 | Q M L | 30-210bpm (9) | All (5) | |
| | | i1358m | Q M L | 30-210bpm (9) | All (5) | |
| | | i135358531 | Q M L | 30-210bpm (9) | All (5) | |
| | | i135o1o3o5o4o275421 | Q M L | 30-210bpm (9) | All (5) | |
| | | i12131415m | Q M L | 30-210bpm (9) | All (5) | |
| | | is463525 1m | Q M L | 30-210bpm (9) | All (5) | |
| | | i14653451m | Q M L | 30-210bpm (9) | All (5) | |
| | | is14653451m | Q M L | 30-210bpm (9) | All (5) | |
| | | is132435m | Q M L | 30-210bpm (9) | All (5) | Audio Samples 128 |
| | | is135358m | Q M L | 30-210bpm (9) | All (5) | |
| | | is12131415m | Q M L | 30-210bpm (9) | All (5) | Total Generated |
| | | is14653451m | Q M L | 30-210bpm (9) | All (5) | 15930 |

| 550 | 552 | 554 | 556 | 558 | 560 | 562 |
|---|---|---|---|---|---|---|
| Formant | Feature | Pattern | Volume | Tempo | Variable | |
| Uh (low larynx) | M | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G6185 | Q M L | 30-210bpm (9) | All (5) | |
| | | i12345m | Q M L | 30-210bpm (9) | All (5) | |
| | | i1358m | Q M L | 30-210bpm (9) | All (5) | |
| | | i135358531 | Q M L | 30-210bpm (9) | All (5) | |
| | | i135o1o3o5o4o275421 | Q M L | 30-210bpm (9) | All (5) | |
| | | i14653451m | Q M L | 30-210bpm (9) | All (5) | |
| | G | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G6185 | Q M L | 30-210bpm (9) | All (5) | |
| | | i12345m | Q M L | 30-210bpm (9) | All (5) | |
| | | i1358m | Q M L | 30-210bpm (9) | All (5) | Audio Samples 21 |
| | | i135358531 | Q M L | 30-210bpm (9) | All (5) | |
| | | i135o1o3o5o4o275421 | Q M L | 30-210bpm (9) | All (5) | Total Generated |
| | | i14653451m | Q M L | 30-210bpm (9) | All (5) | 2430 |

| 550 Formant | 552 Feature | 554 Pattern | 556 Volume | 558 Tempo | 560 Variable | 562 |
|---|---|---|---|---|---|---|
| E/A | None | S | Q M L | 1s-25s (9) | All (5) | |
| | | G151 | Q M L | 30-210bpm (9) | All (5) | |
| | | G181 | Q M L | 30-210bpm (9) | All (5) | |
| | | G15181 | Q M L | 30-210bpm (9) | All (5) | |
| | | G5185 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | I12345m | Q M L | 30-210bpm (9) | All (5) | |
| | | I1232123454321 | Q M L | 30-210bpm (9) | All (5) | |
| | | I1358m | Q M L | 30-210bpm (9) | All (5) | |
| | | I135358531 | Q M L | 30-210bpm (9) | All (5) | |
| | | I135o1o3o5o4o275421 | Q M L | 30-210bpm (9) | All (5) | |
| | VFI | S | Q | 1s-25s (9) | All (5) | |
| | | G151 | Q | 30-210bpm (9) | All (5) | |
| | | G181 | Q | 30-210bpm (9) | All (5) | |
| | | G15181 | Q | 30-210bpm (9) | All (5) | |
| | | IG123451 | Q | 30-210bpm (9) | All (5) | |
| | | IG13581 | Q | 30-210bpm (9) | All (5) | |
| | | I12345m | Q | 30-210bpm (9) | All (5) | |
| | | I1232123454321 | Q | 30-210bpm (9) | All (5) | |
| | | I1358m | Q | 30-210bpm (9) | All (5) | |
| | | I135358531 | Q | 30-210bpm (9) | All (5) | |
| | | I135o1o3o5o4o275421 | Q | 30-210bpm (9) | All (5) | |
| | VFF | S | Q | 1s-25s (9) | All (5) | |
| | | G151 | Q | 30-210bpm (9) | All (5) | |
| | | IG123451 | Q | 30-210bpm (9) | All (5) | |
| | | I12345m | Q | 30-210bpm (9) | All (5) | |
| | M | G15181 | Q M | 30-210bpm (9) | All (5) | |
| | | G5185 | Q M | 30-210bpm (9) | All (5) | |
| | | IG123451 | Q M L | 30-210bpm (9) | All (5) | |
| | | IG13581 | Q M L | 30-210bpm (9) | All (5) | |
| | | I12345m | Q M L | 30-210bpm (9) | All (5) | |
| | | I1232123454321 | Q M | 30-210bpm (9) | All (5) | |
| | | I1358m | Q M L | 30-210bpm (9) | All (5) | |
| | | I135358531 | Q M L | 30-210bpm (9) | All (5) | |
| | | I135o1o3o5o4o275421 | Q M L | 30-210bpm (9) | All (5) | |
| | G | G15181 | Q M L | 30-210bpm (9) | All (5) | |
| | | G5185 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | I12345m | Q M L | 30-210bpm (9) | All (5) | |
| | | I1232123454321 | Q M L | 30-210bpm (9) | All (5) | |
| | | I1358m | Q M L | 30-210bpm (9) | All (5) | |
| | | I135358531 | Q M L | 30-210bpm (9) | All (5) | |
| | | I135o1o3o5o4o275421 | Q M L | 30-210bpm (9) | All (5) | |

*FIG. 10N*

| 550 | 552 | 554 | 556 | 558 | 560 | 562 |
|---|---|---|---|---|---|---|
| | H | GPT161 | Q M L | 30-210bpm (9) | All (5) | |
| | | GPT181 | Q M L | 30-210bpm (9) | All (5) | |
| | | !12345m | Q M L | 30-210bpm (9) | All (5) | |
| | | !1233123454321 | Q M L | 30-210bpm (9) | All (5) | |
| | | !1358m | Q M L | 30-210bpm (9) | All (5) | |
| | | !135358531 | Q M L | 30-210bpm (9) | All (5) | |
| | | !135o1o3o5o4o275421 | Q M L | 30-210bpm (9) | All (5) | |
| | | !12131415m | Q M L | 30-210bpm (9) | All (5) | |
| | | !5453525 1m | Q M L | 30-210bpm (9) | All (5) | |
| | | is132435m | Q M L | 30-210bpm (9) | All (5) | Audio Samples |
| | | is136358m | Q M L | 30-210bpm (9) | All (5) | 64 |
| | | is12131415m | Q M L | 30-210bpm (9) | All (5) | Total Generated |
| | | is14853451m | Q M L | 30-210bpm (9) | All (5) | 8345 |

| 550 | 552 | 554 | 556 | 558 | 560 | 562 |
|---|---|---|---|---|---|---|
| Format | Feature | Pattern | Volume | Tempo | Variable | |
| A/E/A/O/O | None | S | Q M L S | 1s-25s (9) | All (5) | |
| | | G15181 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | !12345m | Q M L | 30-210bpm (9) | All (5) | |
| | | !135358531 | Q M L | 30-210bpm (9) | All (5) | |
| | | !135o1o3o5o4o275421 | Q M L | 30-210bpm (9) | All (5) | |
| | VR | S | Q S | 1s-25s (9) | All (5) | |
| | | G15181 | Q | 30-210bpm (9) | All (5) | |
| | | IG123451 | Q | 30-210bpm (9) | All (5) | |
| | | IG13581 | Q | 30-210bpm (9) | All (5) | |
| | | !12345m | Q | 30-210bpm (9) | All (5) | |
| | | !135358531 | Q | 30-210bpm (9) | All (5) | |
| | | !135o1o3o5o4o275421 | Q | 30-210bpm (9) | All (5) | |
| | VFP | S | Q | 1s-25s (9) | All (5) | |
| | | !12345m | Q | 30-210bpm (9) | All (5) | |
| | M | S | Q M L | 1s-25s (9) | All (5) | |
| | | G15181 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | !12345m | Q M L | 30-210bpm (9) | All (5) | |
| | | !135358531 | Q M L | 30-210bpm (9) | All (5) | |
| | | !135o1o3o5o4o275421 | Q M L | 30-210bpm (9) | All (5) | |
| | G | S | Q M L | 1s-25s (9) | All (5) | |
| | | G15181 | Q M L | 30-210bpm (9) | All (5) | |
| | | IG123451 | Q M L | 30-210bpm (9) | All (5) | |
| | | IG13581 | Q M L | 30-210bpm (9) | All (5) | |
| | | !12345m | Q M L | 30-210bpm (9) | All (5) | |
| | | !135358531 | Q M L | 30-210bpm (9) | All (5) | |
| | | !135o1o3o5o4o275421 | Q M L | 30-210bpm (9) | All (5) | |
| | H | S | Q M L | 30-210bpm (9) | All (5) | |
| | | SP | Q M L | 30-210bpm (9) | All (5) | Audio Samples |
| | | !12345m | Q M L | 30-210bpm (9) | All (5) | 41 |
| | | !135358531 | Q M L | 30-210bpm (9) | All (5) | Total Generated |
| | | !135o1o3o5o4o275421 | Q M L | 30-210bpm (9) | All (5) | 4005 |

| KEY (568) | DESCRIPTION (570) |
|---|---|
| S | Single Note |
| P | Pulse |
| T | Triplet |
| G | Glissando |
| I | Intervals |
| Is | Interval Staccato |
| BPM | Beats Per Minute |
| Volume | Q = Quiet, M = Medium, L = Loud, S = Swell |
| Tempo | 30-210bpm (9) = 30, 44, 60, 78, 98, 120, 146, 176, 210 bpm |
| Variables | All (6) = None, Neck Circle, Lay Down, Stretch, Cardio |
| Audio Samples | Voiced Audio Files |
| Generated Total | Total possible exercises calculator can generate |

FIG. 10Q

| KEY (572) | PATTERNS (574) | BPM 1sec (576) | BPM 2sec (578) | BPM 4sec (580) | BPM 6sec (582) | BPM 9sec (584) | BPM 12sec (586) | BPM 16sec (588) | BPM 20sec (590) | BPM 25sec (592) |
|---|---|---|---|---|---|---|---|---|---|---|
| S | 1 | 1sec | 2sec | 4sec | 6sec | 9sec | 12sec | 16sec | 20sec | 25sec |
| SP | 1 1 1 1 1 | 30 | 44 | 60 | 78 | 98 | 120 | 146 | 176 | 210 |
| SPT | 1-111 | 30 | 44 | 60 | 78 | 98 | 120 | 146 | 176 | 210 |
| GPT151 | 1-1111 - 5-5555 - 1-1111 | 30 | 44 | 60 | 78 | 98 | 120 | 146 | 176 | 210 |
| GPT181 | 1-1111 - 8-8888 - 1-1111 | 30 | 44 | 60 | 78 | 98 | 120 | 146 | 176 | 210 |
| G151 | 1 - 5 - 1 | 30 | 44 | 60 | 78 | 98 | 120 | 146 | 176 | 210 |
| G181 | 1 - 8 - 1 | 30 | 44 | 60 | 78 | 98 | 120 | 146 | 176 | 210 |
| G15181 | 1 - 5 - 1 - 8 - 1 | 30 | 44 | 60 | 78 | 98 | 120 | 146 | 176 | 210 |
| G5185 | 5 - 1 - 8 - 5 | 30 | 44 | 60 | 78 | 98 | 120 | 146 | 176 | 210 |
| IG12345 1 | 1 2 3 4 5 - 1 | 30 | 44 | 60 | 78 | 98 | 120 | 146 | 176 | 210 |
| IG1358 1 | 1 3 5 8 - 1 | 30 | 44 | 60 | 78 | 98 | 120 | 146 | 176 | 210 |
| I12345m | 1 2 3 4 5 4 3 2 1 | 30 | 44 | 60 | 78 | 98 | 120 | 146 | 176 | 210 |
| I1232123454321 | 1 2 3 2 1 2 3 4 5 4 3 2 1 | 30 | 44 | 60 | 78 | 98 | 120 | 146 | 176 | 210 |
| I1358m | 1 3 5 8 5 3 1 | 30 | 44 | 60 | 78 | 98 | 120 | 146 | 176 | 210 |
| I135358531 | 1 3 5 3 1 3 5 8 5 3 1 | 30 | 44 | 60 | 78 | 98 | 120 | 146 | 176 | 210 |
| I13o1o3o5o4o275421 | 1 3 5 o1 o3 o5 o4 o2 7 5 4 2 1 | 30 | 44 | 60 | 78 | 98 | 120 | 146 | 176 | 210 |
| I12131415m | 1 2 1 3 1 4 1 5 1 4 1 3 1 2 1 | 30 | 44 | 60 | 78 | 98 | 120 | 146 | 176 | 210 |
| I5453525 1m | 5 4 5 3 5 2 5 1 5 2 5 3 5 4 5 | 30 | 44 | 60 | 78 | 98 | 120 | 146 | 176 | 210 |
| I14653451m | 1 4 6 5 3 4 5 1 5 4 3 5 6 4 1 | 30 | 44 | 60 | 78 | 98 | 120 | 146 | 176 | 210 |
| 814653451m | 8 1 4 6 5 3 4 5 1 5 4 3 5 6 4 1 8 | 30 | 44 | 60 | 78 | 98 | 120 | 146 | 176 | 210 |
| Is132435m | 1 3 2 4 3 5 4 3 2 1 | 30 | 44 | 60 | 78 | 98 | 120 | 146 | 176 | 210 |
| Is135358m | 1 3 5 3 5 8 5 3 1 | 30 | 44 | 60 | 78 | 98 | 120 | 146 | 176 | 210 |
| Is12131415m | 1 2 1 3 1 4 1 5 1 4 1 3 1 2 1 | 30 | 44 | 60 | 78 | 98 | 120 | 146 | 176 | 210 |
| Is14653451m | 1 4 6 5 3 4 5 1 5 4 3 5 6 4 1 | 30 | 44 | 60 | 78 | 98 | 120 | 146 | 176 | 210 |

CUSTOMIZABLE SYSTEM AND DEVICE FOR DEFINING VOICE DIMENSIONS AND METHODS OF USE

CROSS-REFERENCE TO RELATED APPLICATIONS

This application claims priority to U.S. Provisional Patent Application Ser. No. 61/889,960, filed Oct. 11, 2013, which is hereby incorporated by reference in its entirety.

FIELD OF THE INVENTION

The present disclosure relates to a customizable system for modifying voice dimensions and its method of use.

BACKGROUND OF THE INVENTION

The oldest manmade musical (pitched) instrument, a bone flute, dates back over 40 thousand years. The bone flute suggests that the human instrument for singing has been around long before that. Cultures upon cultures, generation after generation, have contributed and influenced all 7.1 billion people in the world today. However, it's only been over the last forty or so years that experts in the field of neurology, otolaryngology, speech therapy, and vocology have been able to explain exactly how the vocal-instrument works. This is due primarily to the recent advancements in modern technology.

Throughout this recent journey of discovery there has been countless studies showing the physical, emotional, and psychological benefits to singing. These benefits include stimulating the release of dopamine (the brain neurochemical responsible for pleasure and reward), stimulating the release of serotonin (a neurotransmitter associated with feelings of euphoria and contentment), stimulating the release of prolactin (has a tranquilizing, consoling effect which is why sad music makes us feel better), increasing levels of Immunoglobulin A (increases the strength of the immune system and decreases stress levels), increasing levels of oxytocin (promoting social affiliation and trust), modifying and regulating automatic systems such as heart rate, respiration rate, perspiration and other automatic systems. In addition, singing has been shown to significantly improve patients suffering from speech deficit conditions, pain, anxiety, asthma, lung disease, autism, mood disorders, Parkinson's, substance abuse, Alzheimer's, sleep apnea, memory loss, and low self-esteem. The above improvements might explain why singing has played such a powerful role in the fundamental development of the human psyche, and continues to be one of the most important means of self-expression, social status, and self-healing throughout the world.

Currently, the music industry alone is a multibillion-dollar market, which includes TV shows, musical acts, and music sales that influence the world-over every day. In addition to professional singers and patients seeking vocal therapy for a variety of conditions, there are hundreds of thousands of public speakers, educators, actors, and other professionals that rely heavily on their ability to speak and maintain a healthy voice. No matter the reason, developing a strong and well balanced [voice? ] is key.

When it comes to vocalizing, it takes more than just the use of the vocal folds (vocal cords) to produce sound. People verbalise sound using intrinsic muscles of the larynx, corresponding breathing muscles, the vocal tract, and much more.

A number of voice changing software exists in today's market. Different aspects of a recorded voice may be modified for the purpose of disguising a recorded voice, creating a new voice from the recorded voice, and improving the sound of the recorded voice. This type of software works on a voice that is recorded and is not intended to modify a voice that is not recorded.

Singing computer programs, computer applications or "apps" have also been established that help to improve a person's singing voice through voice exercises. Apps such as these are not able to allow a person to create an exercise of their own to focus on one or multiple particular aspects of their voice, whether a singer or professional speaker.

Accordingly, a need exists for an efficient, interactive, customizable, and mindful practice routine for modifying vocal dimensions with a safe and universal approach.

BRIEF SUMMARY OF THE INVENTION

The disclosure at hand provides a customizable system for defining voice dimensions. The system, in certain aspects, comprises a program interface located on an electronic device. The program interface can be used to manipulate user input from one or more individuals relating to voice parameters. Instructions can then be created by the program interface to allow for one or more individuals to modify their voice dimensions.

The disclosure further provides a method for modifying an individual's voice dimensions. The method comprises identifying one or more dimensions in an individual's voice that are to be modified. On an electronic device, a voice exercise can be created by selecting at least one parameter that modifies the one or more dimensions in an individual's voice. Instructions created by the electronic device that are based on the selection of at least one parameter are then followed by the individual.

The dimensions referred to in the system and method may include one or some, in any possible combination, flexibility, breathing, intonation, range, tone, articulation, and strength.

Accordingly, it is one object of the current disclosure to overcome the limitations of the existing voice modifying programs by allowing an individual a more efficient, interactive, customizable and mindful practice routine.

These and other aspects of the disclosed subject matter, as well as additional novel features, will be apparent from the description provided herein. Provided, however, any particular embodiment need not contain all of the aspects and an aspect or aspects, in any possible combination, from one embodiment may be implemented in another embodiment and remain within the scope of this disclosure. Furthermore, any particular aspect may be removed from one or more embodiments and remain within the scope of this disclosure. The intent of this summary is not to be a comprehensive description of the subject matter, but rather to provide a short overview of some of the subject matter's functionality. Other systems, methods, features and advantages here provided will become apparent to one with skill in the art, who has the benefit of this invention's teachings, upon examination of the following FIGURES and detailed description. It is intended that at least one such additional systems, methods, features and advantages that are included within this description, be within the scope of any claims herein or filed later.

BRIEF DESCRIPTION OF THE DRAWINGS

Novel and nonobvious features believed characteristic of the disclosed subject matter will be set forth in claims that follow. The disclosed subject matter itself, however, as well as certain particular modes of use, further objectives, and advantages thereof, will be understood by reference to the following detailed description of illustrative embodiments when read in conjunction with the accompanying drawings, wherein:

FIG. IF depicts an internal view of the cricothyroids of a human body.

Figure 1A:
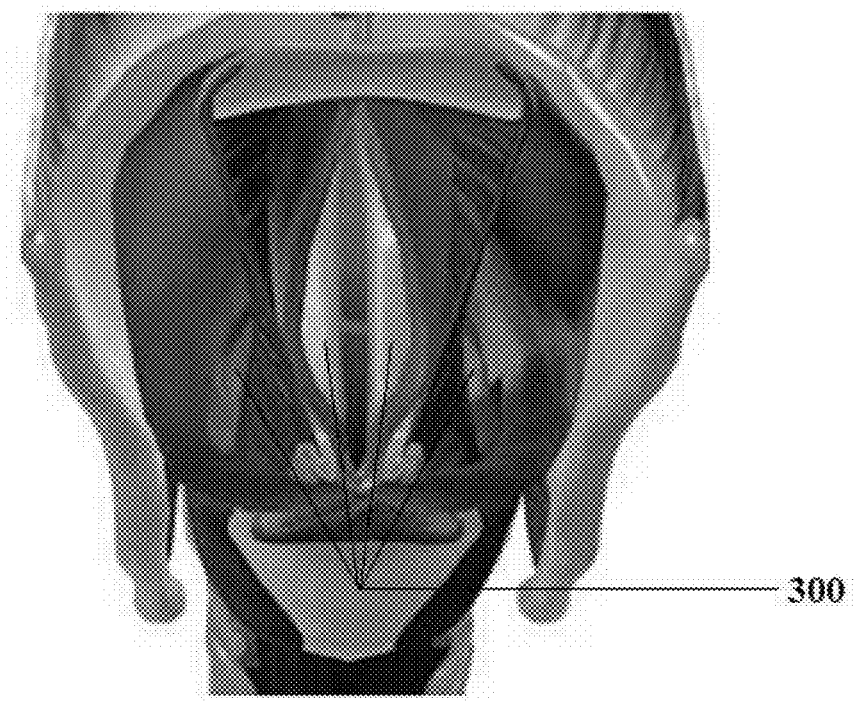
FIG. 1A depicts an internal view of the vocal folds of a human body.
Figure 1B:
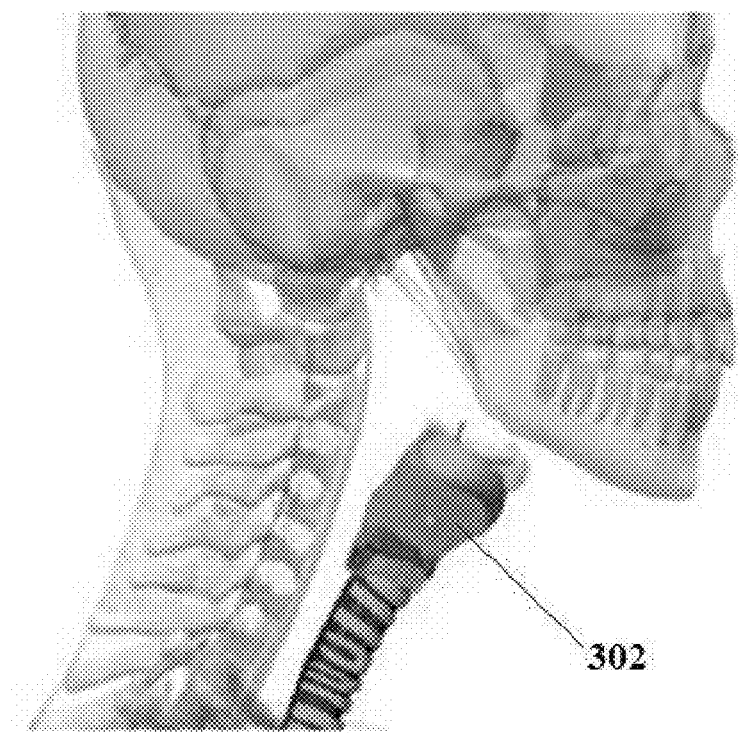
FIG. 1B depicts an internal view of the larynx of a human body.
Figure 1C:
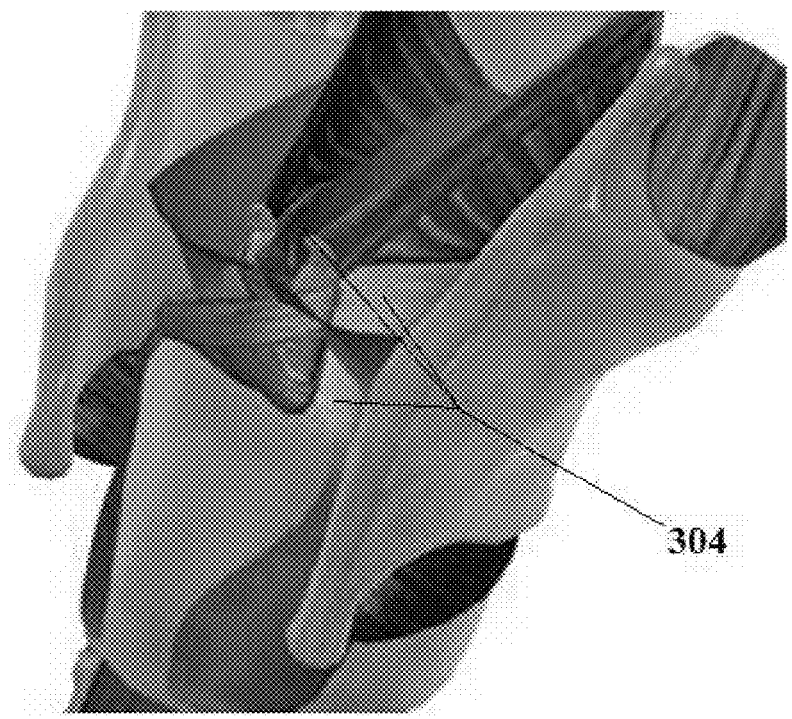
FIG. 1C depicts an internal view of the thyroarytenoid of a human body.
Figure 1D:
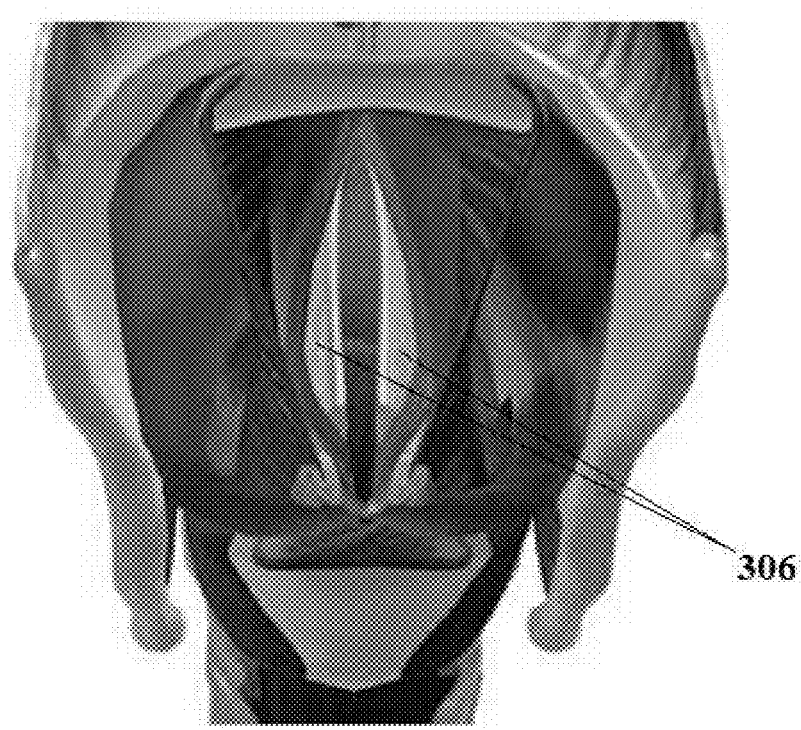
FIG. 1D depicts an internal view of the vocalis of a human body.
Figure 1E:
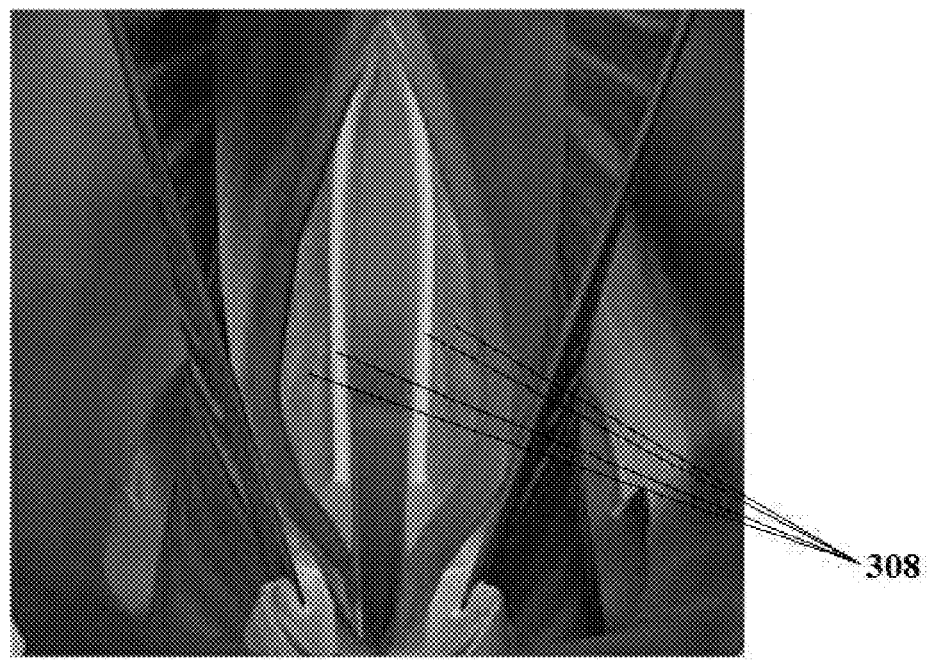
FIG. 1E depicts an internal view of the superficial lamina propria of a human body.
Figure 1F:
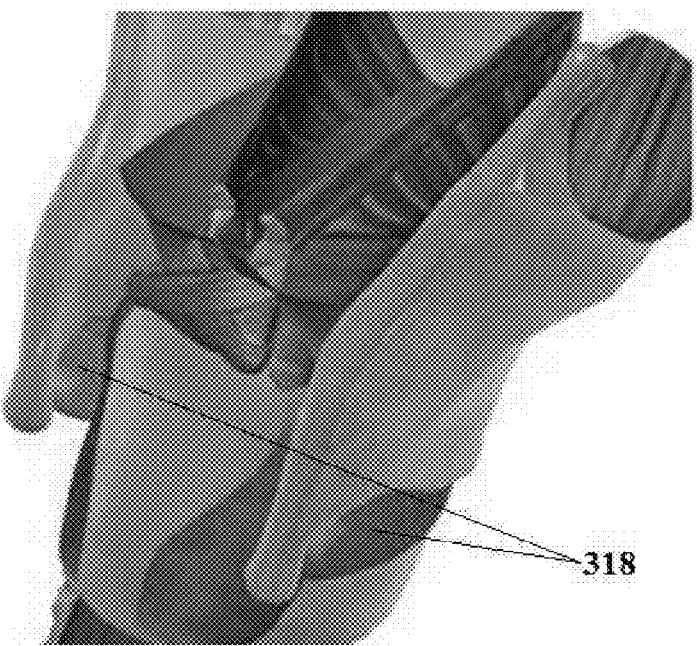
Figure 1G:
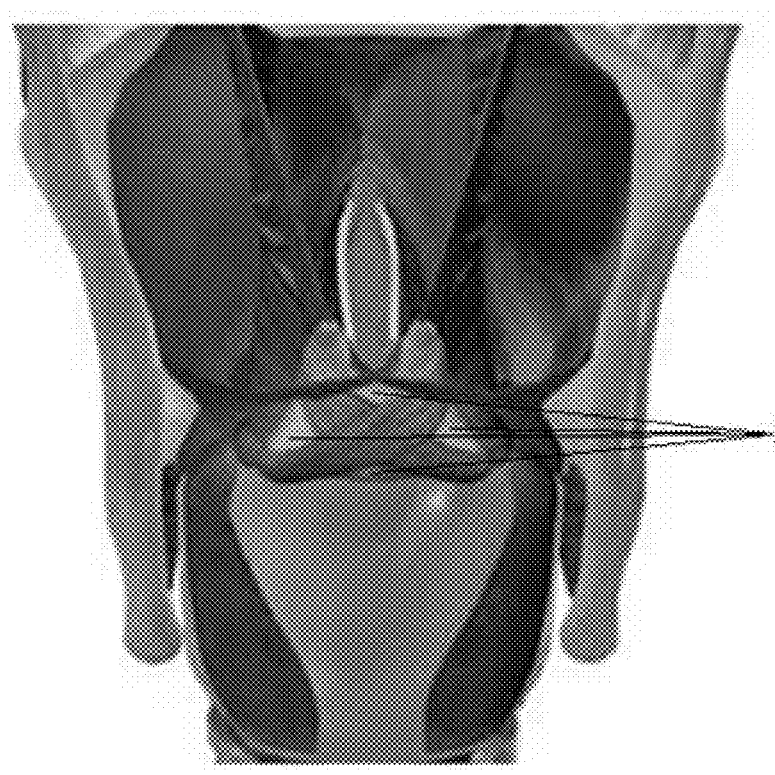

FIG. 1G depicts an internal view of the transverse arytenoid of a human body.

Figure 1H:
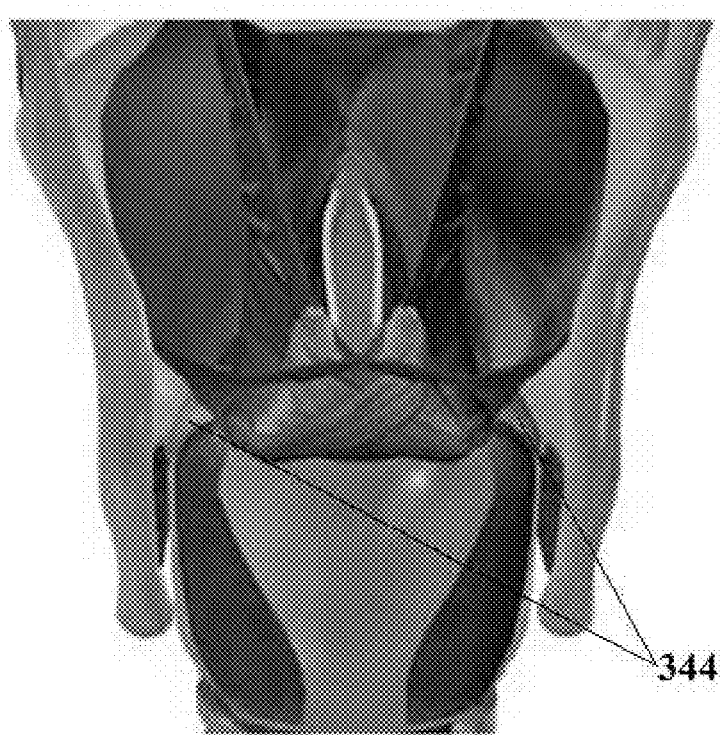

FIG. 1H depicts an internal view of the lateral cricoarytenoid of a human body.

Figure 1I:
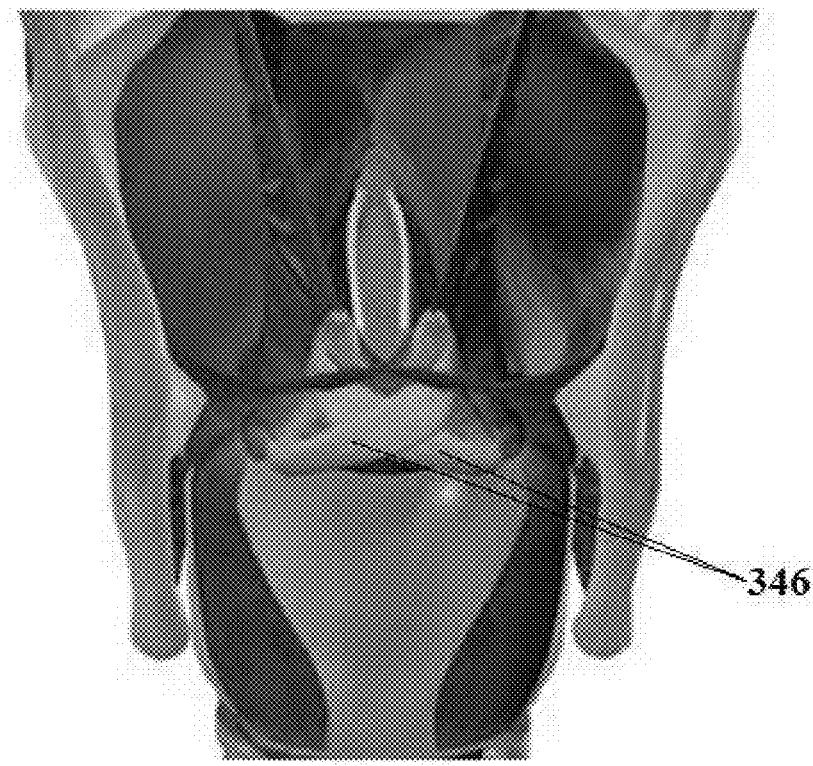

FIG. 1I depicts an internal view of the oblique arytenoid of a human body.

Figure 1J:
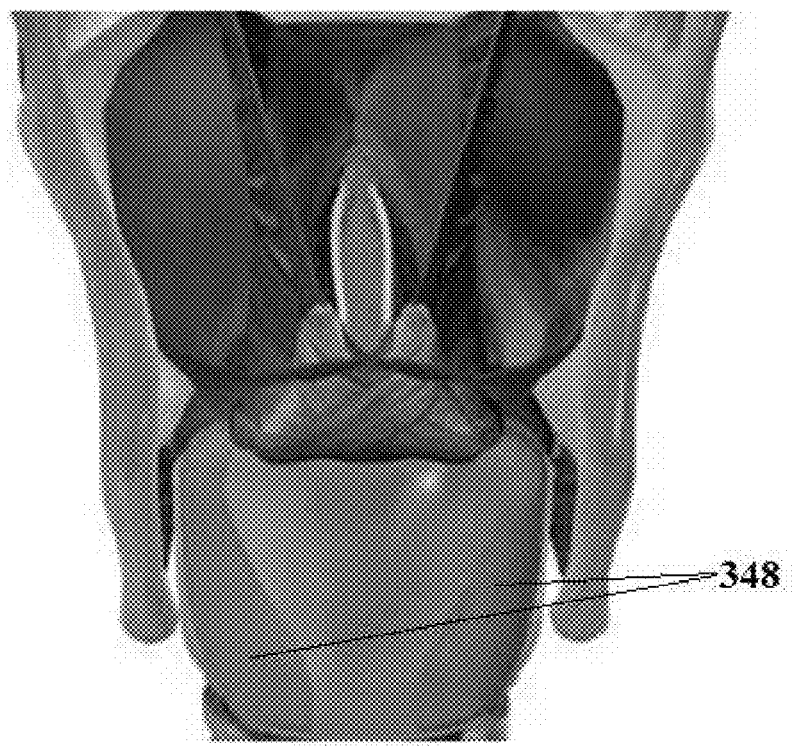

FIG. 1J depicts an internal view of the posterior cricoarytenoid of a human body.

Figure 2A:
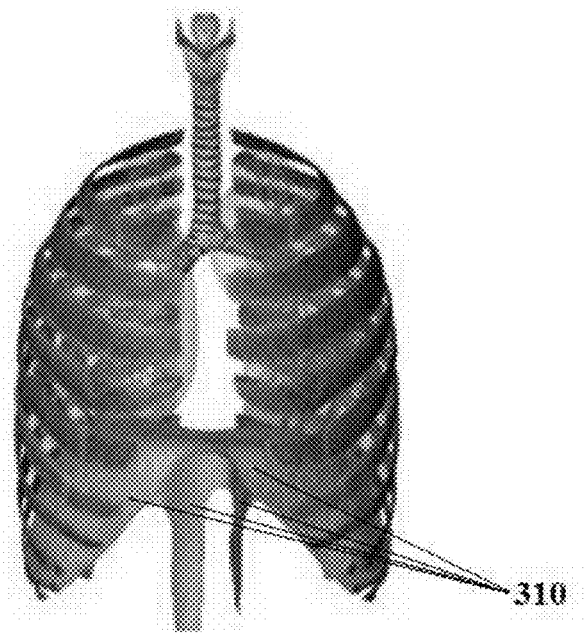

FIG. 2A depicts an internal view of the diaphragm of a human body.

Figure 2B:
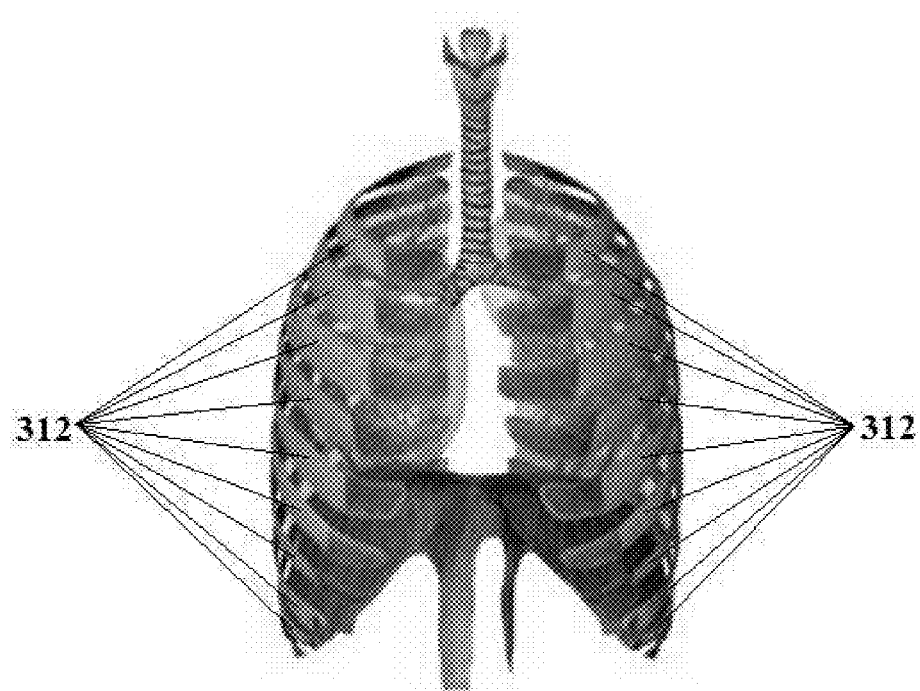

FIG. 2B depicts an internal view of the external intercostal of a human body.

Figure 2C:
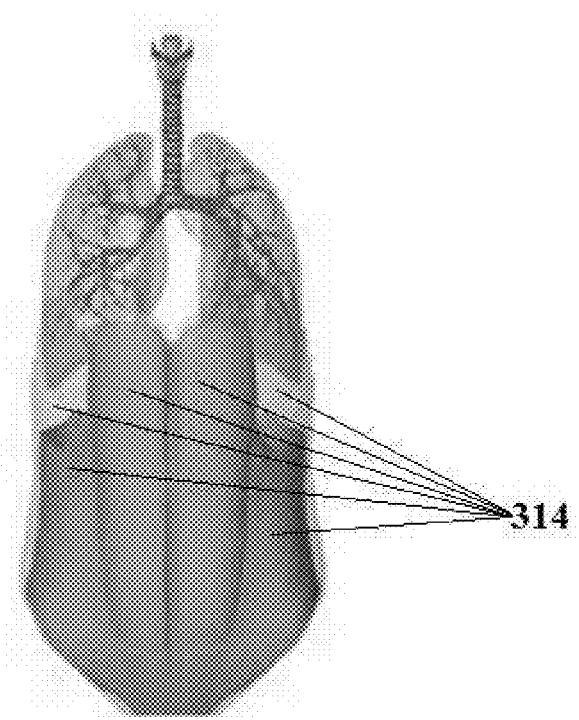

FIG. 2C depicts an internal view of the abdominal muscles of a human body.

Figure 2D:
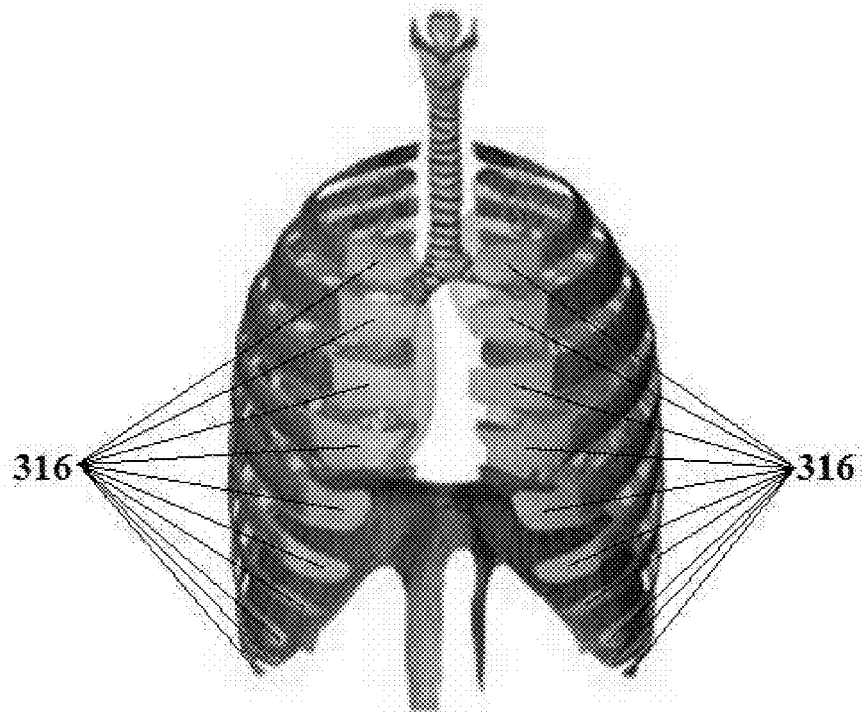

FIG. 2D depicts an internal view of the internal intercostal of a human body.

Figure 3A:
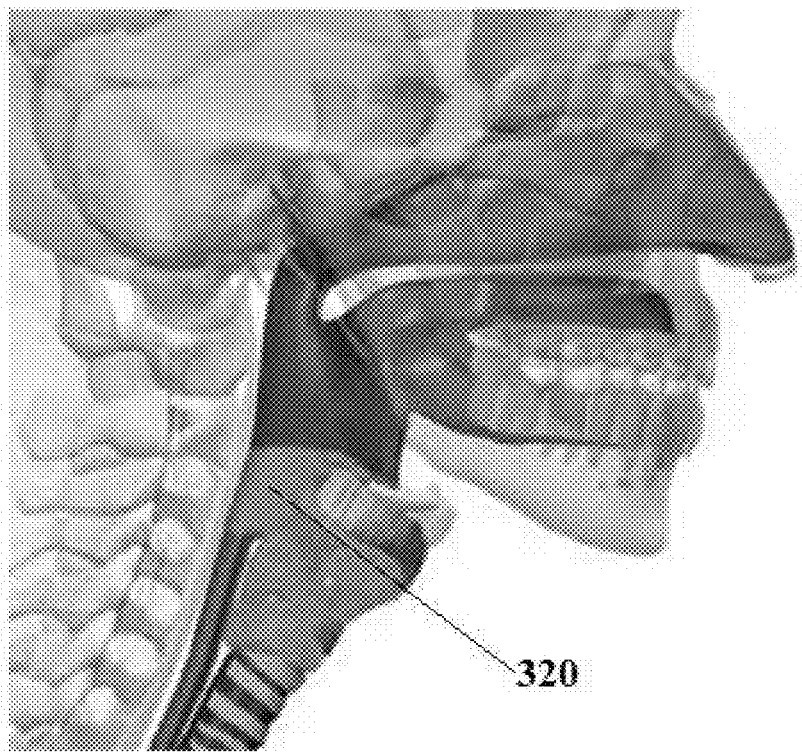

FIG. 3A depicts an internal view of the laryngopharynx of a human body.

Figure 3B:
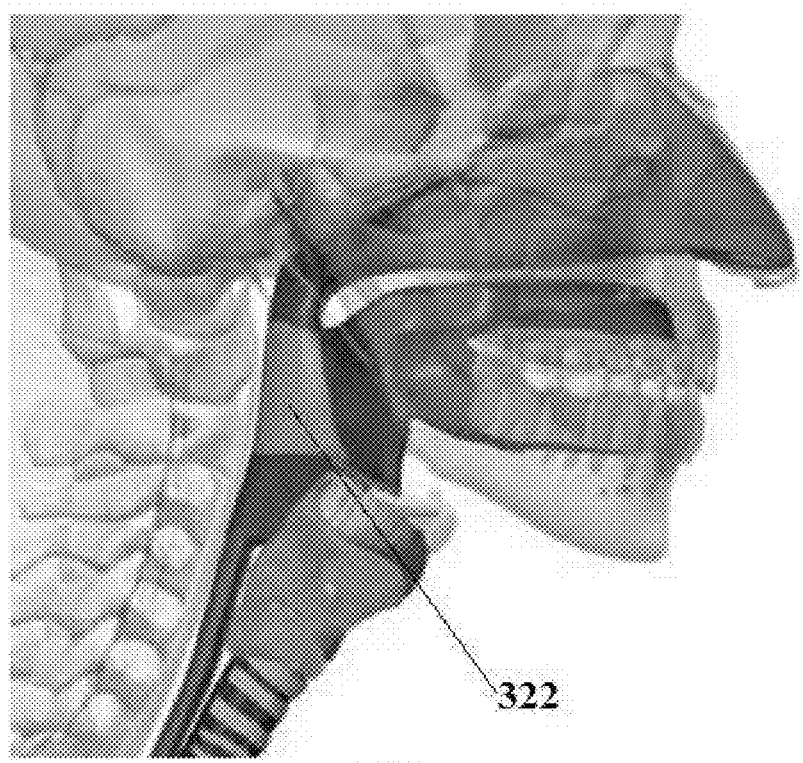

FIG. 3B depicts an internal view of the oropharynx of a human body.

Figure 3C:
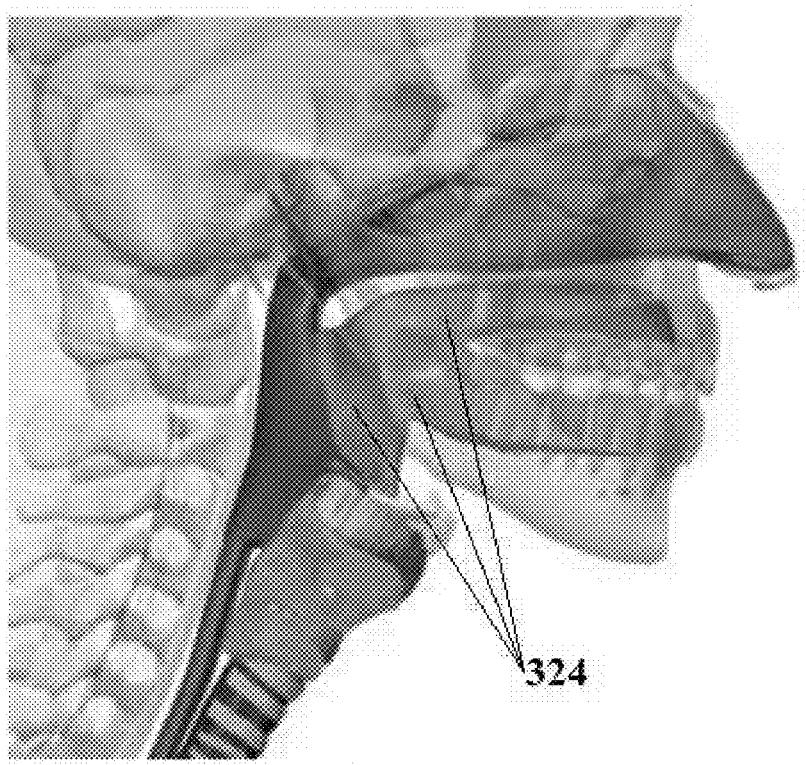

FIG. 3C depicts an internal view of the oral cavity of a human body.

Figure 3D:
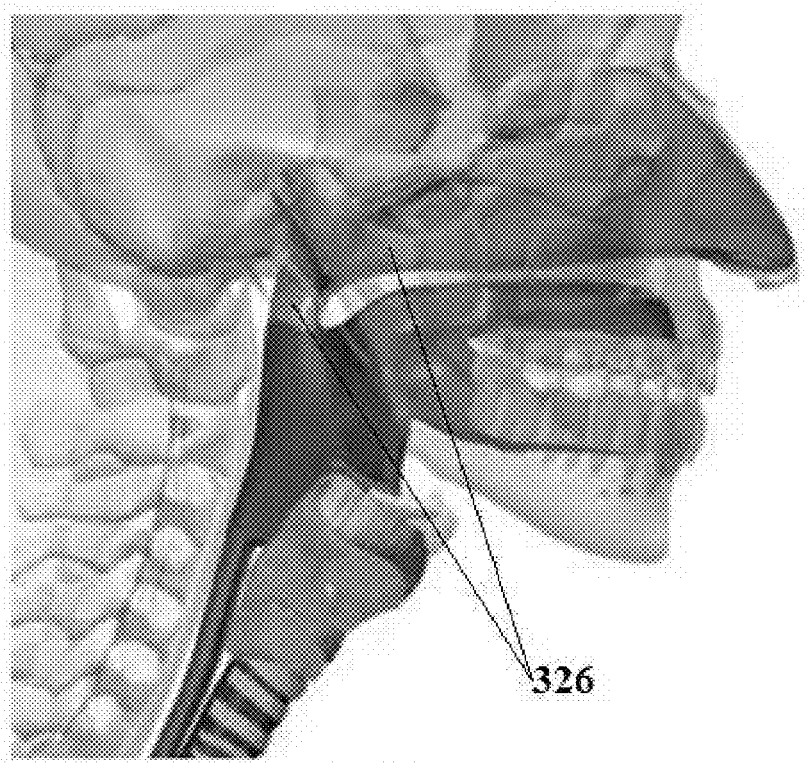

FIG. 3D depicts an internal view of the nasopharynx of a human body.

Figure 3E:
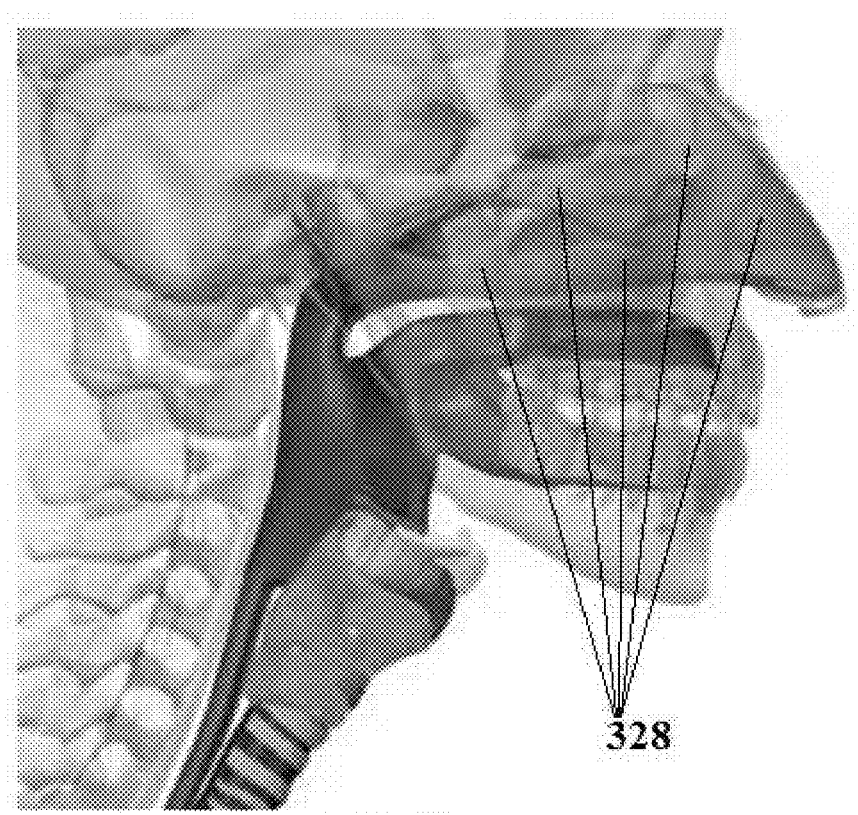

FIG. 3E depicts an internal view of the nasal cavities of a human body.

Figure 4A:
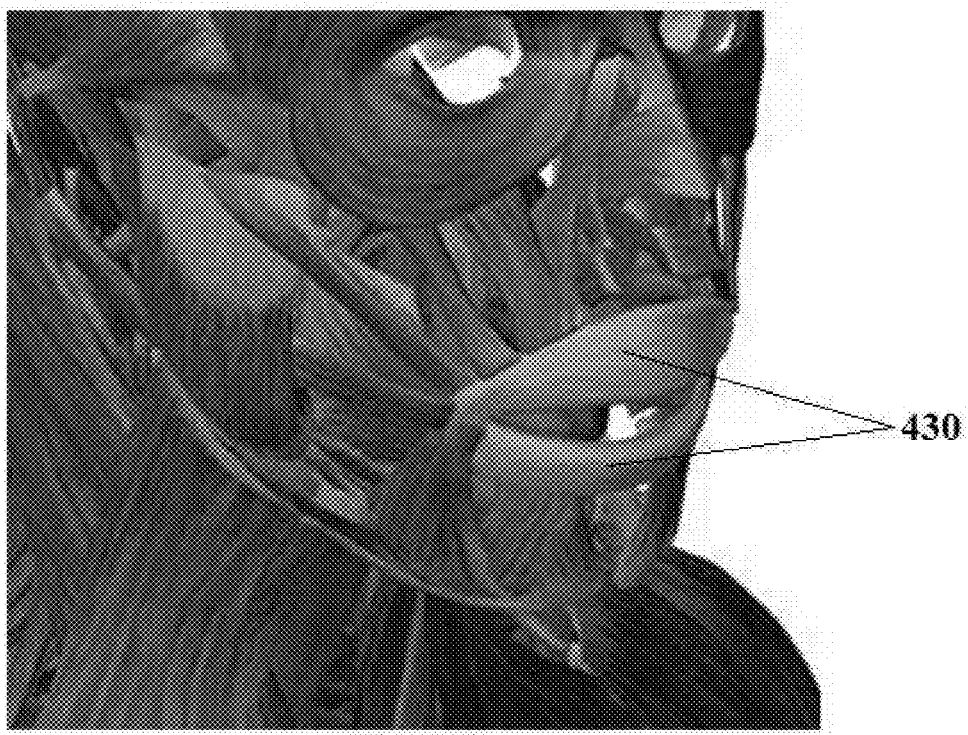

FIG. 4A depicts an internal view of the orbicularis oris of a human body.

Figure 4B:
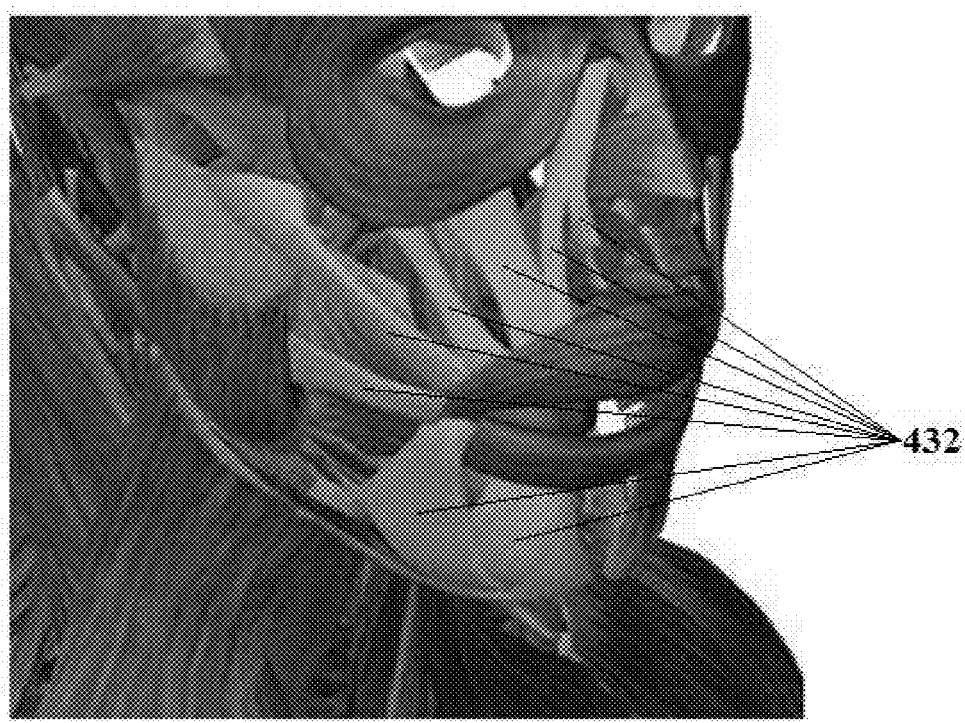

FIG. 4B depicts an internal view of the lip expression muscles of a human body.

Figure 4C:
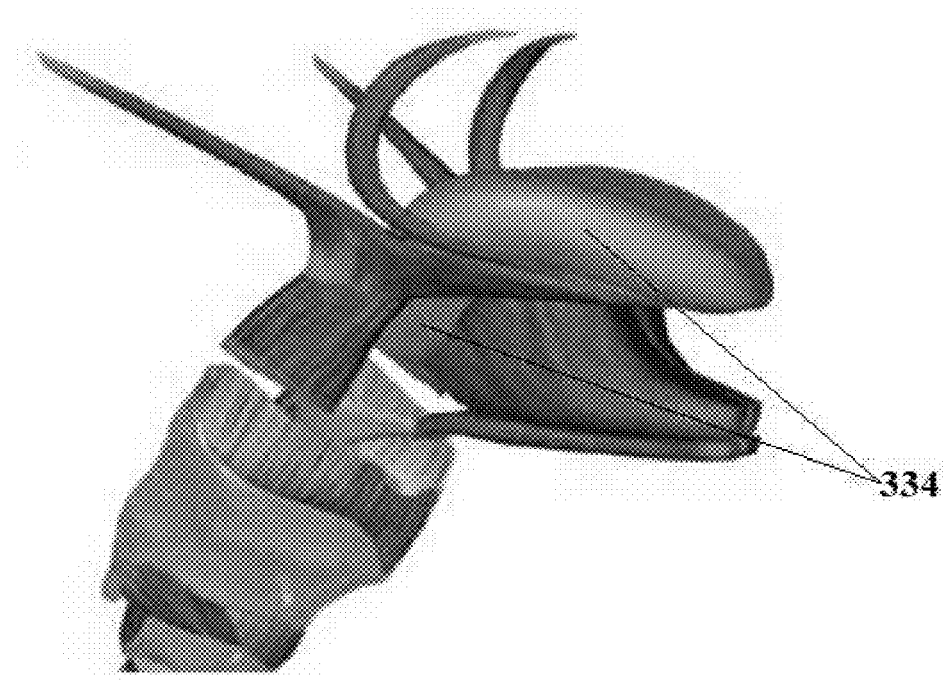

FIG. 4C depicts an internal view of the tongue of a human body.

Figure 4D:
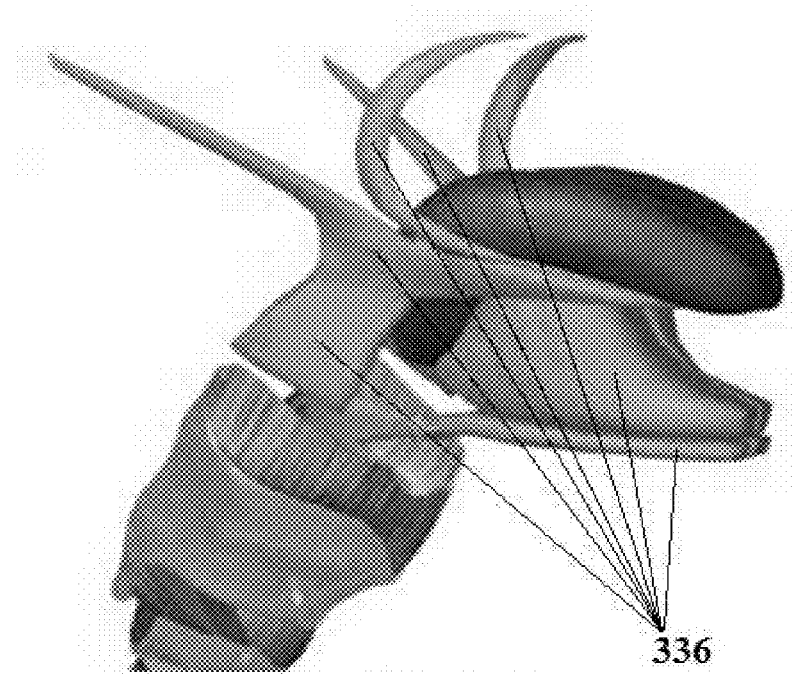

FIG. 4D depictsan internal view of the tongue muscles of a human body.

Figure 4E:
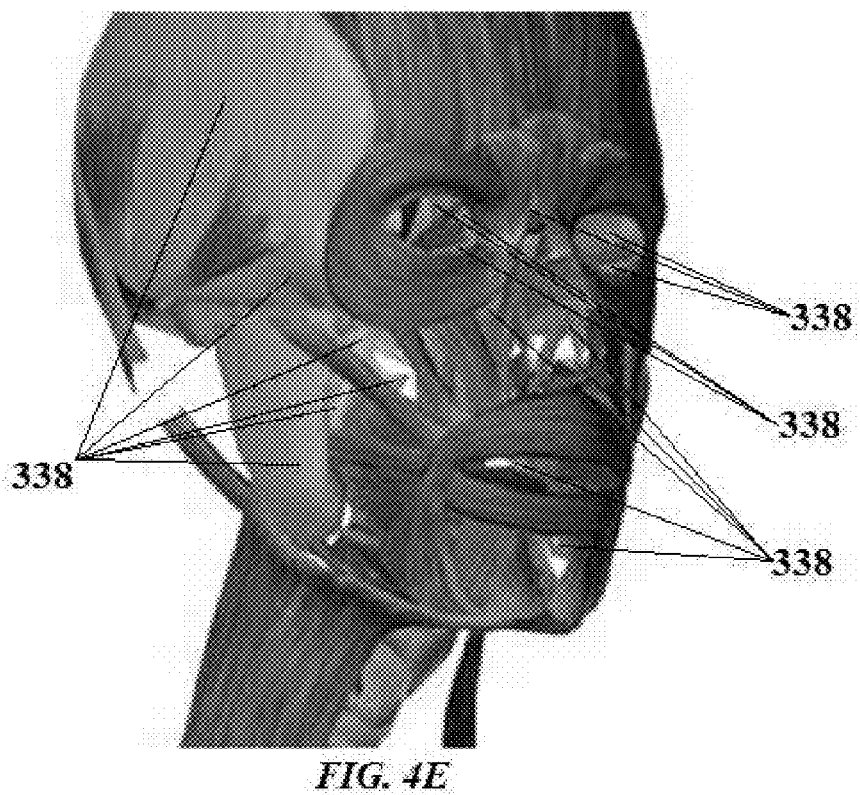

FIG. 4E depicts an internal view of the mastacian muscles of a human body.

Figure 4F:
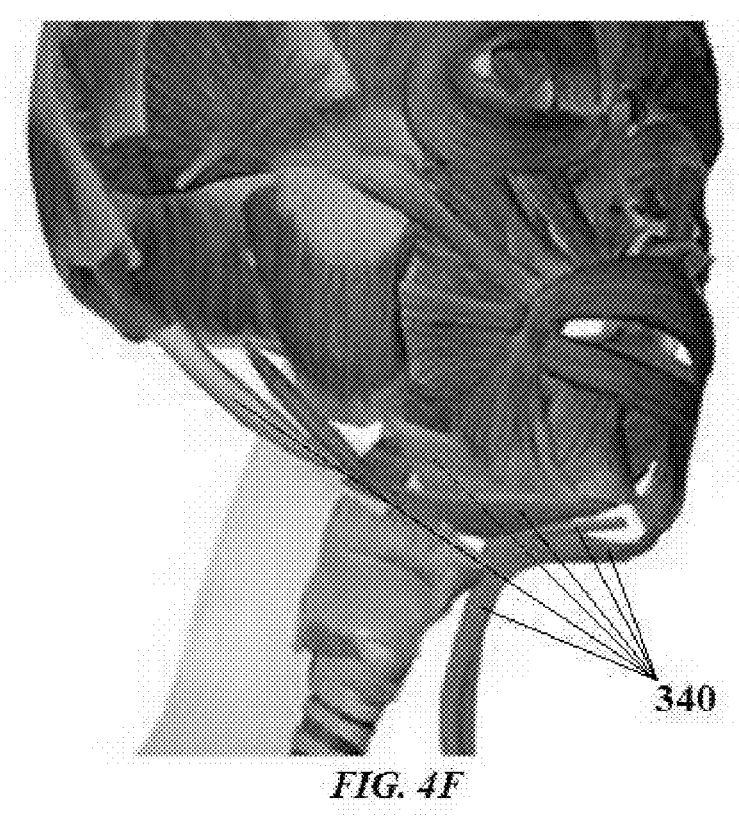

FIG. 4F depicts an internal view of the mandibular depressor muscles of a human body.

Figure 5:
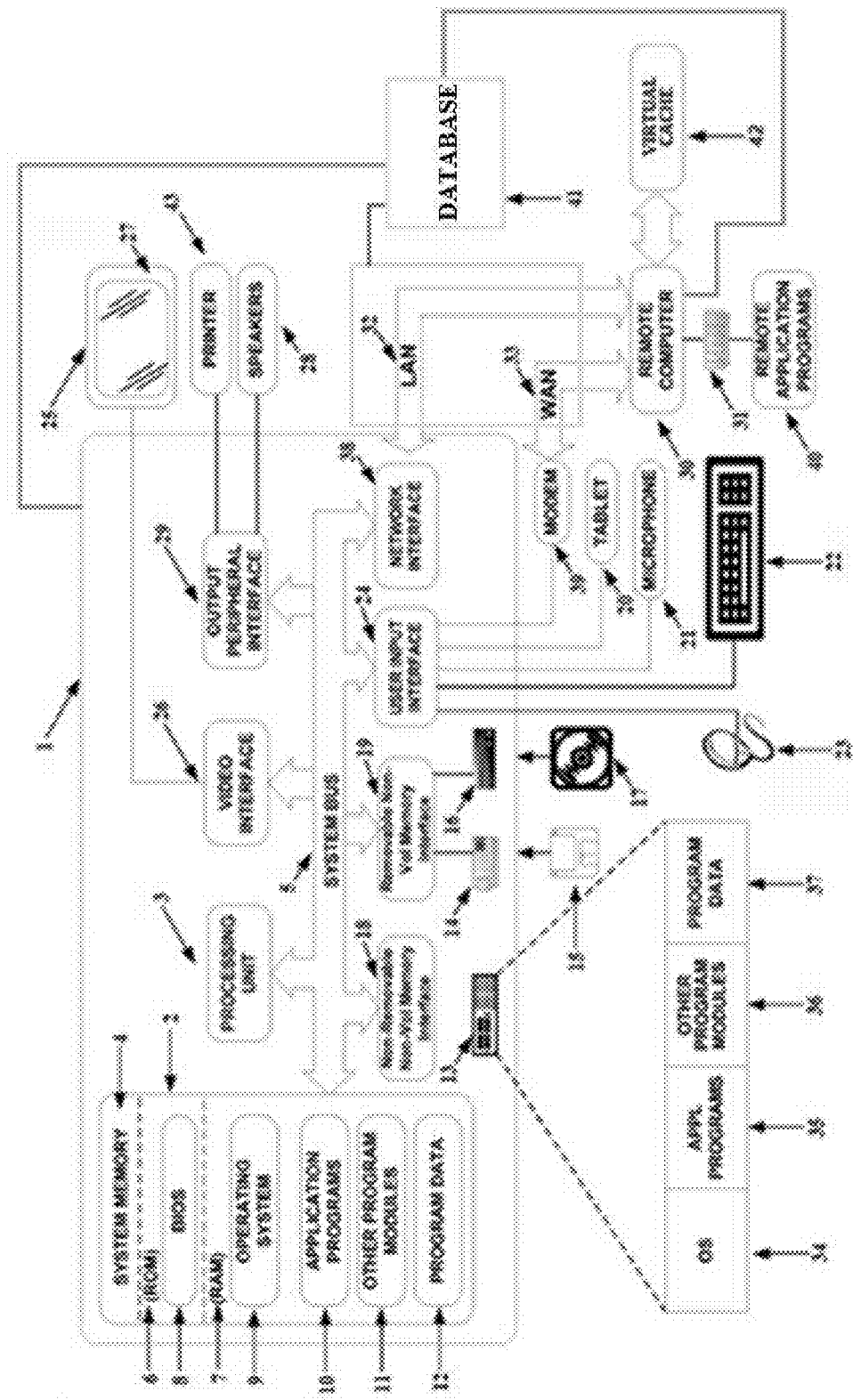

FIG. 5 depicts a computer system and related peripherals that may operate with the vocal training regimen program in accordance with one embodiment.

Figure 6A:
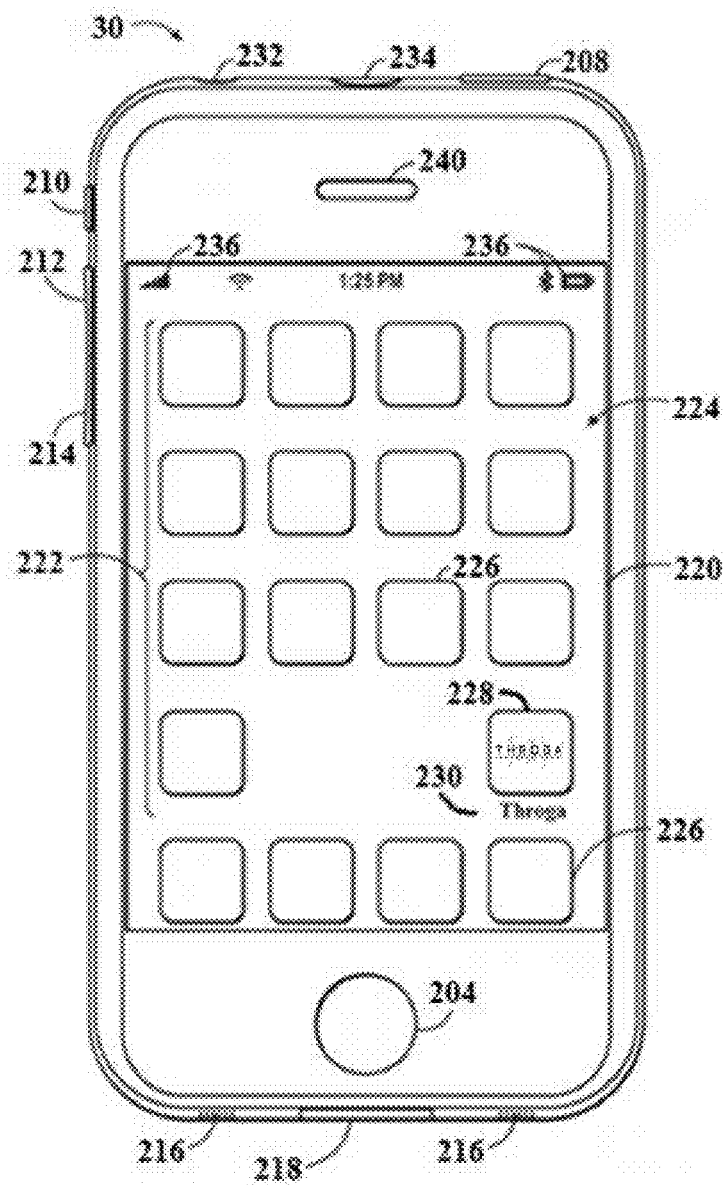

FIG. 6A depicts an electronic device with a storage structure capable of encoding routines for a vocal training regimen application in accordance with one embodiment.

Figure 6B:
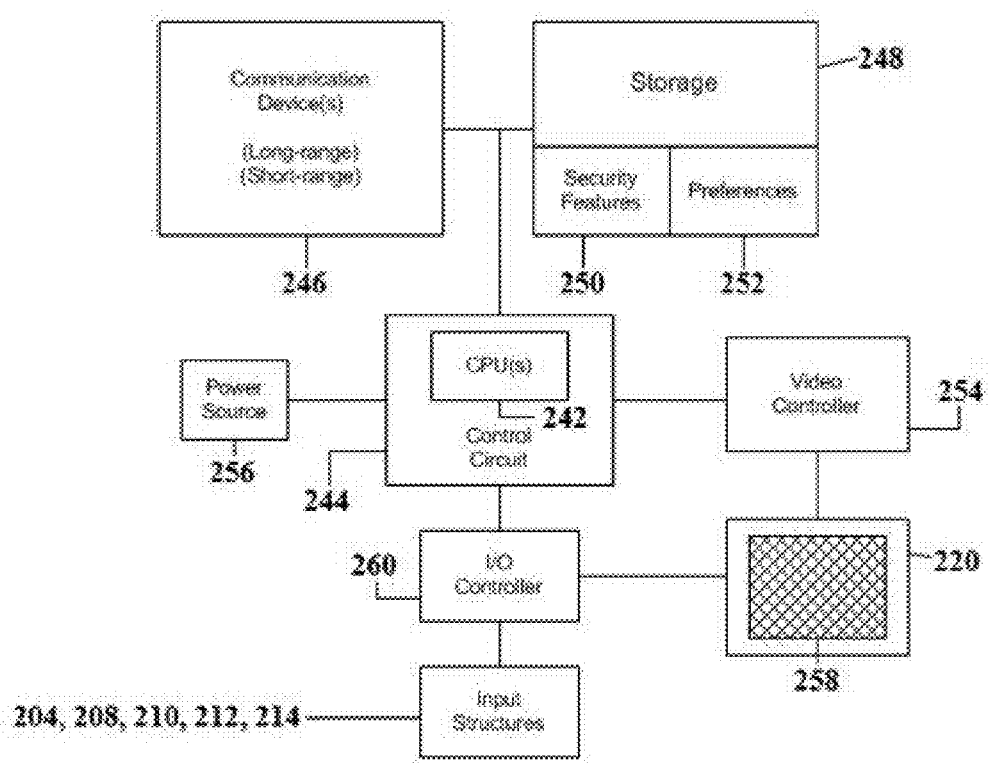

FIG. 6B depicts a simpler block layout of the electronic device of FIG. 6A in accordance with one embodiment.

Figure 7A:
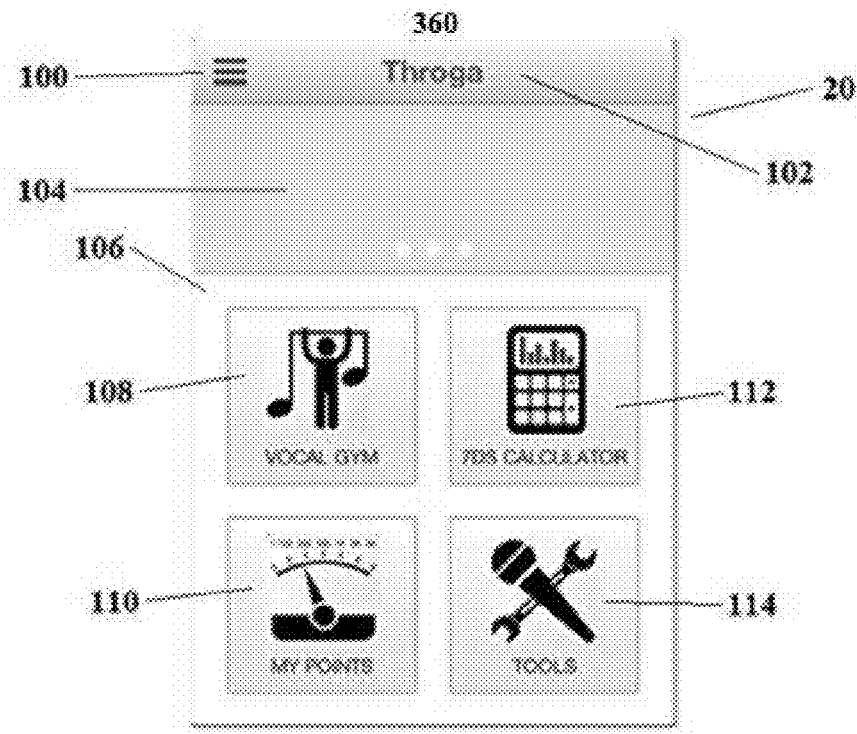

FIG. 7A depicts a display from an electronic device depicting a main options page for the system that creates a vocal training regimen in accordance with one embodiment.

Figure 7B:
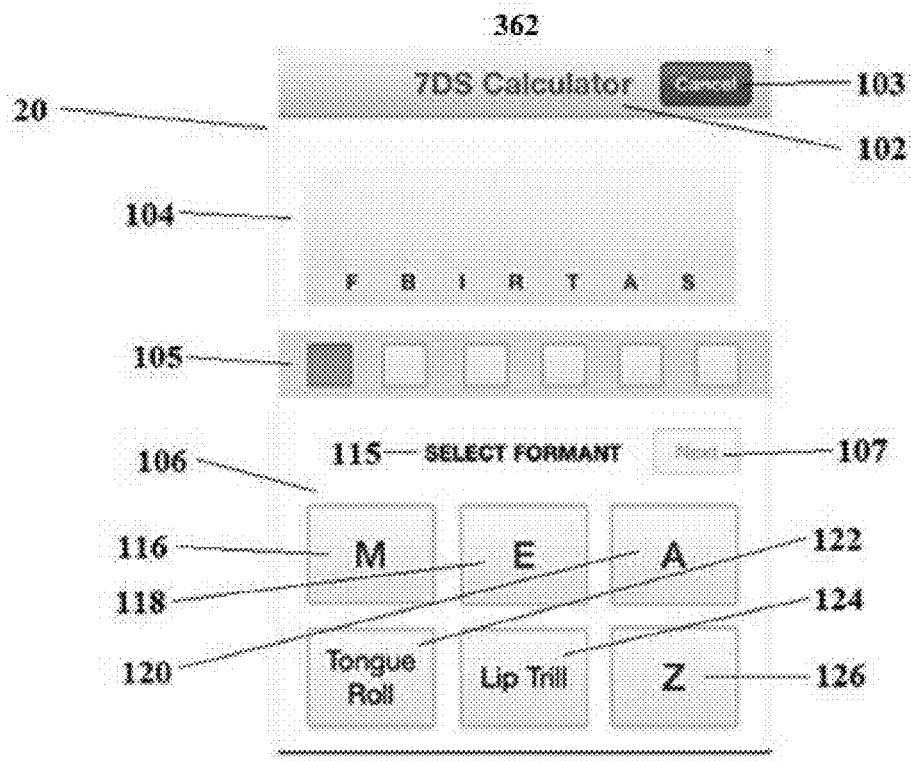

FIG. 7B depicts a display from an electronic device depicting a "select formant" page for the system that prescribes a vocal training regimen in accordance with one embodiment.

Figure 7C:
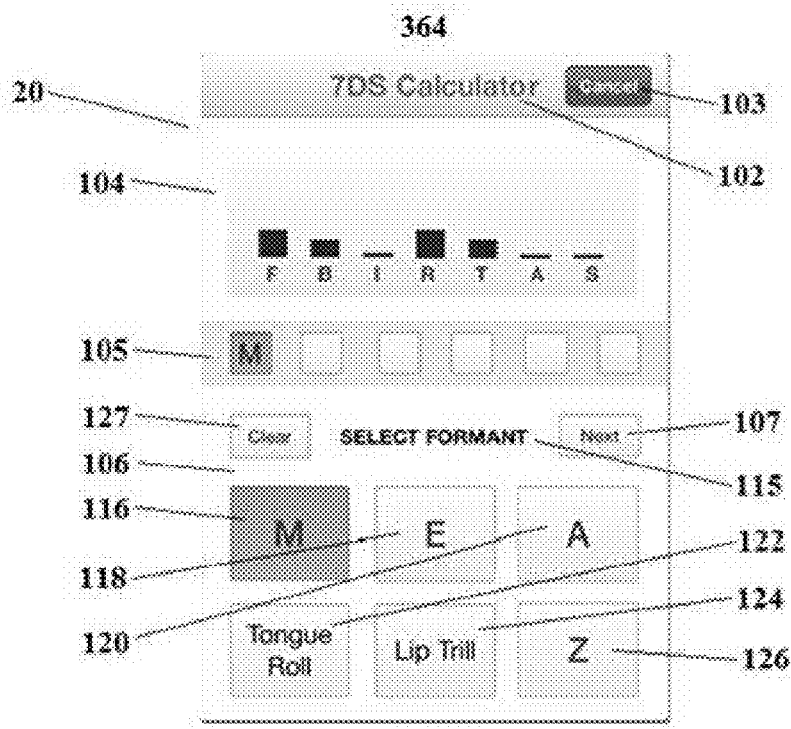

FIG. 7C depicts a display from an electronic device depicting how the seven dimensions of singing are altered based on the use of a certain formant in accordance with one embodiment.

Figure 7D:
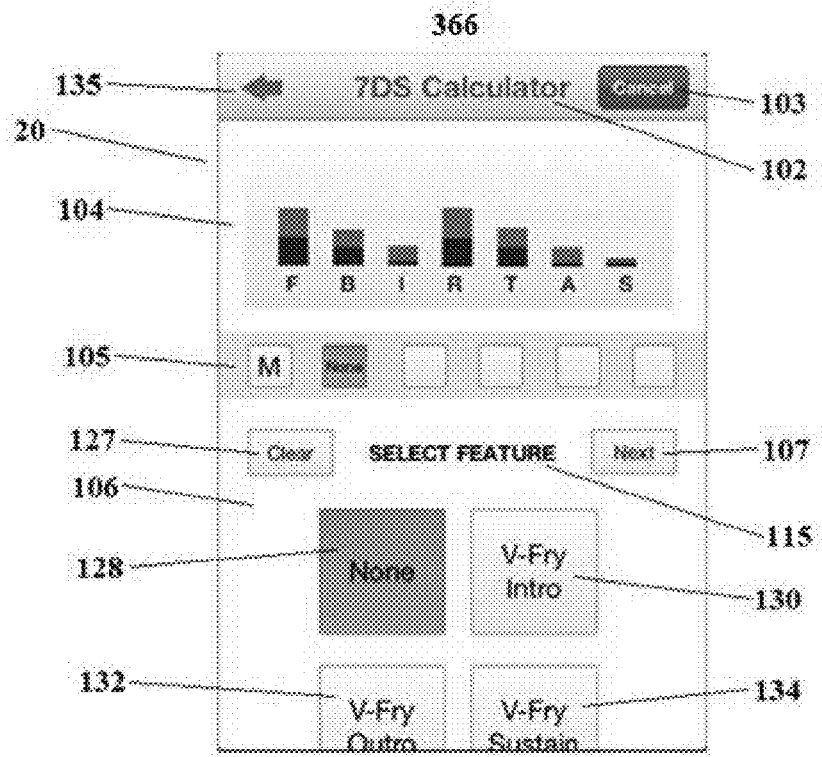

FIG. 7D depicts a display from an electronic device depicting how the seven dimensions of singing are altered based on the use of a certain feature in accordance with one embodiment.

Figure 7E:
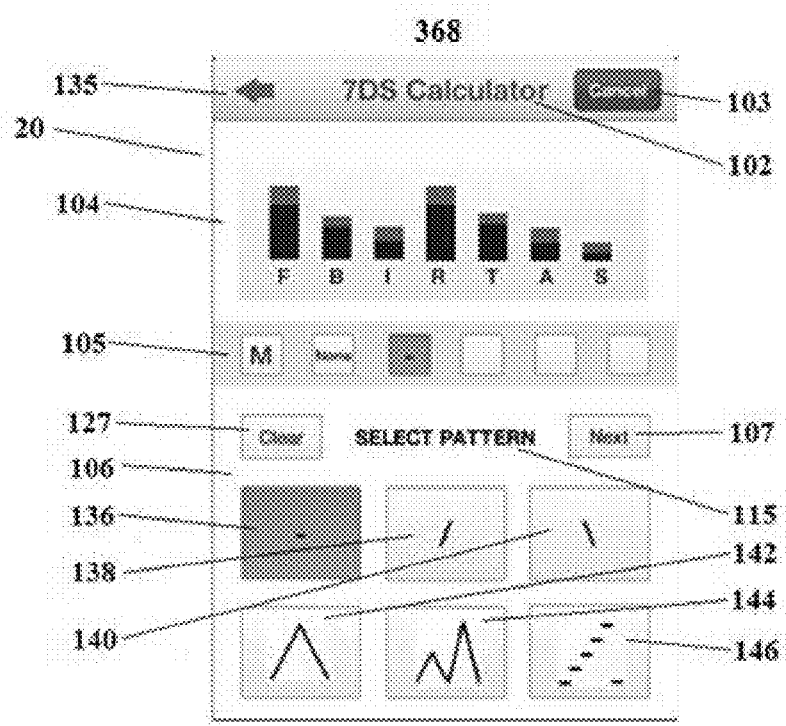

FIG. 7E depicts a display from an electronic device depicting how the seven dimensions of singing are altered based on the use of a certain pattern in accordance with one embodiment.

Figure 7F:
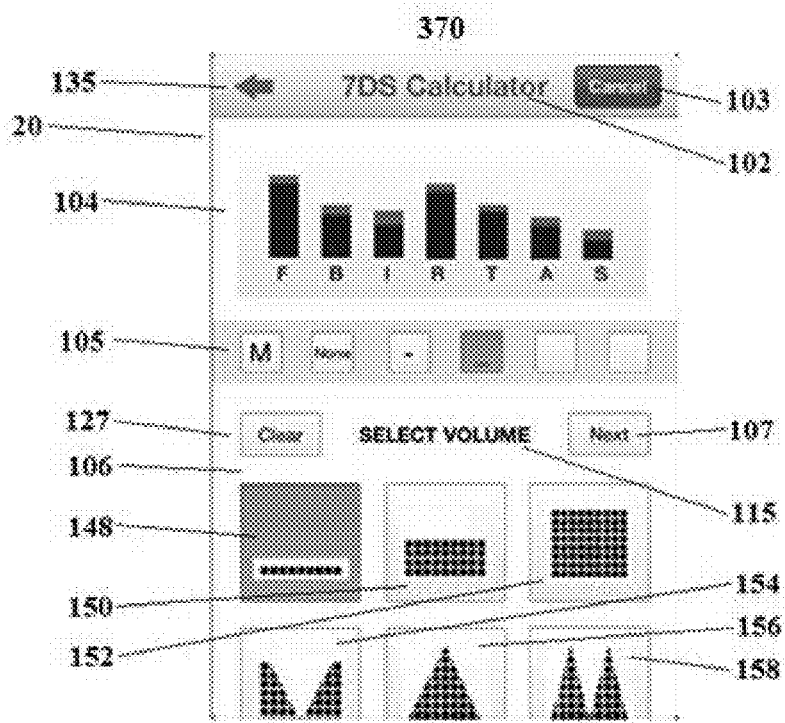

FIG. 7F depicts a display from an electronic device depicting how the seven dimensions of singing are altered based on the use of a certain volume in accordance with one embodiment.

Figure 7G:
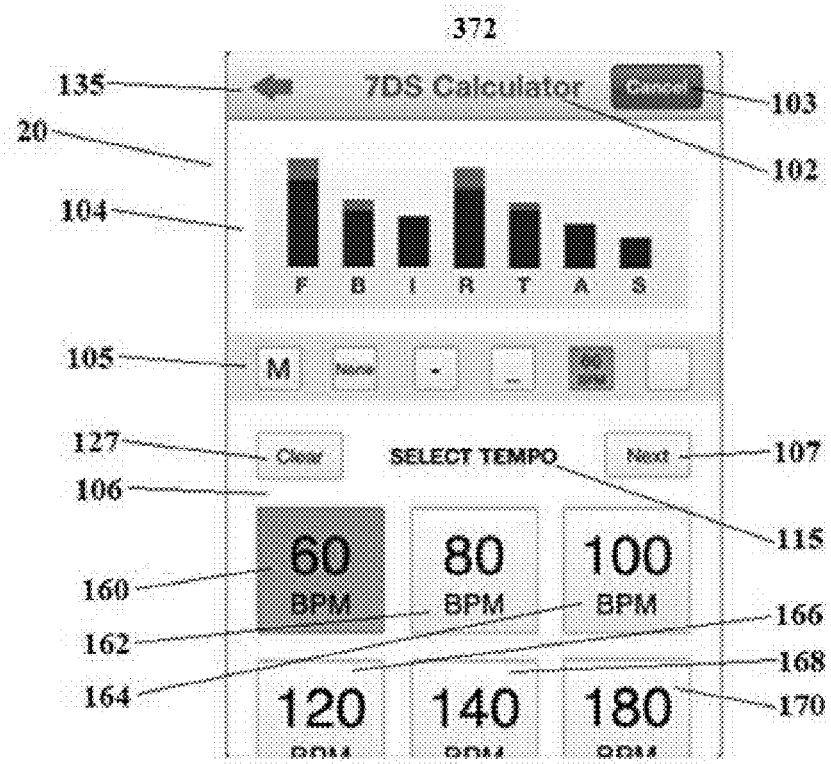

FIG. 7G depicts a display from an electronic device depicting how the seven dimensions of singing are altered based on the use of a certain tempo in accordance with one embodiment.

Figure 7H:
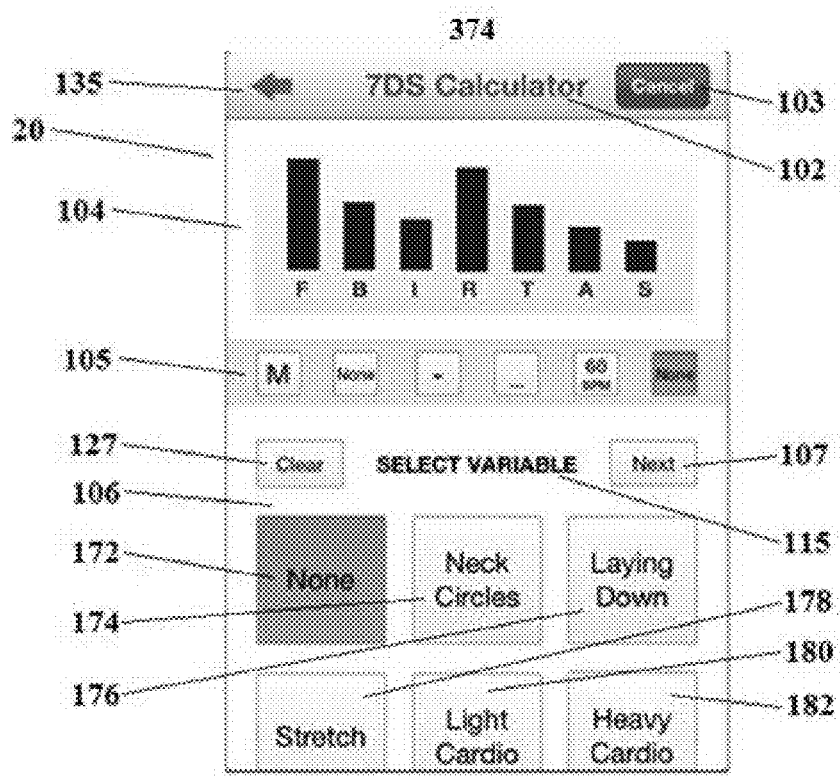

FIG. 7H depicts a display from an electronic device depicting how the seven dimensions of singing are altered based on the use of a certain variable in accordance with one embodiment.

Figure 7I:
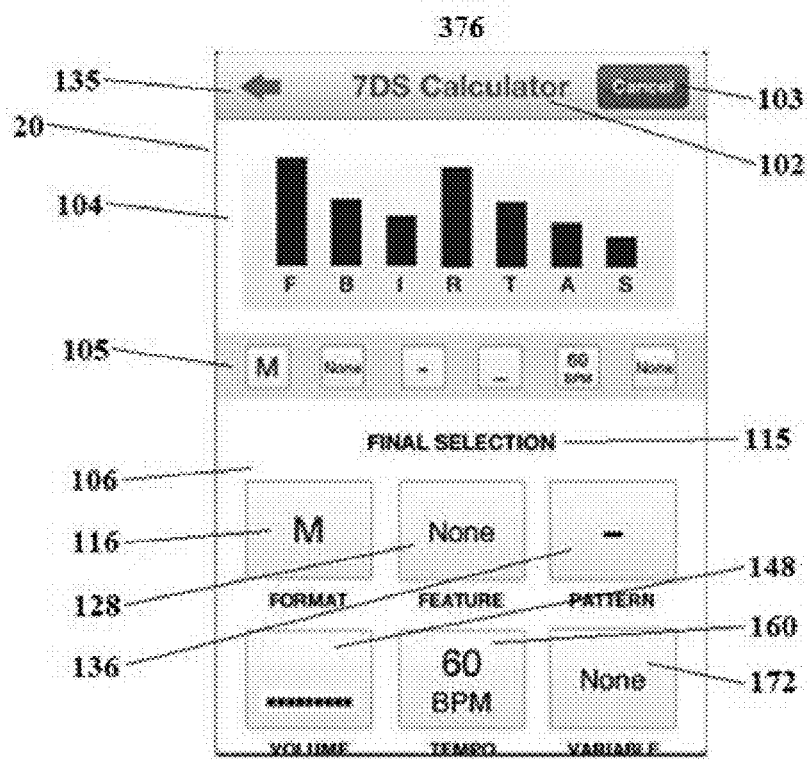

FIG. 7I depicts a display from an electronic device depicting a select page summarizing the six input values that are selected in accordance with one embodiment.

Figure 7J:
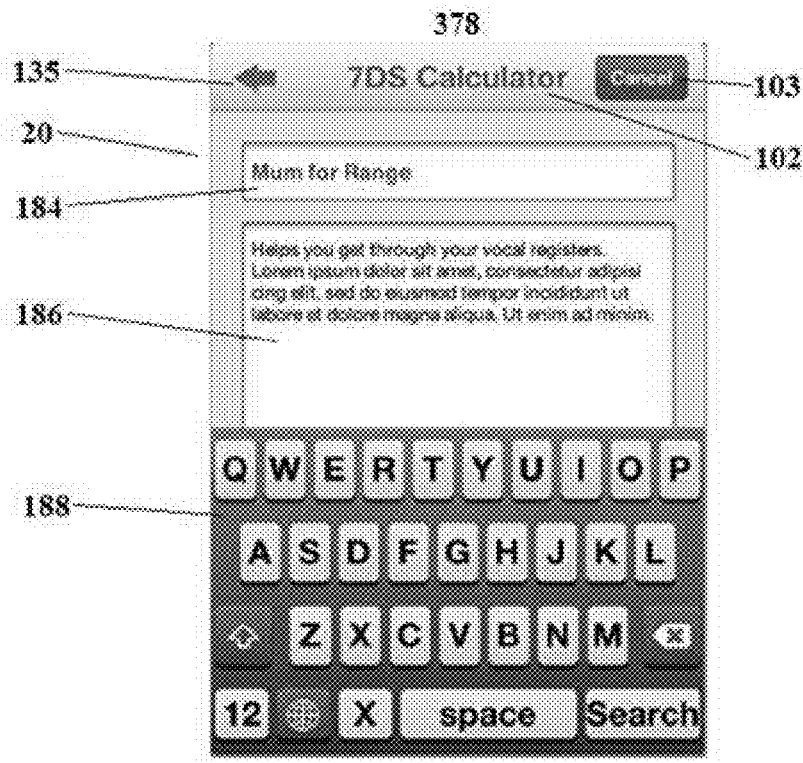

FIG. 7J depicts a display from an electronic device depicting an exemplary select screen displaying a custom name and description for a created exercise.

Figure 7K:
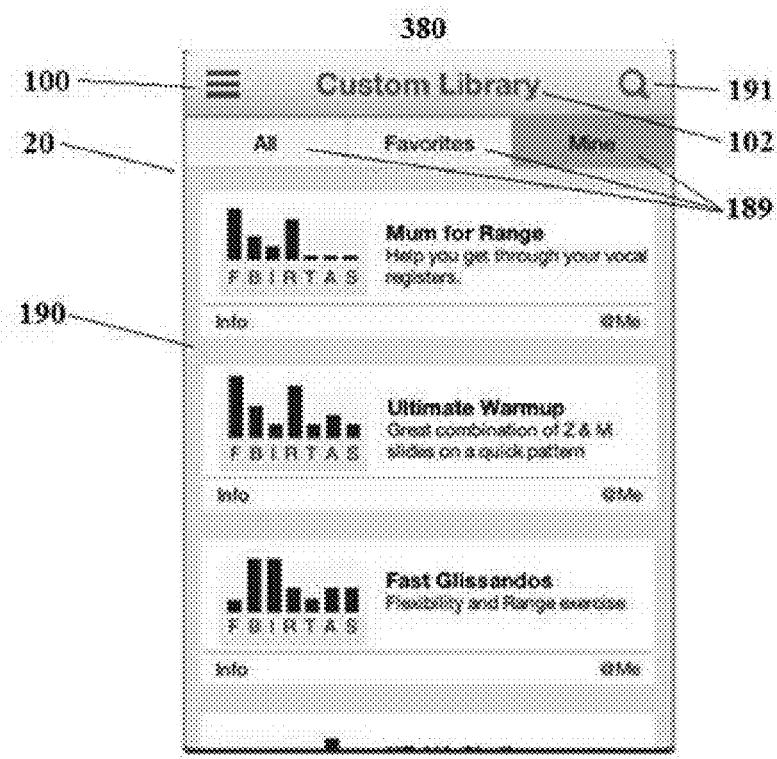

FIG. 7K depicts a display from an electronic device depicting an exemplary select screen displaying a custom library of exercises.

Figure 7L:
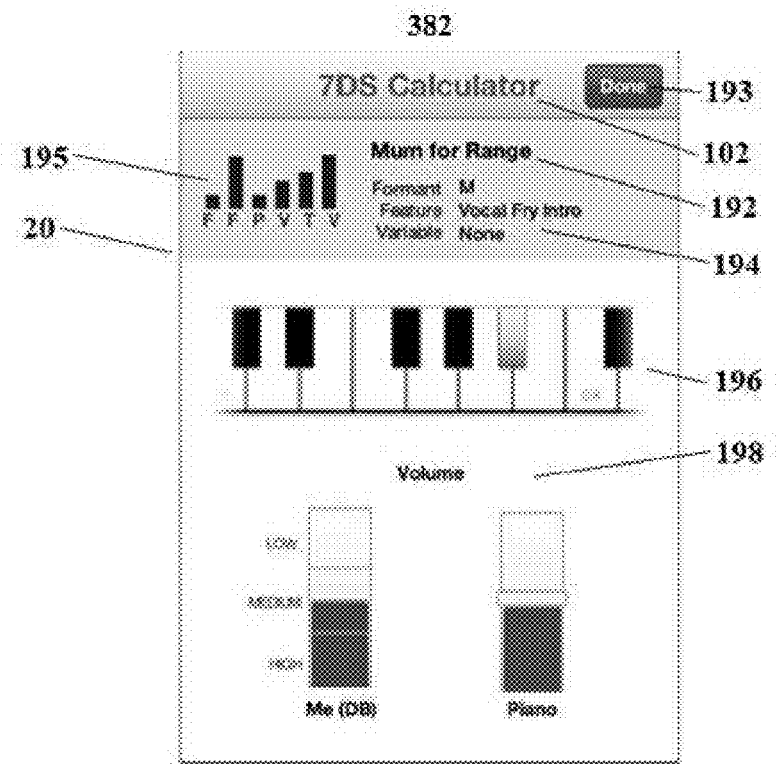

FIG. 7L depicts a display from an electronic device depicting an exemplary select screen utilized in the practice of an exercise.

Figure 8:
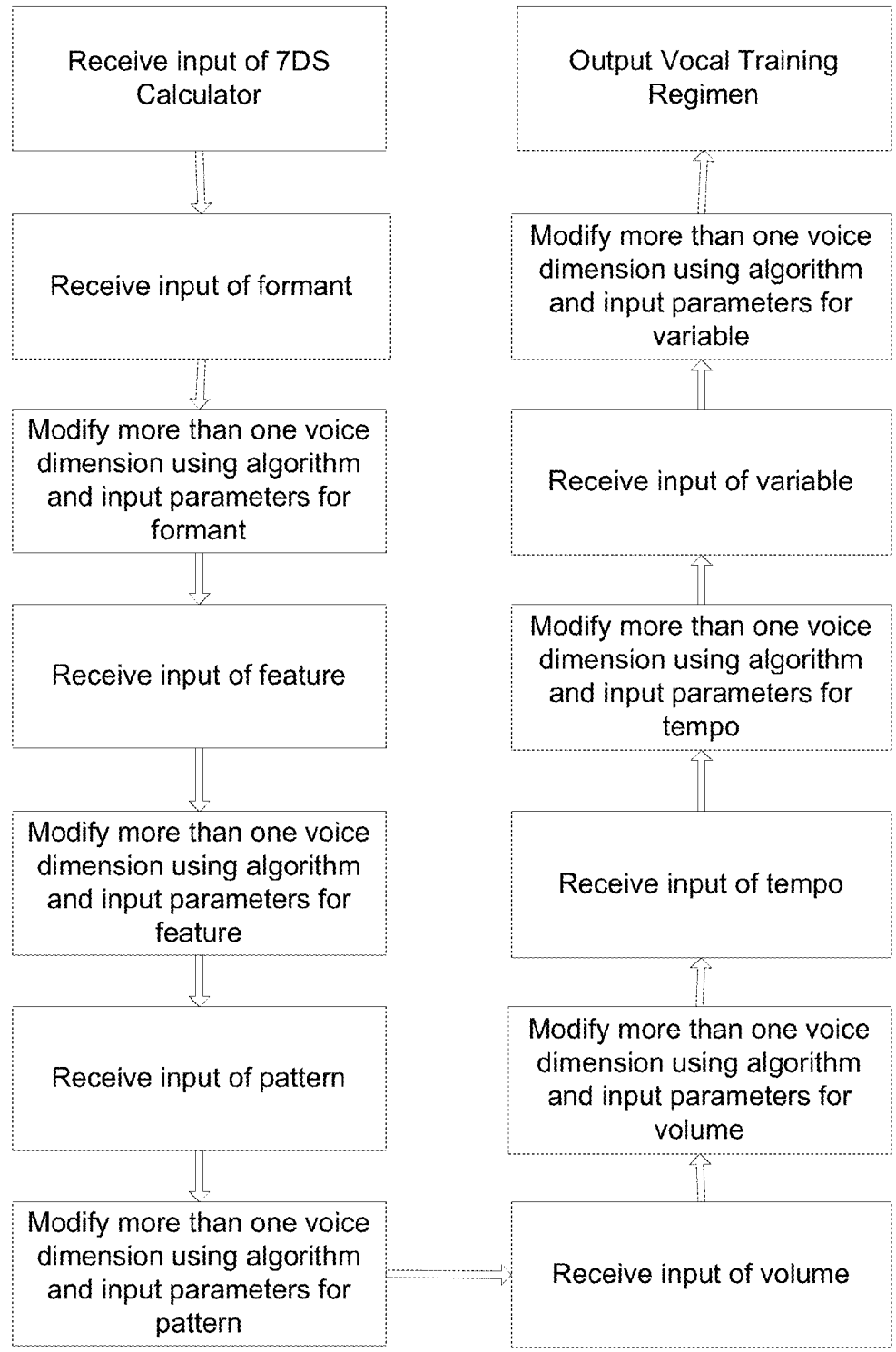

FIG. 8 depicts a flow chart depicting a sequence of exemplary steps utilized to create a prescribed exercise.

Figure 9:
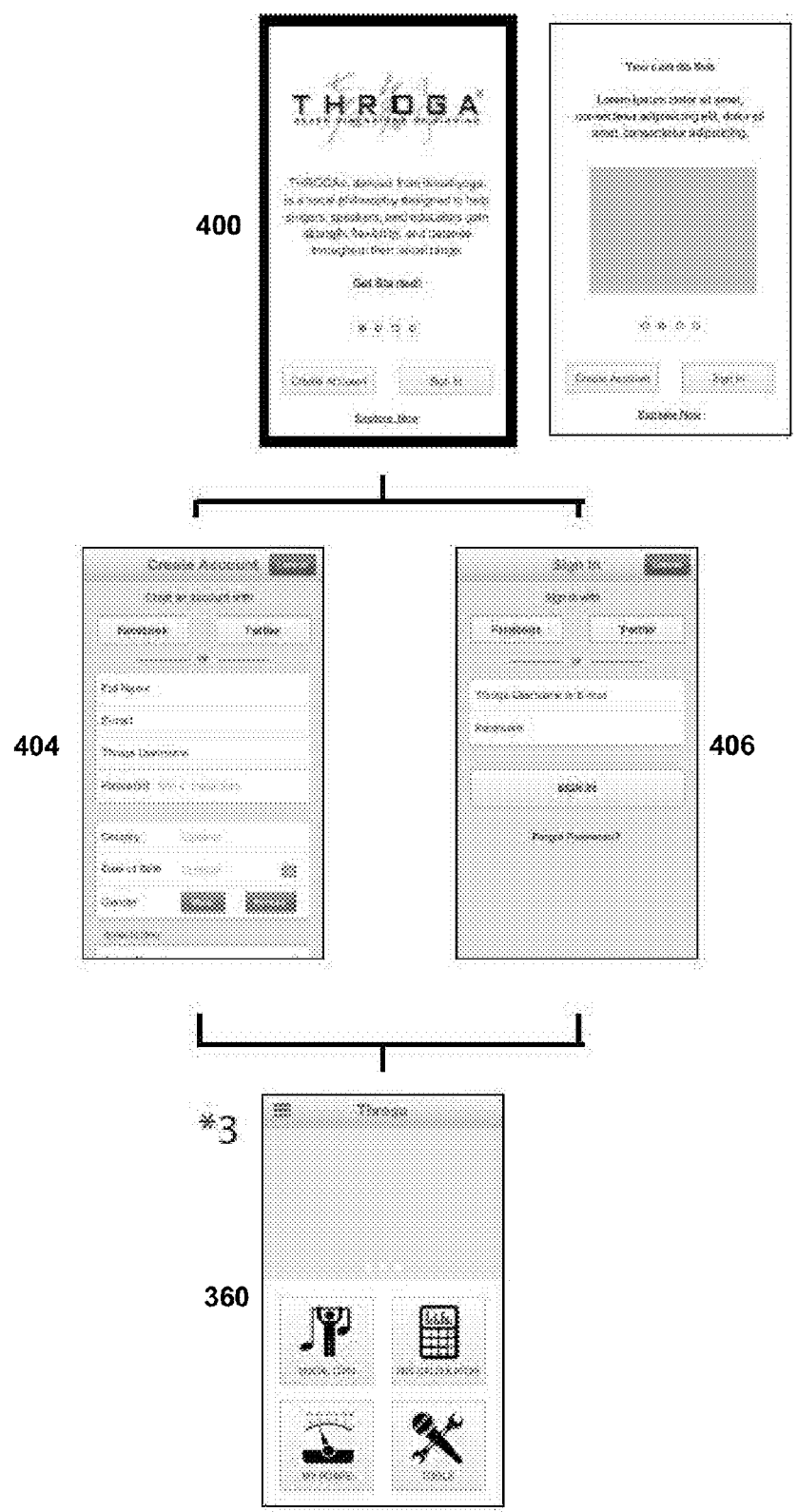

FIG. 9 depicts a flow chart depicting a sequence of displays from an electronic device showing a process of transitioning from the Throga® main screen to a main options screen in accordance with one embodiment.

FIG. 9.1 depicts a flow chart depicting a sequence of displays from an electronic device showing a process of transitioning from an account creation screen to various other screens in accordance with one embodiment.

FIG. 9.2 depicts a flow chart depicting a sequence of displays from an electronic device showing a process of transitioning from a sign in screen to various other screens in accordance with one embodiment.

FIG. 9.3 depicts a flow chart depicting a sequence of displays from an electronic device showing a process of transitioning from a main options screen to a plurality of screens in accordance with one embodiment.

FIG. 9.3.1 depicts a flow chart depicting a sequence of displays from an electronic device showing a process of transitioning from a vocal gym screen to a plurality of other screens in accordance with one embodiment.

FIG. 9.3.1.1 depicts a flow chart depicting a sequence of displays from an electronic device showing a process of transitioning from a warmup screen to a video screen in accordance with one embodiment.

FIG. 9.3.1.2 depicts a flow chart depicting a sequence of displays from an electronic device showing a process of transitioning from a workout screen to various other screens in accordance with one embodiment.

FIG. 9.3.1.3 depicts a flow chart depicting a sequence of displays from an electronic device showing a process of transitioning from a community screen to various other screens in accordance with one embodiment.

FIG. 9.3.1.4 depicts a flow chart depicting a sequence of displays from an electronic device showing a process of transitioning from a custom exercise library screen to various other screens in accordance with one embodiment.

FIG. 9.3.1.4.1 depicts a flow chart depicting a sequence of displays from an electronic device showing a process of transitioning from a mum (sound) for range screen to various other screens in accordance with one embodiment.

FIG. 9.3.2 depicts a flow chart depicting a sequence of displays from an electronic device showing a process of transitioning from a "my points" screen to a redeem screen in accordance with one embodiment.

FIG. 9.3.3 depicts a flow chart depicting a sequence of displays from an electronic device showing a process of transitioning from a tools screen to various other screens in accordance with one embodiment.

FIG. 10A depicts a first portion of a chart representative of an embodiment of the layout of all of the possible algorithms selectable in the app version of the 7DS (or 7 Dimensions of Singing Calculator).

FIG. 10B depicts a second portion of a chart representative of an embodiment of the layout of all of the possible algorithms selectable in the app version of the 7DS (or 7 Dimensions of Singing) Calculator that results in the creation of an exercise.

FIG. 10C depicts a third portion of a chart representative of an embodiment of the layout of all of the possible algorithms selectable in the app version of the 7DS (or 7 Dimensions of Singing) Calculator that results in the creation of an exercise.

FIG. 10D depicts a fourth portion of a chart representative of an embodiment of the layout of all of the possible algorithms selectable in the app version of the 7DS (or 7 Dimensions of Singing) Calculator that results in the creation of an exercise.

FIG. 10E depicts a fifth portion of a chart representative of an embodiment of the layout of all of the possible algorithms selectable in the app version of the 7DS (or 7 Dimensions of Singing) Calculator that results in the creation of an exercise.

FIG. 10F depicts a sixth portion of a chart representative of an embodiment of the layout of all of the possible algorithms selectable in the app version of the 7DS (or 7 Dimensions of Singing) Calculator that results in the creation of an exercise.

FIG. 10G depicts a seventh portion of a chart representative of an embodiment of the layout of all of the possible algorithms selectable in the app version of the 7DS (or 7 Dimensions of Singing) Calculator that results in the creation of an exercise.

FIG. 10H depicts a eighth portion of a chart representative of an embodiment of the layout of all of the possible algorithms selectable in the app version of the 7DS (or 7 Dimensions of Singing) Calculator that results in the creation of an exercise.

FIG. 10I depicts a ninth portion of a chart representative of an embodiment of the layout of all of the possible algorithms selectable in the app version of the 7DS (or 7 Dimensions of Singing) Calculator that results in the creation of an exercise.

FIG. 10J depicts a tenth portion of a chart representative of an embodiment of the layout of all of the possible algorithms selectable in the app version of the 7DS (or 7 Dimensions of Singing) Calculator that results in the creation of an exercise.

FIG. 10K depicts a eleventh portion of a chart representative of an embodiment of the layout of all of the possible algorithms selectable in the app version of the 7DS (or 7 Dimensions of Singing) Calculator that results in the creation of an exercise.

FIG. 10L depicts a twelfth portion of a chart representative of an embodiment of the layout of all of the possible algorithms selectable in the app version of the 7DS (or 7 Dimensions of Singing) Calculator that results in the creation of an exercise.

FIG. 10M depicts a thirteenth portion of a chart representative of an embodiment of the layout of all of the possible algorithms selectable in the app version of the 7DS (or 7 Dimensions of Singing) Calculator that results in the creation of an exercise.

FIG. 10N depicts a fourteenth portion of a chart representative of an embodiment of the layout of all of the possible algorithms selectable in the app version of the 7DS (or 7 Dimensions of Singing) Calculator that results in the creation of an exercise.

FIG. 10O depicts a fifteenth portion of a chart representative of an embodiment of the layout of all of the possible algorithms selectable in the app version of the 7DS (or 7 Dimensions of Singing) Calculator that results in the creation of an exercise.

FIG. 10P depicts a sixteenth portion of a chart representative of an embodiment of the layout of all of the possible algorithms selectable in the app version of the 7DS (or 7 Dimensions of Singing) Calculator that results in the creation of an exercise.

FIG. 10Q depicts a chart containing letters, terms, and descriptions of the letters and terms found in FIG. 10A through FIG. 10N in accordance with one embodiment.

FIG. 10R depicts a chart containing pattern symbols, patterns, and correlating BPMs (Beats Per Minute) in accordance with one embodiment.

Figure 11A:
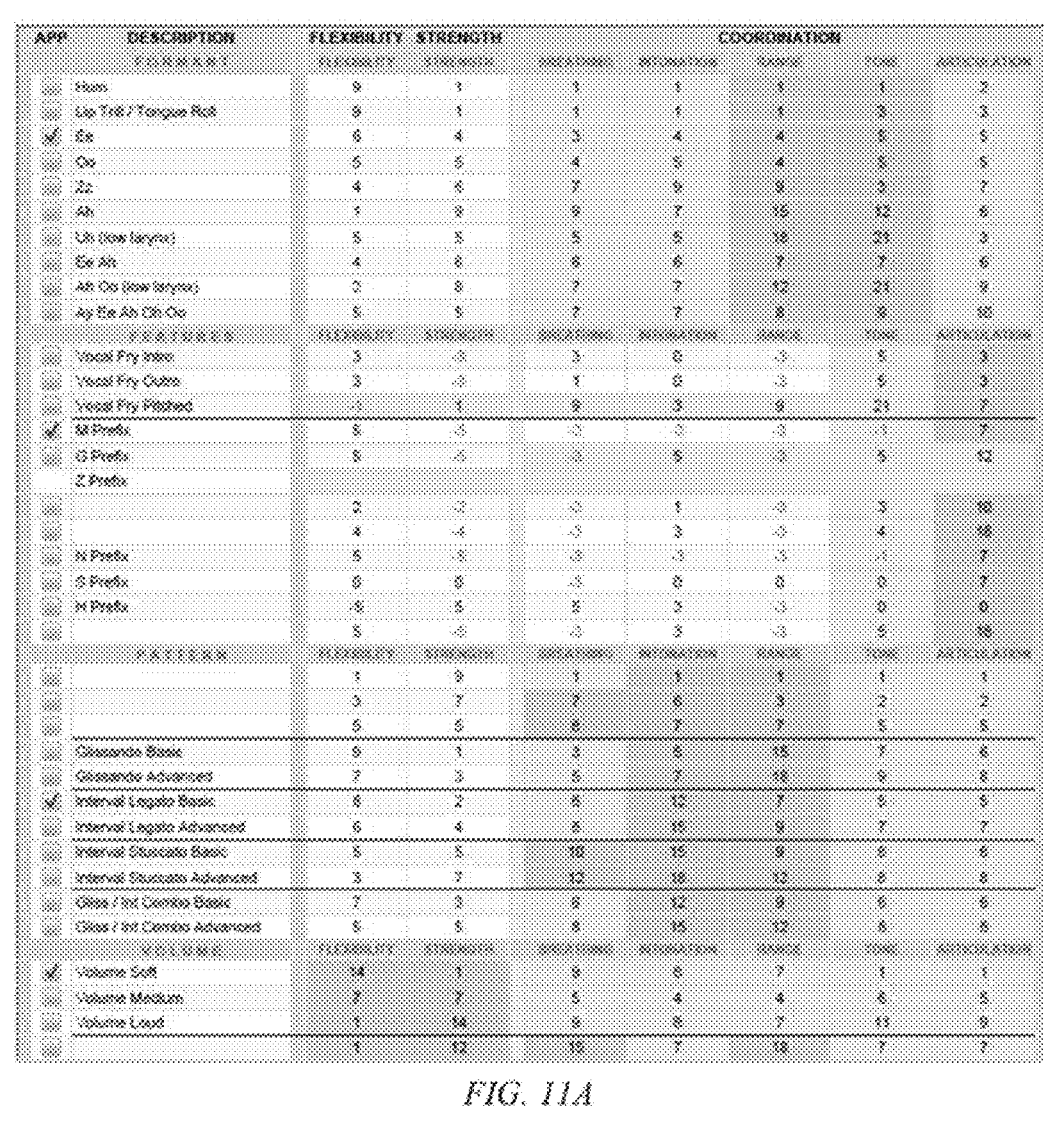
Figure 11B:
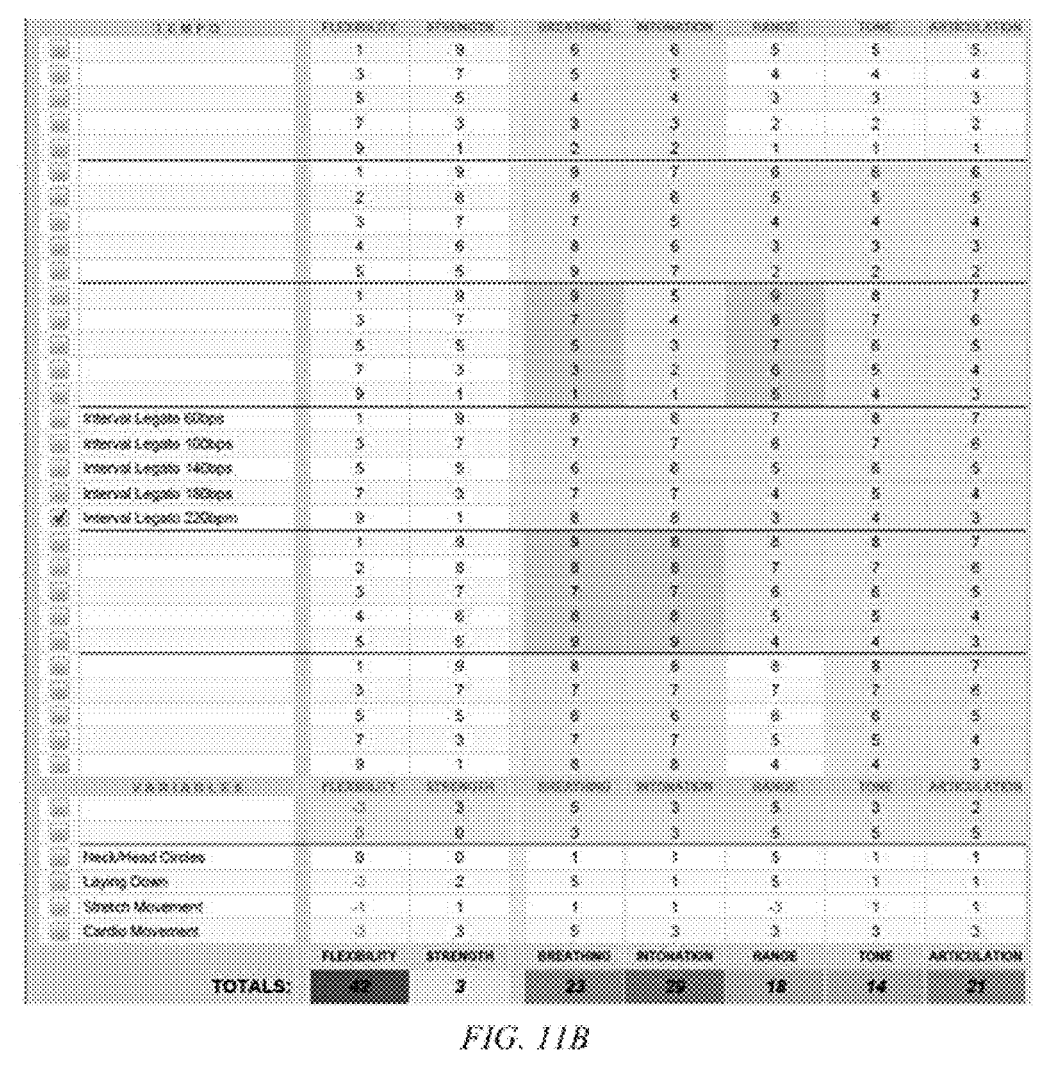

FIGS. 11A and 11B depict a chart of an embodiment of the layout of point values given to the seven dimensions of the voice based on parameters, including an example of a complete point value arrangement representative of a vocal training routine.

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Vocalizing, whether singing, speaking, laughing, or crying, requires an incredible network of muscles and intricate moving parts in the machine that makes up the human instrument. Since this vocal instrument is driven by thought (like any other action of the body), the identifiable sound that makes up each instrument is a result of far more than just shape and size, it's a reflection of an individual's personality, life experience, and desires. This is why there can be thousands of different singers singing the same song, with thousands of different results.

The Seven Dimensions of Singing (7DS), a term unique to THROGA® (a registered trademark of Richard Fink IV), simplifies an understanding of how the vocal "instrument" and corresponding exercises work. More importantly, the seven dimensions acts as a guide for vocalists, teachers and therapists to target which vocal exercises are needed for safe and efficient results. Although originally developed with the complexity of singing in mind, the 7DS applies to any vibration of the vocal folds. The seven dimensions of singing include:

FLEXIBILITY: Elasticity of the vocal folds
BREATHING: Breath control
INTONATION: Pitch control
RANGE: Vocal balance from lowest to highest note
TONE: Shape of vocal sound
ARTICULATION: Diction
STRENGTH: Strength and stability of the voice Since no one muscle acts alone, the muscles used to describe the actions of each dimension are dominant, but not exclusive. For example, the bicep muscles in your arms can be used to lift and hold a bag of groceries, but they require an antagonistic relationship with its counterpart, the triceps, along with a myriad of other muscles that may engage to stabilize the weight resistance and the body's posture in the process. In the same way that an athlete can isolate specific muscles with exercises in a gym (such as curling barbells to target the biceps), vocal exercises are designed to do the same for targeted areas of the voice.

In one embodiment, a vocalist can discover which exercises should be practiced by simply reviewing the 7DS and asking, "Which of these things do I struggle with when singing (or speaking)?" If they know the answer, they can target their imbalances immediately by working on a corresponding exercise, or even create one in the 7DS Calculator. If they are unclear as to which dimension(s) should be focused on, the dimension(s) can be worked with in the order provided. This way, a vocalist can reach his or her full potential by addressing every aspect of one's voice, progressing from flexibility to strength. Below is a closer look at the 7DS, the muscles and actions involved, and the type of exercises and Throga® guidelines required to isolate them.

FIGS. 1A, 1B, 1C, 1D, and 1E depict the muscles that may be utilized for the dimension of flexibility. Flexibility refers to the elasticity of the vocal folds 300, located inside the larynx 302. This is based on the disengagement (release) of the thyroarytenoid 304 and vocalis muscles 306, along with the pliability of the superficial lamina propria 308 (the outer layer of the folds commonly referred to as the 'cover'), which are needed to vibrate freely during phonation. Exercises concerning flexibility may involve practicing stretching and loosening the vocal folds with fast, low volume, closed formant exercises throughout the vocal registers while also applying Throga® guidelines.

FIGS. 2A, 2B, 2C, and 2D depict the muscles that may be utilized for the dimension of breathing. Breathing refers to the coordination of the breathing muscles to create a balanced, or intentional, amount of air pressure under the vocal folds (subglottic pressure). The diaphragm 310 and external intercostal muscles 312 are responsible for inhalation, while the abdominal 314 (external obliques, internal obliques, transversus abdominis, and rectus abdominis) and internal intercostal muscles 316 are responsible for exhalation. Exercises concerning breathing may involve practicing the coordination of the breathing muscles during inhalation, and challenging the management of air during exhalation with a clear vocal tone on either very slow or fast patterns, at either very quiet or loud volumes, with an open-formants.

FIGS. 1A, 1C, and 1F depict the muscles that may be utilized for the dimension of intonation. Intonation refers to the control of vocal fold 300 vibration at specific frequencies (pitch), along with the ability to accurately move from one intended pitch to another. The muscles predominantly responsible for this action are the cricothyroids muscles 318, which tilt the thyroid cartilage forward causing the folds to stretch, in an antagonist relationship with the thyroarytenoid 304, which shortens the folds causing them to relax. Exercises concerning intonation may involve practicing intended pitches with both simple and complex interval patterns, addressing the attack and release of each note accurately, with multiple volumes, tempos, and formants.

FIGS. 1D, 2A, 2B, 2C, and 2D depict the muscles that may be utilized for the dimension of range. Range refers to the coordination and balance between the breathing muscles and the vibratory patterns of the vocal folds from lowest to highest note. The mass and approximation of the folds are determined by the vocalis, thyroarytenoid, cricothyroid, and arytenoid muscles, which interactions delineate the vocal registers as well as the transitions between them (passaggio). Exercises concerning range may involve practice balancing air pressure against the vocal folds by working through the passaggios with multiple volumes, tempos, and formants.

FIGS. 3A, 3B, 3C, 3D, and 3E depict the muscles that may be utilized for the dimension of tone. Tone is the shape of vocal sound. It refers to the resonant patterns or formation of amplified frequencies created by the shape of the spaces above the larynx (vocal tract). The vocal tract starts with the constrictor muscles of the laryngopharynx 320 region and moves upwards to the oropharynx 322, oral cavity 324 (formed by the articulator muscles, soft pallet, and hard pallet), nasopharynx 326, and nasal cavities 328. Exercises concerning tone may involve practicing triggering overtones by releasing the muscles above the larynx using open formants on mid-to-loud volumes, at mid-to-slow tempos, throughout the vocal range.

FIGS. 4A, 4B, 4C, 4D, 4E and 4F depict the muscles that may be utilized for the dimension of articulation. Articulation refers to the coordination and configurations of the lips, tongue, and jaw muscles responsible for diction. The articulator muscles include the orbicularis oris 330 and the surrounding lip expression muscles 332 (levator labiis, zygomaticus, risorius, depressors, and mentalis), the tongue 334 and tongue muscles 336 (palatoglossus, styloglossus, hyoglossus, genioglossus, and geniohyoid), the mastacian depressors 338 (temporalis, masseters, and pterygoids) and mandibular depressors 340 (digastrics, mylohyoids, and platysmas) of the jaw. Exercises concerning articulation may involve practicing relatively extreme positions of the articulator muscles using varied combinations of consonants and formants, at mid-to-fast tempos, on multiple volumes.

FIGS. 1D, 1G, 1H, 1I, and 1J depict the muscles that may be utilized for the dimension of strength. Strength refers to the physical capacity and stability of the vocalis muscles 306, and their relationship with the transverse arytenoid muscles 342, lateral cricoarytenoid muscles 344, oblique arytenoid muscles 346, and posterior cricoarytenoid muscles 348. The transverse, lateral, and oblique arytenoids are responsible for bringing the folds together (adduction), while the posterior arytenoids are responsible for separating the folds (abduction). Exercises concerning strength may involve practicing by challenging the strength of the voice with open-formants on mid-to-loud volumes, at mid-to-slow tempos on any pattern, as well as exercises that target the opening and closing of the glottis.

There exist six parameters that affect how each of the seven dimensions of the voice is utilized. The six parameters are formant, feature, pattern, volume, tempo, and variable. The extent to which each parameter affects each of the seven dimensions of the voice is governed by algorithms which are within an app (or "application") according to the present invention and are resident in a computerized device for effecting a method according to the present invention. Once a parameter is chosen, the specific input values are put into the algorithms for each of the seven dimensions in order to calculate a value for the seven dimensions. This is done for all six parameters. Once the sixth parameter's input values calculate the last seven dimension values, the final values of the seven dimensions are known. These final values correspond to a specific and personalized training regimen that can be used to accomplish a desired training objective. For some dimensions, one of the parameters may only have one option available for that specific dimension. With all of the different options of parameters available for each of the seven dimensions, the total number of outcomes possible is 54,045.

In one embodiment, a parameter may have no effect on the final value of any of the seven dimensions of the voice. A parameter may also have a negative effect on the final value of any of the seven dimensions of the voice.

With reference to FIG. 5, an exemplary system within a computing environment for implementing the disclosure includes a general purpose computing device in the form of a computing system 1, commercially available from Intel, IBM, AMD, Motorola, Cyrix, etc. Components of the computing system 2 may include, but are not limited to, a processing unit 3, a system memory 4, and a system bus 5 that couples various system components including the system memory 4 to the processing unit 3. The system bus 5 may be any of several types of bus structures including a memory bus or memory controller, a peripheral bus, or a local bus using any of a variety of bus architectures.

Computing system 1 typically includes a variety of computer readable media. Computer readable media can be any available media that can be accessed by the computing system 1 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 1.

The system memory 4 includes computer storage media in the form of volatile and/or nonvolatile memory such as read only memory (ROM) 6 and random access memory (RAM) 7. A basic input/output system 8 (BIOS), containing the basic routines that help to transfer information between elements within computing system 1, such as during start-up, is typically stored in ROM 6. RAM 7 typically contains data and/or program modules that are immediately accessible to and/or presently being operated on by processing unit 3. By way of example, and not limitation, an operating system 9, application programs 10, other program modules 11 and program data 12 are shown.

Computing system 1 may also include other removable/non-removable, volatile/nonvolatile computer storage media. By way of example only, a hard disk drive 13 that reads from or writes to non-removable, nonvolatile magnetic media, a magnetic disk drive 14 that reads from or writes to a removable, nonvolatile magnetic disk 15, and an optical disk drive 16 that reads from or writes to a removable, nonvolatile optical disk 17 such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 13 is typically connected to the system bus 5 through a non-removable memory interface such as interface 18, and magnetic disk drive 14 and optical disk drive 16 are typically connected to the system bus 5 by a removable memory interface, such as interface 19.

The drives and their associated computer storage media, discussed above, provide storage of computer readable instructions, data structures, program modules and other data for the computing system 1. For example, hard disk drive 13 is illustrated as storing operating system 34, application programs 35, other program modules 36 and program data 37. Note that these components can either be the same as or different from operating system 9, application programs 10, other program modules 11, and program data 12. Operating system 34, application programs 35, other program modules 36, and program data 37 are given different numbers here to illustrate that, at a minimum, they are different copies.

A user may enter commands and information into the computing system 1 through input devices such as a tablet, or electronic digitizer, 20, a microphone 21, a keyboard 22, and pointing device 23, commonly referred to as a mouse, trackball, or touch pad. These and other input devices are often connected to the processing unit 3 through a user input interface 24 that is coupled to the system bus 5, but may be connected by other interface and bus structures, such as a parallel port, game port or a universal serial bus (USB).

A monitor 25 or other type of display device is also connected to the system bus 5 via an interface, such as a video interface 26. The monitor 25 may also be integrated with a touch-screen panel or the like. Note that the monitor and/or touch screen panel can be physically coupled to a housing in which the computing system 1 is incorporated, such as in a tablet-type personal computer. In addition, computers such as the computing system 1 may also include other peripheral output devices such as speakers 27 and printer 43, which may be connected through an output peripheral interface 29 or the like.

Computing system 1 may operate in a networked environment using logical connections to one or more remote computers, such as a remote computing system 30. The remote computing system 30 may be a personal computer (including, but not limited to, mobile electronic devices), a server, a router, a network PC, a peer device or other common network node, and typically includes many or all of the elements described above relative to the computing system 1, although only a memory storage device 31 has been illustrated. The logical connections depicted include a local area network (LAN) 264 connecting through network interface 38 and a wide area network (WAN) 33 connecting via modem 39, but may also include other networks. Such networking environments are commonplace in offices, enterprise-wide computer networks, intranets and the Internet.

For example, in the present embodiment, the computer system 1 may comprise the source machine from which data is being generated/transmitted and the remote computing system 30 may comprise the destination machine. Note however that source and destination machines need not be connected by a network or any other means, but instead, data may be transferred via any media capable of being written by the source platform and read by the destination platform or platforms.

In another example, in the present embodiment, the remote computing system 30 may comprise the source machine from which data is being generated/transmitted and the computer system 1 may comprise the destination machine.

In a further embodiment, in the present disclosure, the computing system 1 may comprise both a source machine from which data is being generated/transmitted and a destination machine and the remote computing system 30 may also comprise both a source machine from which data is being generated/transmitted and a destination machine.

For the purposes of this disclosure, it is appreciated that the terms "device", "processor based mobile device", "mobile device", "electronic device", "processor based mobile electronic device", "mobile electronic device", and "location-capable wireless device" may be synonymous with remote computer 30.

The computing system 1 may be linked to a database 41, wherein personal information, vocal exercises, and regimens may be stored. The above data/information may be sent to the database through a wired link connecting the database with a user's remote computer 30 or through a wireless network such as, but not limited to LAN 32 or WAN 33.

The central processor operating pursuant to operating system software such as IBM OS/2®, Linux®, UNIX®, Microsoft Windows®, Apple Mac OSX® and other commercially available operating systems provides functionality for the services provided by the present invention. The operating system or systems may reside at a central location or distributed locations (i.e., mirrored or standalone).

Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk, or any other form of storage medium known in the art. An exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are well known in the art.

A handheld processor based device, according to the present disclosure, may integrate several functionalities for providing a user interface by which a user may create a desired voice training regimen. The processor-based device may also be configured to communicate the desired voice training regimen created by the user to a designated database associated with the user interface. The processor-based device may further be configured to communicate vocal exercises and regimens to a designated database (virtual cache) associated with the user interface. The various functions provided by an electronic device in accordance with embodiments of the present disclosure, as will be described in further detail below, may generally provide users a convenient creation tool for creating a desired voice training regimen.

A handheld processor-based electronic device, according to the present invention, as in FIG. 6A, may include a vocal training regimen application that may display the embodiments of displays described in FIG. 7A to FIG. 7L and FIG. 9 to FIG. 9.3.3. While certain techniques and embodiments described reference a handheld electronic device 30 (a cellular telephone, tablet, a personal data organizer, etc.), it is appreciated that the techniques and embodiments described may be implemented and/or displayed using any suitable type of electronic device capable of carrying out the previous task, including desktop computers, laptops, TVs, etc.

The electronic device 30 in FIG. 6A may be handheld and function as one or more portable devices (a cellular phone, tablet, a personal data organizer, etc.). While using the electronic device 30, a user may perform one or more tasks (listen to music, talk on the phone, etc.) at one time or at different times. The electronic device 30 may also allow a user to utilize the Internet. Further, the electronic device 30 may allow for wireless communication between a user and another entity using text messaging, email, etc.

The electronic device 30 includes various input complexes 204, 208, 210, 212, and 214. Using these input complexes, a user may alter an electronic device function located within the electronic device 30 when the input complexes 204, 208, 210, 212, and 214 are agitated. For example, the input complex 204 may light up the display 220 of the electronic device 30. Another example may include an input complex 210 that may switch a call alert tone in a cell phone application between vibrate mode and ring mode. The input complexes 212 and 214 may alter the volume for an application that uses volume on the electronic device 30. For the purposes of this disclosure, it is appreciated that the input complexes 204, 208, 210, 212, and 214 are examples and do not limit the disclosure as a whole in any way. The input complexes 204, 208, 210, 212, and 214 may also take the form of other structures not mentioned above. For the purposes of this disclosure, it is appreciated that the terms "electronic device" and "device" may be used interchangeably.

A display 220 may be included in the electronic device 30 that may display images from the electronic device 30. Images that may be displayed include text messages, photos, and e-mails; the electronic device 30 is not limited to displaying only the above images. The display 220 may also display one or more device tokens 236 that show statuses of aspects of the electronic device 30, an example being a device token 236 for the strength of a cellular network (if the electronic device includes a cellular phone application). In certain embodiments, the display 220 may be any type of display 220, which includes a liquid crystal display (LCD), a light emitting diode (LED) display, an organic light emitting diode (OLED) display, etc. The display 220 may further include a touch sensitive device associated with the display 220 that may be interacted with by the touch of a user (and would be considered another input complex in addition to input complexes 204, 208, 210, 212, and 214).

A GUI 222, or "graphical user interface" may be programmed into the display 220 and be shown by the display 220. The GUI 222 may include various graphical layers, windows, screens, templates, elements, or other components that may be displayed on all or a portion of the display 220. For example, the GUI 222 may display more than one icon 226. These icons 226 may be viewed on the device's home screen 224.

In another embodiment, one or more of the user input structures 204, 208, 210, 212, and 214 may be used to peruse the GUI 222 and steer away from the home screen 224. In a further embodiment, the touch screen interface may also be used to select the icons 226.

When a user engages an icon 226, an icon 226 may cover some or all of the display 220 and be representative of various layers, windows, screens, templates, elements, or other graphical components. In addition, a hierarchical screen navigation process may exist once an icon 226 is chosen. In one embodiment, an icon 226 that is chosen may cause the display 220 to display a screen inclusive of one or more other icons 226 or GUI elements. Furthermore, in the present shown embodiment, vocabulary 30 representative of an icon 226 or another element may exist in the general area surrounding an icon 226 or another element. For example, the icon 226 for a vocal training regimen application may further be represented by the vocabulary 230 "Throga". For the purposes of this disclosure, it is appreciated that the GUI 222 may include various elements arranged in hierarchical and/or non-hierarchical structures.

An application may be open, initiated, or run (by the electronic device 30) when a user chooses an icon 226 associated with the aforementioned application. In one embodiment, the device 30 may open the vocal training regimen application, which may provide for the creation of vocal training regimens by the user of the electronic device 30 when the Throga icon 228 is chosen. When an application is chosen by a user, the display 220 may display one or more screens that may include various elements related specifically to the selected application.

Input/output (I/O) ports, for example I/O ports 236, 238, and 240, may exist in the electronic device 30. Using the I/O ports, the electronic device 30 may interact with one or more external devices. For example, the I/O port 240 may be an audio jack that could connect the electronic device 30 to speakers, headphones, etc. In an embodiment, the I/O port 238 may be configured to receive a subscriber identity module (SIM) card when the electronic device can be utilized as a cell phone. Another embodiment may include an I/O port as a connection port used to send and receive data. For the purposes of this disclosure, it is appreciated that there is no set number of I/O ports that are to be included on an electronic device 30 that may connect to any number of other devices including printers, power sources, computers, usb drives etc. The I/O ports may further take the shape suitable for being used in conjunction with any type of wired connection, such as a usb port.

In a further embodiment, more than one function may be performed by an I/O port. For example, I/O port 218 may have the capability to send and receive data as well as receive power from a power source, depending on what is connected to the electronic device 30.

In another embodiment, the electronic device 30 may include one or more audio I/O elements 216, 234, which may function as one or more input receivers and/or output transmitters. When used as an output transmitter, the one or more audio I/O elements 216, 234 may transmit sound to the user of the device, such as music from a music application. When used as an input receiver, the one or more audio I/O elements 216, 234 may receive sound, such as the voice of a user when the user is utilizing a phone application on the electronic device 30. The one or more audio I/O elements 216, 234 may further be used at the same time (when the electronic device 216, 234 is used as a cell phone, etc.).

FIG. 6 depicts a basic layout of elements of the electronic device 30 in accordance with one embodiment of the present invention. The device 30 may include the above discussed display 224, as well as a CPU 250, a touch screen interface 264, an I/O controller 260, a storage device 254, one or more communication interfaces 260, a video controller 254, control circuitry 244, one or more communication interfaces 260, and a power source 268.

The central processing unit (CPU) 242 and the control circuit 244 may control the operation of the electronic device 30. In conjunction, these elements may provide the processing capability required to execute an operating system, application programs ("apps"), the GUI 222, and any other functions provided on the device 30. The control circuit 244 may include one or more data buses for transferring data and instructions between components of the device 30. The control circuit 244 also may further include on board memory (RAM) for caching purposes.

The CPU 242 may include one or more processors. For example, the CPU 242 may include "general purpose" microprocessors, a combination of general and application-specific microprocessors, instruction set processors, graphics processors, video processors, as well as related chips sets and/or special purpose microprocessors. The device 30 may also include (not shown in FIG. 6) a standalone random access memory (RAM) in communication with the CPU 242 by way of one or more memory controllers, which may be integrated within the control circuit 244.

The CPU 242 may use information that may be stored within a long-term storage device, represented by reference numeral 248. The storage device 248 of the electronic device 30 may be utilized for storing data required for the operation of the CPU 242, data to be processed or executed by the CPU 242, as well as other data required by the electronic device 30, such as application and program data. For, example, the storage device 248 may be configured to store the firmware for the electronic device 30 that is used by the CPU 242. The firmware may include an operating system, as well as other programs or drivers that enable various functions of the electronic device 30, GUI functions, and/or processor functions.

The storage device 248 may also store components for the GUI 222, such as graphical elements, screens, and templates. The storage device 248 may also store data files such as media (e.g., music and video files), image data, application software, preference information (e.g., media playback preferences, general user preferences), network connection information (e.g., information that may enable the electronic device 30 to establish a wireless connection, such as a telephone or Internet connection), subscription information (e.g., information that maintains a record of television shows or other media to which a user subscribes), telephone information (e.g., telephone numbers), and any other suitable data required by the electronic device 30. The long term storage 248 may be non-volatile memory such as read only memory, flash or solid state memory, a hard disk drive, or any other suitable optical, magnetic, or solid-state computer readable media, as well as a combination thereof.

Included in the electronic device 30 may be one or more network communication devices 246 for providing additional connectivity channels for receiving and transmitting information. For example, the communication device 246 may represent a network controller as well as various associated communication protocols. The communication device 248 may provide for various long-range communication interfaces, such as a wireless local area network (WLAN) interface (e.g., an IEEE 802.11x wireless network), a local area network (LAN) interface, or a wide area network (WAN) interface. For example, a WAN interface may permit a private and/or secure connection to a cellular data network, such as the 3G network. The network communication device 248 may further provide a short message service (SMS) interface.

The communication device 248 may further provide for short-range communication interfaces, such as a personal area network (PAN) interface. The PAN interface may provide capabilities to network with, for example, a Bluetooth® network or an ultra wideband network (UWB). The network device 248 may include any number and combination of network interfaces. As will be acknowledged, the network device may employ one or more protocols, such as the High-Speed Downlink Packet Access (HSDPA) protocol, for rapidly downloading data over a network. The network communication device 248 may additionally allow the electronic device 30 to receive software upgrades.

The electronic device 30 may further include a service discovery networking protocol to establish a connection with an external device through a network interface in specific embodiments. For example, both the electronic device 30 and the external device may broadcast identification information using internet protocol standards (IP). The external device may additionally broadcast information relating to the available services the external device is capable of providing (e.g., printing services for a networked printer). The devices may then use the identification information to establish a network connection between the devices.

Properties of the above-mentioned communication interfaces provided by the network communication device 246 may further be determined by user preference settings 252. The user preference settings 252 may be stored in the storage device 248. For instance, the preferences 252 may include a list of networks that the electronic device 30 may connect to and may further govern the order or priority between the communication interfaces.

Further, the communication preferences associated with the preferences 252 may be further dependent upon security features 250 available for each respective communication interface. The security features 250 may be stored in the storage device 248 and may include one or more cryptographic protocols, such as a secure sockets layer (SSL) protocol or a transport layer security (TLS) protocol, for establishing secure communications between the electronic device 30 and an external device. The security features 250 may also include one or more encryption applications for encrypting information sent from the electronic device 30. These features may be particularly useful when transmitting information of a sensitive nature, which may generally include credit card and bank account information.

To limit access to the sensitive data, such as encryption keys, passcodes and passwords, digital certificates, or the like, the security features 250 may also include a secure access-restricted storage area (e.g., within the storage device 248). Additionally, in some embodiments, the secure storage area 248, in addition to storing the above-mentioned sensitive data, may be further protected by its own respective password or authorization "personal identification number" (PIN), for example, in order to prevent unauthorized access to the information stored therein.

The video controller 254 may be operatively coupled to the display 220 and configured to receive image data and to send voltage signals corresponding to the pixel values of the image data to the display 220. The displayed image data may represent information received through the communication interface 246, as well as information contained in the storage device 248. As will be understood by those skilled in the art, pixel values may be numerical assignments corresponding to respective pixel intensities. Therefore, the display 220 may receive the voltage signals from the video controller 254 as an input and produce an image corresponding to the voltage signals. With reference to FIG. 6A, an image produced by the signals provided by the video controller 254 may represent a screen of the GUI 222 described above.

A user may select various graphical elements which may represent applications or information that may be displayed through the GUI 222. A touch screen interface 258 may be positioned in front of or behind the display 220 and may provide a user the ability to select graphical elements, such as the icons 226 displayed by the GUI 222 as in FIG. 6A. The touch screen interface 258 may be configured to receive inputs based on a physical contact (e.g., touching the display 220 when engaging an icon) either by the user or an object (e.g., stylus) being controlled or manipulated by the user, and to send "touch event" information to the CPU 242. The CPU 242 may then process the detected touch event information and perform a corresponding action. For example, referring briefly back to FIG. 6A, the "touching" of the icon 226 may be processed by the CPU 242 as an instruction to execute or initiate the corresponding application. The touch screen interface 258 may employ any suitable type of touch screen technology such as resistive, capacitive, infrared, surface acoustic wave, electromagnetic, or near field imaging. The touch screen interface 258 may further include single point or multipoint sensing.

A user may communicate with the CPU 242 through various input structures utilizing the infrastructure provided by the I/O controller 260. The input structures provided on the electronic device 30 include input structures represented by the reference numerals 204, 208, 210, 212, and 214 as shown in FIG. 5. The user input structures 204, 208, 210, 212, and 214 may be used in conjunction with, or independently of, the touch screen interface 258 to provide input information to the electronic device 30.

The electronic device 30 may be powered by the power source 256 in both non-portable and portable settings. In a portable setting, for instance, in order to facilitate transport and ease of motion, the electronic device 30 may include an integrated power source 256 for powering the electronic device 30. The power source 256 may include one or more batteries, such as a Li-Ion battery, which may be user-removable or secured to the electronic device 30. In specific embodiments, the proprietary connection I/O port 218 may be used to connect the electronic device 30 to a power source in order to recharge the battery. In other embodiments, the one or more batteries may be non-integrated and may include one or more rechargeable or replaceable batteries. Further, in a non-portable setting, the power source 256 may include AC power, such as provided by an electrical outlet.

Generally, depicted screen images may be generated by the GUI 222 and displayed on the display 220. For instance, these screen images may be generated as the user interacts with the electronic device 30, such as via the input structures 204, 208, 210, 212, and 214, and/or the touch screen interface 258. As discussed above, the GUI 222, depending on the inputs and selections made by a user, may display various screens including icons (e.g., 226) and graphical elements. These elements may represent graphical and virtual elements or "buttons" which may be selected by the user by physically touching their respective location on the display 220 using the touch screen interface 258, for example. Further, the functionalities set forth and described in the subsequent figures may be achieved using a wide variety of graphical elements and visual schemes. Thus, it should also be understood that the present disclosure is not intended to be limited to the precise user interface conventions depicted herein. Embodiments of the present invention may include a wide variety of GUI 222 styles.

FIG. 7A depicts a screen image from an electronic device 30 depicting the vocal training main option page 360 for the vocal training regimen application that prescribes a vocal training regimen in accordance with one embodiment. Beginning with the home screen 224, a user may initiate the vocal training regimen application by selecting the Throga icon 228 on the display of the electronic device 30. Upon selecting the Throga icon 228, the vocal training main page 360 may be displayed on the electronic device 30. The vocal training main page 360 includes three sections: a title section 102, a display section 104, and an options section 106. In the current screen image, the title section 102 displays a title relating to the application (in this case, "Throga") as well as an application preferences icon 100, which, once selected by the user, may display a list of all the main screen options in the app using the display 220. This options include "Home", "Vocal Gym" (with a submenu of related screens "Warm Up, "Work Out", "Guided Exercises", "Custom Exercises", "Community Board", and "Guidelines"), "7DS Calculator" (with a submenu of related screens "7DS" and "Create an Exercise"), "My Points" (with a submenu of related screens "THROGA Top 100" and "Redeem Points"), and "Tools" (with a submenu of related screens "Water Reminder", "Profile", "FAQ", "Find A Teacher", and "Support"). In the current screen image, the display section 104 includes one or more small shapes that tell a user what page of icons that the user is viewing. In the current screen image, the options section 106 displays four icons that are each depicted using words and pictures. The icons include a vocal gym icon 108, a 7DS calculator icon 112, a "my points" icon 110, and a tools icon 114, with each of the icons displaying one or more screens when each icon is selected by a user. For example, the vocal gym icon 108 may display one or more screens used in the creation of a vocal training regimen. In a further embodiment, the options section 106 may display more or less than four icons. In the case that the options section 106 includes more than four icons, the additional icons may be displayed by utilizing the GUI 222 by a user applying a "swiping" motion to the GUI 222 and "swiping" the icons to the left. In order for a user to view previously viewed icons, a "swiping" motion to the right may be applied to the GUI 222.

FIG. 7B depicts a screen image from an electronic device 30 depicting the formant selection page 362 for the vocal training regimen application that prescribes a vocal training regimen in accordance with one embodiment. Once the 7DS calculator icon 112 or equivalent is chosen by a user, the display 220 may display the formant selection page 362. The formant selection page 202 may include four main sections: a title section 102, a display section 104, a summary section 105, and an options section 106. In the current screen image, the title section 102 displays a title relating to the application (in this case, "7DS Calculator") as well as a cancel icon 103, which, once selected by the user, may take the user away from the formant selection page 362 and take the user back to the previous page 360. In the current screen image, the display section 104 includes capital letters, each referring to a specific voice dimension. The display section 104 with the capital letters will be utilized as a graph in FIG. 7C to FIG. 7I. In the current screen image, the summary section 105 displays a dark section with squares that indicate what parameters have already been chosen. There are six squares that represent the six different parameters (formant, feature, pattern, volume, tempo, and variable). Once a parameter is chosen and confirmed by the user, a symbol representing the chosen parameter will appear in the box corresponding to that parameter. In the summary section 105, the squares found on the screen have not been altered because no parameters have been chosen. In the current screen image, the options section 106 displays a section title 115 relating to the parameter referred to on the current image (in this case, "Select Formant") as well as six icons each representing a single option of the formant parameter: an M formant icon 116, an E formant icon 118, an A formant icon 120, a Tongue Roll formant icon 122, a Lip Trill formant icon 124, and a Z formant icon 126. When a parameter icon is chosen by a user, a sound will be played to represent and confirm that selection, and a bar above each letter will increase, decrease, or stay the same height, depending on what parameter icon was chosen. The height of the bar is significant in that it displays the amount that each parameter plays a role in the final voice training regimen, relative to the other parameters. Once parameters are chosen, abbreviations for the parameters will fill in the empty boxes. The options section 106 also includes a next icon 107, which will become "touchable" once a user chooses a formant option. In another embodiment, there may be more or less than six specific formant icons located in the options section 106.

In a further embodiment, displayed formant icons may be selected from the group of O formant icon, uh (low larynx) formant icon, tongue roll/lip trill formant icon, E/A formant icon, and A/E/A/O/O formant icon. The selection of formant icons is not necessarily limited to six options, as in the described embodiment of the formant selection page 362. Other formant icons may be displayed on a second, third, etc. options section 106, accessible using a "swiping" motion across the display 220.

In a further embodiment, the electronic device 30 may expel sound related to a formant icon that is engaged by a user through one or more audio output elements 216.

FIG. 7C depicts a screen image from an electronic device 30 depicting the M formant selection page 364 for the vocal training regimen application that prescribes a vocal training regimen in accordance with one embodiment. This screen shows how the seven dimensions of singing are altered based on the use of a certain formant (in this case, M). In the current screen image, the summary section 105 and options section 106 confirm that the formant M has been chosen because of the fact that the M formant icon 116 in the options section 106 appears darker than the other formant icons and the first box in the summary section 105 is filled in with the capital letter "M". In the current screen image, the display section 104 includes capital letters referencing the seven dimensions of the voice with a bar located above each capital letter. These "bars" represent graphical values and show how much influence the M formant parameter will play on the final exercise that will be created. These graphical values are based on an input value (of the M formant parameter) put into algorithms representative of each vocal dimension. A clear button appears in the options section 106 in case the M formant icon 116 was accidentally selected.

In a further embodiment, chosen formant icons may be selected from the group of E formant icon 118, A formant icon 120, tongue roll formant icon 122, lip trill formant icon 124, and Z formant icon 126. Different formants will create different graphical results for the seven vocal dimensions due to different input values for each formant.

In another embodiment, the selection of formant icons is not necessarily limited to six options, as in the described embodiment of the formant selection page 362. Other formant icons may be displayed on a second, third, etc. options section 106, accessible using a "swiping" motion across the display 220. The "other" formant icons displayed and selectable may include, but are not limited to, O formant icon, uh (low larynx) formant icon, tongue roll/lip trill formant icon, E/A formant icon, and A/E/A/O/O formant icon. Different formants will create different graphical results for the seven vocal dimensions due to different input values for each formant.

FIG. 7D depicts a screen image from an electronic device 30 depicting the "None" feature selection page 366 for the vocal training regimen application that prescribes a vocal training regimen in accordance with one embodiment. This screen shows how the seven dimensions of singing are altered based on the use of a certain feature (in this case, none). In the current screen image, the summary section 105 and options section 106 confirm that the feature "None" was chosen because of the fact that the None feature icon 128 in the options section 106 appears darker than the other feature icons and the first box in the summary section 105 is filled in with the phrase "None". In the current screen image, the display section 104 includes capital letters referencing the seven dimensions of the voice with a bar located above each capital letter. These graphical values are based on an input value (different for each previously chosen parameter) put into algorithms representative of each vocal dimension. There are two separate parts of each bar: a dark lower section and a lighter upper section. The dark lower section is parameter values that have already been established by previous parameters. The lighter upper section of each graph is the current parameter value (None feature) that has been added to each graphical value. The total height of each bar represents graphical values and show how much influence the previously chosen parameters will play on the final exercise that will be created. A clear button 127 appears in the options section 106 in case the None feature icon 128 was accidentally selected. A user may go back to the previous screen by engaging the arrow icon 135 in the upper left hand corner of the None feature selection page 366. The arrow icon 135 may be found on later screens in case a user may need to change a parameter, etc.

In a further embodiment, a displayed input feature icon is selected from the group of v-fry intro icon 130, v-fry outro icon 132, and v-fry sustain icon 134. Different features will create different graphical results for the seven vocal dimensions due to different input values for each feature.

In another embodiment, there may be more or less than four specific feature icons displayed and selectable in the options section 106. Other feature icons may be displayed on a second, third, etc. options section 106, accessible using a "swiping" motion across the display 220. These additional displayed features may be selected from the group of, but are not limited to, a VFP icon, H icon, M icon, G icon, Z icon, N icon, S icon, L icon, L/G icon and others as they are created. Different features will create different graphical results for the seven vocal dimensions due to different input values for each feature.

FIG. 7E depicts a screen image from an electronic device 30 depicting the constant pattern selection page 368 for the vocal training regimen application that prescribes a vocal training regimen in accordance with one embodiment. This screen shows how the seven dimensions of singing are altered based on the use of a certain pattern (in this case, constant). In the current screen image, the summary section 105 and options section 106 confirm that the pattern "Single Note" was chosen because of the fact that the Single Note pattern icon 136 in the options section 106 appears darker than the other pattern icons and the first box in the summary section 105 is filled in with a Single Note pattern symbol. In the current screen image, the display section 104 includes capital letters referencing the seven dimensions of the voice with a bar located above each capital letter. The lighter upper section of each graph is the current parameter value (Single Note pattern) that has been added to each graphical value. The total height of each bar represents graphical values and show how much influence the previously chosen parameters will play on the final exercise that will be created. A clear button appears in the options section 106 in case the Constant pattern icon 136 was accidentally selected.

In a further embodiment, a chosen input pattern icon is selected from the group of increase pattern icon 138, decrease pattern icon 140, peak pattern icon 142, multi peak pattern icon 144, and step pattern icon 146. Different patterns will create different graphical results for the seven vocal dimensions due to different input values for each pattern.

In another embodiment, there may be more or less than six specific pattern icons displayed and selectable in the options section 106. Other pattern icons may be displayed on a second, third, etc. options section 106, accessible using a "swiping" motion across the display 220. These additional displayed pattern icons may be selected from the group of S (representative of a 1 pattern), SP (representative of a 11111 pattern), SPT (representative of a 1-111 pattern), GPT151 (representative of a 1-1111-5-5555-1-1111 pattern), GPT181 (representative of a 1-1111-8-8888-1-1111 pattern), G151 (representative of a 1-5-1 pattern), G181 (representative of a 1-8-1 pattern), G15181 (representative of a 1-5-1-8-1 pattern), G5185 (representative of a 5-1-8-5 pattern), IG123451 (representative of a 12345-1 pattern), IG13581 (representative of a 1358-1 pattern), I12345m (representative of a 123454321 pattern), I1232123454321 (representative of a 1232123454321 pattern), I1358m (representative of a1358531 pattern), I135358531 (representative of a 13531358531 pattern), I135o1o3o5o4o275421 (representative of a 135o1o3o5o4o275421 pattern), I12131415m (representative of a 121314151413121 pattern), I54535251m (representative of a 545352515253545 pattern), I14653451m (representative of a 146534515435641 pattern), I814653451m (representative of an 81465345154356418 pattern), Is132435m (representative of a 13243534231 pattern, Is135358 (representative of a 13535853531 pattern), Is12131415m (representative of a 121314151413121 pattern), Is14653451m (representative of a 1465345154435641 pattern) and others as they are created. Different input patterns will create different graphical results for the seven vocal dimensions due to different input values for each pattern. For the above mentioned patterns, a symbol will be used on icons representative of each mentioned pattern.

FIG. 7F depicts a screen image from an electronic device 30 depicting the Low constant volume selection page 370 for the vocal training regimen application that prescribes a vocal training regimen in accordance with one embodiment. This screen shows how the seven dimensions of singing are altered based on the use of a certain volume (in this case, low constant). In the current screen image, the summary section 105 and options section 106 confirm that the volume "Low constant" was chosen because of the fact that the Low constant volume icon 148 in the options section 106 appears darker than the other pattern icons and the first box in the summary section 105 is filled in with a Low constant volume symbol. In the current screen image, the display section 104 includes capital letters referencing the seven dimensions of the voice with a bar located above each capital letter. The lighter upper section of each graph is the current parameter value (Low constant volume) that has been added to each graphical value. The total height of each bar represents graphical values and show how much influence the previously chosen parameters will play on the final exercise that will be created. A clear button appears in the options section 106 in case the Low constant volume icon 148 was accidentally selected.

In a further embodiment, an input volume is selected from the group of a medium constant volume icon 150, a high constant volume icon 152, a valley volume icon 154, a peak volume icon 156, and a multi peak volume icon 158. Different volumes will create different graphical results for the seven vocal dimensions due to different input values for each volume.

In another embodiment, there may be more or less than six specific volume icons displayed and selectable in the options section 106. Other volume icons may be displayed on a second, third, etc. options section 106, accessible using a "swiping" motion across the display 220. These additional displayed volume icons may be selected from the group of quiet (represented by Q), medium (represented by M), loud (represented by L), and swell (represented by S). Different volumes will create different graphical results for the seven vocal dimensions due to different input values for each volume.

FIG. 7G depicts a screen image from an electronic device 30 depicting the 60 BPM tempo selection page 372 for the vocal training regimen application that prescribes a vocal training regimen in accordance with one embodiment. This screen shows how the seven dimensions of singing are altered based on the use of a certain tempo (in this case, 60 BPM). In the current screen image, the summary section 105 and options section 106 confirm that the tempo "60 BPM" was chosen because of the fact that the 60 BPM tempo icon 160 in the options section 106 appears darker than the other pattern icons and the first box in the summary section 105 is filled in with the phrase "60 BPM". In the current screen image, the display section 104 includes capital letters referencing the seven dimensions of the voice with a bar located above each capital letter. The lighter upper section of each graph is the current parameter value (60 BPM tempo) that has been added to each graphical value. The total height of each bar represents graphical values and show how much influence the previously chosen parameters will play on the final exercise that will be created. A clear button appears in the options section 106 in case the 60 BPM tempo icon 160 was accidentally selected.

In a further embodiment, an input tempo icon is selected from the group of an 80 BPM tempo icon 162, a 100 BPM tempo icon 164, a 120 BPM tempo icon 166, a 140 BPM tempo icon 168, and a 160 BPM tempo icon 170. Different features will create different graphical results for the seven vocal dimensions due to different input values for each tempo.

In another embodiment, there may be more or less than six specific tempo icons displayed and selectable in the options section 106. Other tempo icons may be displayed on a second, third, etc. options section 106, accessible using a "swiping" motion across the display 220. These additional displayed tempo icons may be selected from the group of a 30 BPM tempo icon, a 44 BPM tempo icon, a 60 BPM tempo icon, a 78 BPM tempo icon, a 98 BPM tempo icon, a 146 BPM tempo icon, a 176 BPM tempo icon, and a 210 BPM tempo icon. Different tempos will create different graphical results for the seven vocal dimensions due to different input values for each volume.

FIG. 7H depicts a screen image from an electronic device 30 depicting the None variable selection page 374 for the vocal training regimen application that prescribes a vocal training regimen in accordance with one embodiment. This screen shows how the seven dimensions of singing are altered based on the use of a certain variable (in this case, None). In the current screen image, the summary section 105 and options section 106 confirm that the variable "None" was chosen because of the fact that the None variable icon 172 in the options section 106 appears darker than the other pattern icons and the first box in the summary section 105 is filled in with the phrase "None". In the current screen image, the display section 104 includes capital letters referencing the seven dimensions of the voice with a bar located above each capital letter. There is not a lighter upper section of each graph due to the fact that the None variable does not have an effect on the values of the seven dimensions of the voice (there is no input value for the algorithms). The total height of each bar represents graphical values and show how much influence the previously chosen parameters will play on the final exercise that will be created. A clear button appears in the options section 106 in case the None variable icon 172 was accidentally selected.

In a further embodiment, an input parameter icon is selected from the group of a neck circles variable icon 174, a laying down variable icon 176, a stretch variable icon 178, a light cardio variable icon 180, and a heavy cardio variable icon 182. Different features will create different graphical results for the seven vocal dimensions due to different input values for each variable.

In another embodiment, there may be more or less than six specific variable icons displayed and selectable in the options section 106. Other tempo icons may be displayed on a second, third, etc. options section 106, accessible using a "swiping" motion across the display 220. These additional displayed variable icons may include a cardio variable icon. Different features will create different graphical results for the seven vocal dimensions due to different input values for each parameter.

FIG. 7I depicts an embodiment of a graphical user interface summarizing the six input parameters that are selected. Once the desired input parameters are chosen, a user will be taken to a final selection screen 376. The final selection screen 376 may display the desired input parameters in order to confirm with a user that the correct input parameters are chosen. In certain embodiments, once the input parameters are confirmed by a user, a user may confirm their choice of input parameters by engaging a "create exercise" icon located on the final selection screen 376 (not shown).

FIG. 7J depicts a display from an electronic device depicting a select screen displaying a custom name and description for a prescribed exercise. The custom title/description screen 378 includes an exercise name section 184. This section allows for a user to input a customized name for the exercise created by the Throga® application using a keypad 188 that may exist on the screen once a user engages the exercise name section 184. The keypad 188 may further be utilized in the exercise description section 186. The exercise description section 186 allows for a user to input a customized description for the exercise created by the Throga® application. In certain embodiments, once the input parameters are confirmed by a user, a user may confirm their choice of input parameters by engaging a "save exercise" icon located on the custom title/description screen 378 (not shown).

FIG. 7K depicts a display from an electronic device depicting a select screen displaying a library of prescribed exercises. The custom library screen 380 may display specific vocal exercises. The custom library preferences section 189 includes three icons: "all", "favorites", and "mine". The vocal exercise created in the previous screens may be viewed once the "mine" icon is engaged by a user (referring to custom vocal exercises created by a user). Favorite vocal exercises may be viewed by a user by engaging the "favorites" icon in the custom library preferences section 189. All exercises exclusive to a user may be viewed by a user engaging the "all" icon in the custom library preferences section 189. A list of exercises found in any icon category may be viewed in the custom exercises section 190. If there is a certain number of exercises in one icon category that is greater than the number of exercises that can be displayed in the custom exercises section 190, the list of exercises may be "scrolled through" by a user so that a user may view all of the custom exercises in a specific icon category. A search icon 191 may be engaged by a user in order to allow a user to search the custom library for key words or phrases.

FIG. 7L depicts a display from an electronic device depicting an exercise screen 382 utilized in the practice of a prescribed exercise. From the custom library screen 380 from FIG. 7K, a user may be led to an exercise screen 382, wherein a user may alter and/or perform an exercise, in this case a mum for range exercise. The exercise screen 382 may include information about the actual exercise in a top portion of the screen (custom exercise title 192 and exercise summary section 194). Below the information is a piano that helps a user to perform the mum for range exercise by playing the start note. Once that occurs, the user may continue with the exercise. A user may alter the volume of the piano section 196 by engaging the "piano" volume bar on the right side of the volume section 198. The "me (DB)" volume bar on the left side of the volume section 198 may keep track of how loud a user's voice is during the engagement of the exercise. In another embodiment, the exercise may differ from that of the mum for range exercise.

In further embodiments of the exercise screen 382, one or more additional buttons may exist on the screen. Up and down arrow icons may be located at the bottom of the screen. A record icon may be located adjacent to the arrow icons that may allow a user to record the user while performing a specific exercise. A play arrow icon may be located adjacent to the record icon and may allow a user to view a recorded user video.

In further embodiments, instruments other than a piano may be utilized in one or more screens of the application for purposes similar to the piano mentioned above. These instruments may include, but are not limited to, a guitar, a cello, a viola, a banjo, a clarinet, drums, a trombone, a bassoon, a saxophone, an oboe, a violin, and a bass.

FIG. 8 depicts a flow chart depicting a sequence of steps utilized to create a prescribed exercise. Once the 7DS calculator icon 112 is engaged by a user on the vocal training main options screen 360, the Throga® application may receive an input of a formant. Once the formant input is received, the more than one dimensions of the voice may be modified using algorithms specific to each dimension of the voice and input parameters specific to the input formant (the input parameters are utilized in the algorithm). Once the more than one dimensions of the voice are modified by an input formant, the previous steps may be repeated using a feature input, pattern input, volume input, tempo input, and variable input. Once the input parameters for all of the inputs have been used to modify the more than one voice dimensions, the 7DS calculator may create a vocal training regimen for a user.

FIG. 9 depicts a flow chart depicting a sequence of displays from an electronic device 30 showing a process of transitioning from the Throga® main screen 400 to a main options screen in accordance with one embodiment. The Throga® main screen 400 is the first screen that will show up on the electronic device 30 relating to the Throga® icon 228 once the app is chosen by the user on the home screen 224. From this screen a user may swipe the Throga® main screen, revealing a secondary main screen. On both screens, the user may choose to sign in or create an account with the Throga® application. When the "create account" button is pressed, a create account screen 404 will appear, urging a user to fill in personal information. Likewise, if the "sign in" button is pressed, a Throga® sign in screen 406 will appear, also urging a user to fill in personal information. If a user is creating a new account, the user may use Facebook® information or Twitter® information in order to sign into the Throga® application. Once information is filled in on either screen, a user will be led to the vocal training main option screen 360 once the user has pressed a "sign in" button or a "create account" button.

FIG. 9.1 depicts a flow chart depicting a sequence of displays from an electronic device showing a process of transitioning from an account creation screen to various other screens in accordance with one embodiment. From the create account screen 404, a user may be led to a Facebook® screen 408, a terms of service screen 410, a privacy policy screen 412, or a styles to sing screen 414. If the "Facebook®" button is pressed, a user may be led to the Facebook® screen 408, which tells the user that the Throga® application will have access to personal information on Facebook®. A user may cancel or confirm this decision. If a "terms of service" button is pressed, a user may be led to a terms of service screen 410, making the user aware of the Throga® application's terms of service. If a "privacy policy" button is pressed, a user may be led to a privacy policy screen 412, making the user aware of the Throga® application's privacy policy. If a "styles to sing" button is pressed, a user may be led to a styles to sing screen 414, giving the user the option to choose what styles of music the user would like to sing in the Throga® application. In a further embodiment, a user may be led to one or more Facebook® screens after being led to the Facebook® screen 408.

FIG. 9.2 depicts a flow chart depicting a sequence of displays from an electronic device showing a process of transitioning from a sign in screen to various other screens in accordance with one embodiment. From the Throga® sign in screen 406 from FIG. 20, a user may be led to a Twitter® access screen 416, which may then ask the user if the Throga® application may access the user's Twitter Account(s). The user may also be led to a forgot password screen 418 that may prompt the user to enter personal information into an information box located on the forgot password screen 418. A user will then securely be able to access or change the user's password once the proper personal information is provided.

FIG. 9.3 depicts a flow chart depicting a sequence of displays from an electronic device showing a process of transitioning from a main options screen to a plurality of screens in accordance with one embodiment. From the vocal training main options screen 360 from FIG. 7A, a user may be led to a vocal gym screen 424, a 7DS calculator screen 426, a my points screen 428, or a tools screen 430. If the vocal gym icon 108 is pressed, a user may be led to a vocal gym screen 424, which may offer the user a number of voice exercise options as well as access to a community board. In a further embodiment, a user may sort voice exercises by popularity or by date of addition of an exercise. If the my points icon 110 is pressed, a user may be led to a my points screen 428, wherein the user may view performance statistics. For example, a user may view the number of hours spent in the "vocal gym", the number of shared exercises, the number of added exercises, and the number of social shares that the user has performed. A corresponding number of points may be viewed for each option as well. A user is also given the option to redeem the points that a user has accumulated. If the 7DS calculator icon 112 is pressed a user may be led to a 7DS calculator screen 426, allowing the user to obtain more information on the seven dimensions of the voice and the 7 DS calculator. A user is also given the option to create a new exercise. If the tools icon 114 is pressed, a user may be led to a tools screen 430, which may give the user a plurality of different options, including the ability to be reminded to drink water, observe tutorials, observe online lessons, and observe a frequently asked questions section.

FIG. 9.3.1 depicts a flow chart depicting a sequence of displays from an electronic device showing a process of transitioning from a vocal gym screen 424 to a plurality of other screens in accordance with one embodiment. From the vocal gym screen 424 from FIG. 9.3, a user may be led to a warmup screen 432, a workout screen 434, a guided exercise screen 436, a community screen 438, a custom exercise screen 440, or a guidelines screen 442. A user may press a warmup button or workout button on the vocal gym screen 424 and be led to the warmup screen 432 or the workout screen 434, where a user may select the number of minutes in which a user would like to spend on a vocal warmup or a vocal workout. The workout screen 434 may further ask a user what type of workout a user would prefer to perform. A user may also press a guided exercise library button or a custom exercise library button in order to be taken to the guided exercise screen 436 or the custom exercise screen 440. It is at these screens that a user may choose to perform a guided vocal exercise or a custom vocal exercise that has been created specifically for a user (using the 7DS calculator). A user may also have the option to be led to a community screen 438 (via a community board icon). Using the community screen 438, a user may observe and choose a vocal exercise from lists of vocal exercises separated into categories, such as "most popular", etc. A user may further have the option to view a guidelines screen 442 that informs a user on how to best perform the vocal exercises. This screen may be found using the navigation icon (compass) on the vocal gym screen 424 and engaging the guidelines icon on the dropdown menu.

FIG. 9.3.1.1 depicts a flow chart depicting a sequence of displays from an electronic device showing a process of transitioning from a warm-up screen 432 to a play screen 446 in accordance with one embodiment. From the warmup screen 432 from FIG. 9.3.1, a user may be led to a lazy warmup screen 444, wherein a user may alter and/or perform a lazy warmup. The lazy warmup screen 444 may include information about the actual exercise in a top portion of the screen. Below the information is a piano that helps a person to perform the lazy warmup. A user may alter the scale direction of the piano by engaging up and down arrow icons located at the bottom of the screen. A record icon located adjacent to the arrow icons may allow a user to record the user while performing the lazy warmup. A play arrow icon located adjacent to the record icon may allow a user to view a recorded user video. Once the play arrow icon is engaged, the user will be taken to a play screen 446 that may play the user recorded video once a play icon is engaged on the play screen 446.

FIG. 9.3.1.2 depicts a flow chart depicting a sequence of displays from an electronic device showing a process of transitioning from a workout screen 434 to various other screens in accordance with one embodiment. From the workout screen 434 from FIG. 9.3.1, a user may be led to a GE interval jumps workout screen 448 once a user selects the corresponding workout and number of workout minutes from the workout screen 434. Once the user has reached the GE interval jumps workout screen 448, the user may perform the GE interval jumps workout guided by a piano (similar to the performance of the lazy warmup). A guide scale is located adjacent to a piano scale and serves the purpose of allowing the user to hear an audio demonstration of the exercise simultaneously played with the piano. The time that a user performs the workout may be recorded at the bottom of the GE interval jumps workout screen 448. An edit icon may exist at the top left hand corner of the GE interval jumps workout screen 448 that may take a user to an exercise add/remove screen 450. The exercise add/remove screen 450 may allow a user to change the workout that a user is performing at any point during the workout that was being performed. A workout may further be added to be performed after the workout that is presently being performed. Similar to the warmup screen 432, the GE interval jumps workout screen 448 includes a play icon that may be used to navigate the user to a play screen 446 that may play the user recorded video once a play icon is engaged on the play screen 446.

FIG. 9.3.1.3 depicts a flow chart depicting a sequence of displays from an electronic device showing a process of transitioning from a community screen 438 to various other screens in accordance with one embodiment. From the community screen 438 from FIG. 9.3.1, a user may engage a specific exercise icon (in this case, an ultimate warmup exercise) and be led to an ultimate warmup video/download screen 462 where a user may engage a video icon, a download icon, or a share icon in order to watch the video of the exercise, download the exercise to the electronic device 30, or share information about the exercise through Facebook®, Twitter®, or email. A user may also engage an arrow icon located on a title bar on the community screen 438 that may alter the category of exercises that are shown. For example, the arrow icon may be engaged in order to alter the category of exercises shown to include a user's personal exercises, which may be displayed on a personal exercise list screen 464. To return to the community screen 438, a user may engage a left arrow button located on the personal exercise list screen 464, returning a user to the community screen 438.

FIG. 9.3.1.4 depicts a flow chart depicting a sequence of displays from an electronic device showing a process of transitioning from a custom exercise library screen 440 to various other screens in accordance with one embodiment. From the custom exercise screen 440 from FIG. 9.3.1, a user may engage a specific exercise icon (in this case, an ultimate warmup exercise) and be led to an ultimate warmup video/add to library screen 472 where a user may engage a video icon, an add to library icon, or a share icon in order to watch the video of the exercise, add the exercise to a user's personal library on the Throga® application, or share information about the exercise through Facebook®, Twitter®, or email. A user may also engage "Mine" icon located on a title bar on the custom exercise screen 440 that may alter the category of exercises that are shown. For example, the "Mine" icon may be engaged in order to alter the category of exercises shown to include a user's personal exercises. When one of the personal exercise icons are engaged (for example, the mum for range exercise icon), a user may be taken to a mum for range edit/video/play screen 474 that may allow a user to edit the mum for range exercise, record a user performing the exercise in a video, play a video relevant to the mum for range exercise, or share a comment about the mum for range exercise (preferably to Facebook®, Twitter®, or through email). These options are available on a sub-screen, which is smaller and is shown lighter than the background of the screen. To return to the custom exercise screen 440, a user may first engage an X icon located on the sub-screen of the mum for range edit/video/play screen 474 and then secondly engage a left arrow button located on the mum for range edit/video/play screen 474. After successively engaging both icons, a user may be returned to the custom exercise screen 440.

FIG. 9.3.1.4.1 depicts a flow chart depicting a sequence of displays from an electronic device showing a process of transitioning from a mum for range screen 474 to various other screens in accordance with one embodiment. From the mum for range edit/video/play screen 474 from FIG. 9.3.1.4, a user may have four main options on the mum for range edit/video/play screen 474: engage an edit icon, a video icon, a play exercise icon, or a share exercise icon in order for a user to be led to a mum for range final selection screen 476, a play screen 446, a mum for range custom library screen 468, or a mum for range share to community screen 478. When a user is led to the mum for range final selection screen 476, a user may have the option to alter any one of the parameters that had previously been chosen. A user may be led to a play screen 446 by engaging the video icon. The play screen 446 will allow a user view a sample video of how the mum for range exercise may be performed. If a user engages the play icon, a user may be led to a mum for range custom library screen 468. This screen may allow a user to perform the mum for range exercise. The user may further engage an icon resembling person in a box, leading the user to a record screen 480. The record screen 480 may allow a user to record the user while performing the exercise. A fourth icon (share icon) may lead a user from the mum for range edit/video/play screen 474 to a mum for range share to community screen 478. This screen may lead a user to a plurality of screens, depending on which icon a user engages. The E-mail icon may lead a user to a share e-mail screen 482, which may allow a user to share an e-mail with another entity. The share to community icon may lead a user to a share to community screen 484, which may share the chosen exercise to members of the Throga® community. A user may further engage a Facebook® or Twitter® icon in order to create a post for Facebook® or Twitter®.

FIG. 9.3.2 depicts a flow chart depicting a sequence of displays from an electronic device showing a process of transitioning from a my points screen 428 to a redeem screen in accordance with one embodiment. From a my points screen 428 from FIG. 9.3, a user may be led to a my points library screen 492 by engaging a redeem points icon. It is from this my points library screen 492 that a user may redeem points that have been accumulated (through spending hours in the gym, sharing exercises, adding exercises, and sharing to social networks) for an assortment rewards. Once a reward is chosen by a user, the user will be led to a redeem screen 494 that may reiterate if a user would like to spend a certain amount of points on the selected reward.

FIG. 9.3.3 depicts a flow chart depicting a sequence of displays from an electronic device showing a process of transitioning from a tools screen 430 to various other screens in accordance with one embodiment. From a tools screen 430 from FIG. 9.3, a user may be led to a plurality of screens including a water reminder screen 496, a tutorial screen 498, an online lessons webpage screen 500, and a tools FAQ screen 502. A user may engage a water reminder icon on the tools screen 430, which may lead a user to a water reminder screen 496. Using the water reminder screen, a user may turn a water reminder "alert" on and off. If the water reminder alert is set to on, a user may set the time interval in which a certain number of hours may be chosen by a user. Using the tutorial screen 498, a user may engage one or more video icons or a website icon. If at least one of the video icons is chosen, a user may be led to a video screen 504 which may show the specific video chosen. If a user engages the website icon, a user may be led to a webpage screen, depicting the webpage for the Throga® application. If the online lessons icon is engaged, a user may be led to an online lessons webpage screen 500 that may depict a webpage with online lessons. If the FAQ icon is engaged, a user may be led to a tools FAQ screen 502 that may display frequently asked questions by users of the Throga® application.

For the purposes of this disclosure, it is appreciated that the term "may be taken to" may refer to a display 220 transitioning from one screen to another screen while a user observes the transition.

In a further embodiment, one or more of the screens that may be displayed on the electronic device 30 may include a term search icon located on the screen. The term search icon will preferably exist in the top right corner of any given screen.

FIG. 10A depicts a first portion of a chart representative of an embodiment of the layout of all of the possible algorithms selectable in the app version of the 7DS (or 7 Dimensions of Singing) Calculator that results in the creation of an exercise in accordance with one embodiment. This first portion of the chart displays all of the possible combinations of parameters using the formant M, with each parameter grouped into the following columns: formant column 550, feature column 552, pattern column 554, volume column 556, tempo column 558, variable column 560, and row values column 562. For the formant M, there are specific features, patterns, volumes, tempos, and variables that may be chosen that when, in conjunction with the formant M, can alter (or not alter) the values of the seven dimensions of the voice. The total number of audio samples used to generate the number of outcomes is 45, shown as total audio samples 564. The total number of possible outcomes when choosing a formant M is 1845, shown as total value 566. It is noted that a specific variable being chosen may affect the availability of other variables when the other variables are to be chosen.

FIG. 10B depicts a second portion of a chart representative of an embodiment of the layout of all of the possible algorithms selectable in the app version of the 7DS (or 7 Dimensions of Singing) Calculator that results in the creation of an exercise in accordance with one embodiment. This second chart displays all of the possible combinations of variables using the formant lip trill/tongue roll, with each variable grouped into the following columns: formant column 550, feature column 552, pattern column 554, volume column 556, tempo column 558, variable column 560, and row values column 562. For the formant lip trill/tongue roll, there are specific features, patterns, volumes, tempos, and variables that can be chosen that when, in conjunction with the formant lip trill/tongue roll, can alter (or not alter) the seven dimensions of the voice. The total number of audio samples used to generate the number of outcomes is 22, shown as total audio samples 564. The total number of possible outcomes when choosing a formant M is 1890, shown as total value 566. It is noted that a specific variable being chosen may affect the availability of other variables when the other variables are to be chosen.

FIG. 10C, FIG. 10D, FIG. 10E, and FIG. 10F depict a third, fourth, fifth, and sixth portion of a third chart representative of an embodiment of the layout of all of the possible algorithms selectable in the app version of the 7DS (or 7 Dimensions of Singing) Calculator that results in the creation of an exercise in accordance with one embodiment. This third chart displays all of the possible combinations of variables using the formant E, with each variable grouped into the following columns: formant column 550, feature column 552, pattern column 554, volume column 556, tempo column 558, variable column 560, and row values column 562. For the formant E, there are specific features, patterns, volumes, tempos, and variables that can be chosen that when, in conjunction with the formant E, can alter (or not alter) the seven dimensions of the voice. The total number of audio samples used to generate the number of outcomes is 145, shown as total audio samples 564. The total number of possible outcomes when choosing a formant E is 17145, shown as total value 566. It is noted that a specific parameter being chosen may affect the availability of other parameters when the other variables are to be chosen.

FIG. 10G depicts a seventh portion of a chart representative of an embodiment of the layout of all of the possible algorithms selectable in the app version of the 7DS (or 7 Dimensions of Singing) Calculator that results in the creation of an exercise. This fourth chart displays all of the possible combinations of variables using the formant O, with each variable grouped into the following columns: formant column 550, feature column 552, pattern column 554, volume column 556, tempo column 558, variable column 560, and row values column 562. For the formant O, there are specific features, patterns, volumes, tempos, and variables that can be chosen that when, in conjunction with the formant O, can alter (or not alter) the seven dimensions of the voice. The total number of audio samples used to generate the number of outcomes is 35, shown as total audio samples 564. The total number of possible outcomes when choosing a formant O is 3420, shown as total value 566. It is noted that a specific parameter being chosen may affect the availability of other parameters when the other parameters are to be chosen.

FIG. 10H depicts an eighth portion of a chart representative of an embodiment of the layout of all of the possible algorithms selectable in the app version of the 7DS (or 7 Dimensions of Singing) Calculator that results in the creation of an exercise. This fifth chart displays all of the possible combinations of parameters using the formant Z, with each parameter grouped into the following columns: formant column 550, feature column 552, pattern column 554, volume column 556, tempo column 558, variable column 560, and row values column 562. For the formant Z, there are specific features, patterns, volumes, tempos, and variables that can be chosen that when, in conjunction with the formant Z, can alter (or not alter) the seven dimensions of the voice. The total number of audio samples used to generate the number of outcomes is 24, shown as total audio samples 564. The total number of possible outcomes when choosing a formant Z is 1035, shown as total value 566. It is noted that a specific parameter being chosen may affect the availability of other parameters when the other parameters are to be chosen.

FIG. 10I, FIG. 10J, FIG. 10K, and FIG. 10L depict a ninth, tenth, eleventh, and twelfth portion of a chart representative of an embodiment of the layout of all of the possible algorithms selectable in the app version of the 7DS (or 7 Dimensions of Singing) Calculator that results in the creation of an exercise. This sixth chart displays all of the possible combinations of parameters using the formant A, with each parameter grouped into the following columns: formant column 550, feature column 552, pattern column 554, volume column 556, tempo column 558, variable column 560, and row values column 562. For the formant A, there are specific features, patterns, volumes, tempos, and variables that can be chosen that when, in conjunction with the formant A, can alter (or not alter) the seven dimensions of the voice. The total number of audio samples used to generate the number of outcomes is 128, shown as total audio samples 564. The total number of possible outcomes when choosing a formant A is 15,930, shown as total value 566. It is noted that a specific parameter being chosen may affect the availability of other parameters when the other parameters are to be chosen.

FIG. 10M depicts a thirteenth portion of a chart representative of an embodiment of the layout of all of the possible algorithms selectable in the app version of the 7DS (or 7 Dimensions of Singing) Calculator that results in the creation of an exercise. This seventh chart displays all of the possible combinations of parameters using the formant uh (low larynx), with each parameter grouped into the following columns: formant column 550, feature column 552, pattern column 554, volume column 556, tempo column 558, variable column 560, and row values column 562. For the formant uh (low larynx), there are specific features, patterns, volumes, tempos, and variables that can be chosen that when, in conjunction with the formant uh (low larynx), can alter (or not alter) the seven dimensions of the voice. The total number of audio samples used to generate the number of outcomes is 21, shown as total audio samples 564. The total number of possible outcomes when choosing a formant uh (low larynx) is 2430, shown as total value 566. It is noted that a specific parameter being chosen may affect the availability of other parameters when the other parameters are to be chosen.

FIG. 10N and FIG. 10O depict a fourteenth and fifteenth portion of a chart representative of an embodiment of the layout of all of the possible algorithms selectable in the app version of the 7DS (or 7 Dimensions of Singing) Calculator that results in the creation of an exercise. This second chart displays all of the possible combinations of parameters using the formant E/A, with each parameter grouped into the following columns: formant column 550, feature column 552, pattern column 554, volume column 556, tempo column 558, variable column 560, and row values column 562. For the formant E/A, there are specific features, patterns, volumes, tempos, and variables that can be chosen that when, in conjunction with the formant E/A, can alter (or not alter) the seven dimensions of the voice. The total number of audio samples used to generate the number of outcomes is 64, shown as total audio samples 564. The total number of possible outcomes when choosing a formant E/A is 6345, shown as total value 566. It is noted that a specific variable being chosen may affect the availability of other parameters when the other parameters are to be chosen.

FIG. 10P depicts a sixteenth portion of a chart representative of an embodiment of the layout of all of the possible algorithms selectable in the app version of the 7DS (or 7 Dimensions of Singing) Calculator that results in the creation of an exercise. This seventh chart displays all of the possible combinations of parameters using the formant A/E/A/O/O, with each parameter grouped into the following columns: formant column 550, feature column 552, pattern column 554, volume column 556, tempo column 558, variable column 560, and row values column 562. For the formant A/E/A/O/O, there are specific features, patterns, volumes, tempos, and variables that can be chosen that when, in conjunction with the formant A/E/A/O/O, can alter (or not alter) the seven dimensions of the voice. The total number of audio samples used to generate the number of outcomes is 41, shown as total audio samples 564. The total number of possible outcomes when choosing a formant A/E/A/O/O is 4005, shown as total value 566. It is noted that a specific parameter being chosen may affect the availability of other parameters when the other parameters are to be chosen.

FIG. 10Q depicts a chart containing letters, terms, and descriptions of the letters and terms found in FIG. 10A through FIG. 10P in accordance with one embodiment. The variable key column 568 depicts letters and terms that may be found throughout the charts depicted in FIG. 10A through FIG. 10P. The description column 570 supplies a description of the letters and terms found in the variable key column 568.

FIG. 10R depicts a chart containing pattern symbols, patterns, and correlating BPMs in accordance with one embodiment. The pattern key column 572 depicts pattern keys that may be found in FIG. 10A through FIG. 10P. The specific patterns for each pattern key may be found in the column adjacent to the pattern key column 572, referred to as the pattern column 574. Columns BPM 1 (30), BPM 2 (44), BPM 3 (60), BPM 4 (78), BPM 5 (98), BPM 6 (120), BPM 7 (146), BPM 8 (176), and BPM 9 (210) (576, 578, 580, 582, 584, 586, 588, 590, and 592) separately contain a specific BPM (beats per minute) that may be used for specified patterns. For the S pattern, the columns refer to a length of time (1 sec, 2 sec, 4 sec, 6 sec, 9 sec, 12 sec, 16 sec, 20 sec, and 25 sec).

FIGS. 11A and 11B depict an embodiment of a chart containing relative values (from the Throga calculator) given to each parameter when selected. Each parameter has specific numerical values that are relative to each voice dimension. When a user chooses one or more specific parameters, the values may be totaled at the bottom of the chart (FIG. 11B). The total values may correlate to a specific exercise that focuses on each voice dimension based on the numerical value. For example (as shown in FIG. 11B), flexibility has the value of 42, while strength has the value of 3. This may show that the exercise represented by the voice dimension values in FIG. 11B focuses much more heavily on flexibility than on strength.

In another embodiment, the chart of FIG. 11A and FIG. 11B may be viewed on either an electronic device 30 of a user or on the computing system 1.

For the purposes of this disclosure, it is appreciated that the term formant refers to frequencies of the voice that distinguish between all vowels and consonants.

While this disclosure has been particularly shown and described with reference to preferred embodiments thereof and to the accompanying drawings, it will be understood by those skilled in the art that various changes in form and details may be made therein without departing from the spirit of this disclosure.

What is claimed is:

1. A method for prescribing a vocal exercise and regimen, the regimen comprising at least one personalized vocal training exercise, the method comprising:
   receiving via a GUI of an electronic device, an input for a first value for a first voice dimension parameter, the first value selected from a subset of first presented values, the first voice dimension parameter selected from a group consisting of: formant, feature, pattern, volume, tempo, and variable;
   receiving via a GUI of an electronic device, an input for a second value for a second voice dimension parameter, the second value selected from a subset of second presented values, the second presented values determined from input of the first value, the second voice dimension parameter selected from a group consisting of: formant, feature, pattern, volume, tempo, and variable, the second voice dimension parameter being different from the first voice dimension parameter;
   modifying at least one representative voice dimension via a processor executing executable code for the first value and the second value to produce at least one modified representative voice dimension;
   storing the at least one modified representative voice dimension on a non-transitory computer usable storage medium;
   combining at least the first value and the second value to form a vocal exercise corresponding to the at least one modified representative voice dimension; and
   displaying the at least one of: a vocal exercise via the GUI.

2. The method of claim 1, further comprising:
   transmitting the vocal exercise from a first computer to the electronic device.

3. The method of claim 1, wherein a processor performs modification of the at least one representative voice dimension by use of a voice dimension calculator.

4. The method of claim 1, wherein the at least one voice dimension is selected from the group consisting of:
   flexibility, breathing, intonation, range, tone, articulation, and strength.

5. An apparatus for prescribing a vocal exercise and regimen, the regimen comprising at least one personalized vocal training exercise, the apparatus comprising:
   a memory linked to the processor;
   a processor linked to the memory, the processor operably connected with the memory;
   an electronic device including
   a GUI for graphical presentation and input of command; and
   a module operable by the processor to:
     receive via the GUI of an electronic device, an input for a first value for a first voice dimension parameter, the first value selected from a subset of first presented values, the first voice dimension parameter selected from a group consisting of: formant, feature, pattern, volume, tempo, and variable;
     receive via a GUI of an electronic device, an input for a second value for a second voice dimension parameter, the second value selected from a subset of second presented values, the second presented values determined from input of the first value, the second voice dimension parameter selected from a group consisting of: formant, feature, pattern, volume, tempo, and variable, the second voice dimension parameter being different from the first voice dimension parameter;
     modifying at least one representative voice dimension via a processor executing executable code for the first value and the second value to produce at least one modified representative voice dimension;

storing the at least one modified representative voice dimension on a non-transitory computer usable storage medium;

combining at least the first value and the second value to form a vocal exercise corresponding to the at least one modified representative voice dimension; and displaying the at least one of: a vocal exercise via the GUI.

6. The apparatus of claim 5, wherein dynamic modification of the least one representative voice dimension by the processor involves a voice dimension calculator.

7. The apparatus of claim 5, wherein the at least one representative voice dimension is selected from the group consisting of: flexibility, breathing, intonation, range, tone, articulation, and strength.

8. A non-transitory computer-readable storage medium with an executable program stored thereon, wherein the program instructs a microprocessor to performs the steps of:

receiving via a GUI of an electronic device, an input for a first value for a first voice dimension parameter, the first value selected from a subset of first presented values, the first voice dimension parameter selected from a group consisting of: formant, feature, pattern, volume, tempo, and variable;

receiving via a GUI of an electronic device, an input for a second value for a second voice dimension parameter, the second value selected from a subset of second presented values, the second presented values determined from input of the first value, the second voice dimension parameter selected from a group consisting of: formant, feature, pattern, volume, tempo, and variable, the second voice dimension parameter being different from the first voice dimension parameter;

modifying at least one representative voice dimension via a processor executing executable code for the first value and the second value to produce at least one modified representative voice dimension;

storing the at least one modified representative voice dimension on a non-transitory computer usable storage medium;

combining at least the first value and the second value to form a vocal exercise corresponding to the at least one modified representative voice dimension; and displaying the at least one of: a vocal exercise via the GUI.

9. The non-transitory computer-readable storage medium with an executable program stored thereon of claim 8, further comprising the additional step of: sending the at least one vocal exercise and regimen to a system via a link.

10. The non-transitory computer-readable storage medium with an executable program stored thereon of claim 8, wherein the more than one voice dimensions are selected from the group consisting of: flexibility, breathing, intonation, range, tone, articulation, and strength.

\* \* \* \* \*